(12) United States Patent
Yamanashi

(10) Patent No.: US 6,483,648 B1
(45) Date of Patent: Nov. 19, 2002

(54) ZOOM LENS

(75) Inventor: Takanori Yamanashi, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 45 days.

(21) Appl. No.: 09/659,743

(22) Filed: Sep. 11, 2000

(30) Foreign Application Priority Data

Sep. 10, 1999 (JP) ............................................ 11-257056
Sep. 21, 1999 (JP) ............................................ 11-266593
Feb. 14, 2000 (JP) ....................................... 2000-035164

(51) Int. Cl.[7] ................................................ G02B 15/14
(52) U.S. Cl. ........................................ 359/683; 359/684
(58) Field of Search ................................. 359/683, 684, 359/676

(56) References Cited

U.S. PATENT DOCUMENTS 4,963,006 A * 10/1990 Inadome ...................... 359/684
5,388,004 A * 2/1995 Adachi ........................ 359/684
5,548,445 A * 8/1996 Yahagi ........................ 359/684

FOREIGN PATENT DOCUMENTS

| JP | 57-002014 | 1/1982 |
|---|---|---|
| JP | 06-148520 | 5/1994 |
| JP | 07-020381 | 1/1995 |
| JP | 09-005628 | 1/1997 |
| JP | 10-90601 | 4/1998 |
| JP | 10-111455 | 4/1998 |
| JP | 10-111456 | 4/1998 |
| JP | 10-111457 | 4/1998 |
| JP | 10-133109 | 5/1998 |
| JP | 10-133303 | 5/1998 |

* cited by examiner

Primary Examiner—Scott J. Sugarman
(74) Attorney, Agent, or Firm—Pillsbury Winthrop LLP

(57) ABSTRACT

The invention relates to a compact zoom lens system which can be applied to a relatively large image pickup device and can maintain sufficient image-formation capability even at a wide-angle end of 70° or greater and a zoom ratio of about 10 or greater. The zoom lens system comprises a first lens group G1 having positive refracting power, a second lens group G2 having negative refracting power, a third lens group G3 having positive refracting power, a fourth lens group G4 having negative refracting power and a fifth lens group G5. During zooming from the wide-angle end to the telephoto end of the system, the lens groups G1 to G5 are all moving. The first lens group G1 and the third lens group G3 move toward the object side in the process of zooming in such a way that-the spacings between the first and second lens groups G1 and G2 and the third and fourth lens groups G3 and G4 become wide, and at least the fourth lens group G4 or the fifth lens group G5 moves nonlinearly, so that fluctuations of an image plane position with zooming can be compensated for. Conditions for defining the power profiles of the first to fifth lens groups G1 to G5 are satisfied.

17 Claims, 36 Drawing Sheets

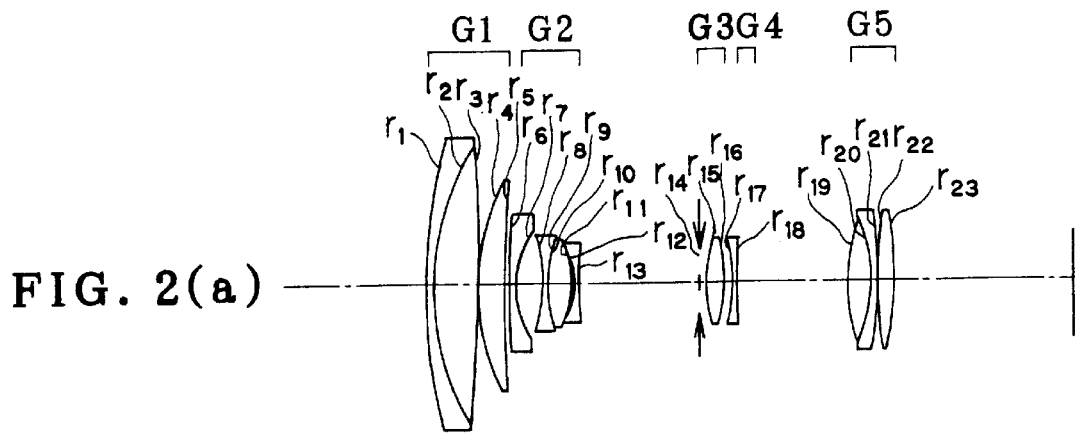
FIG. 2(a)
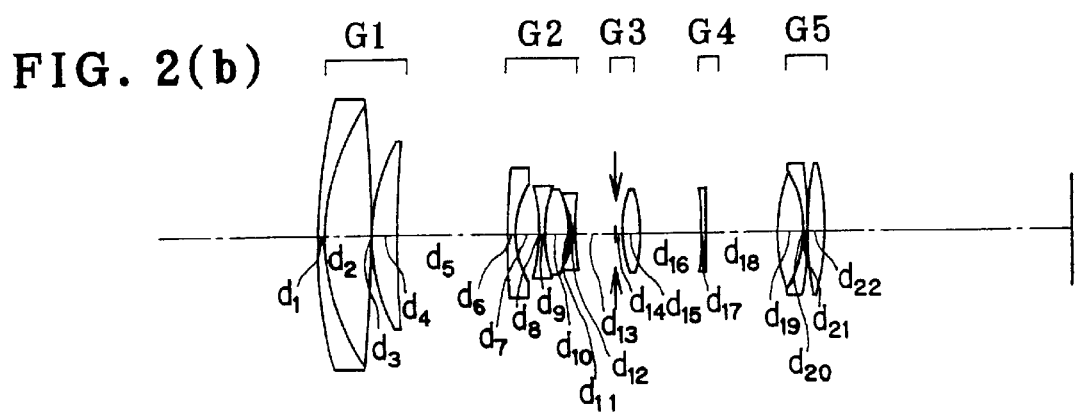
FIG. 2(b)
FIG. 2(c)
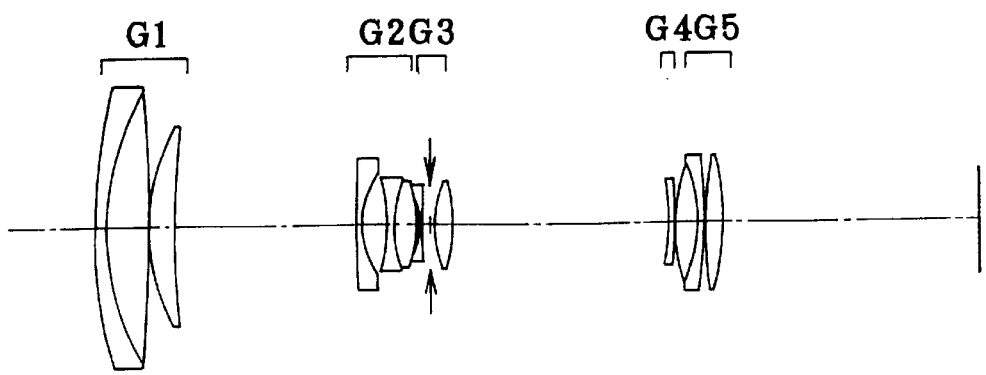

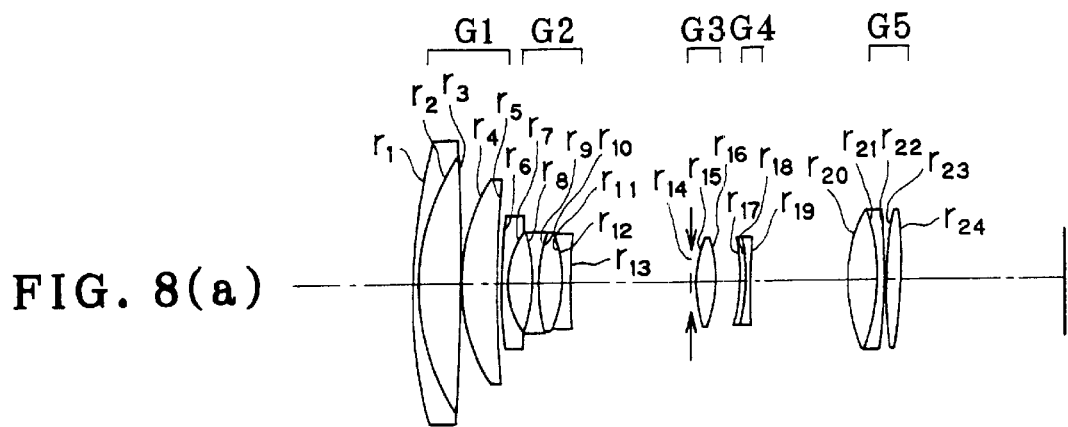
FIG. 8(a)
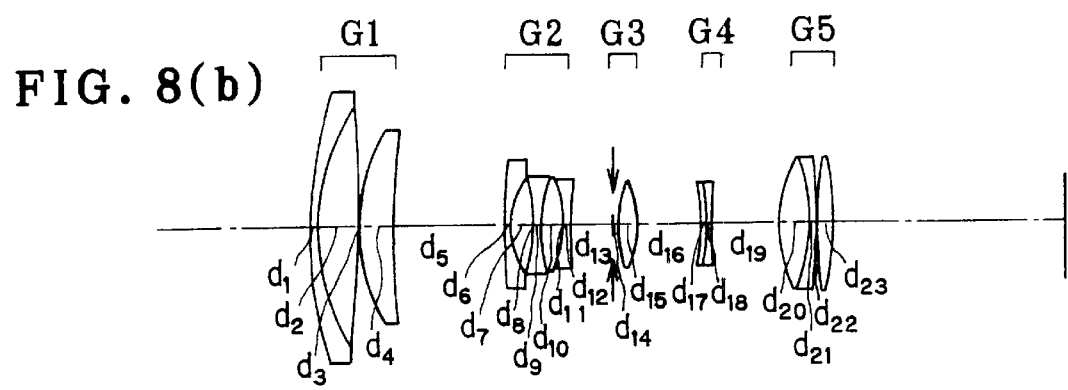
FIG. 8(b)
FIG. 8(c)
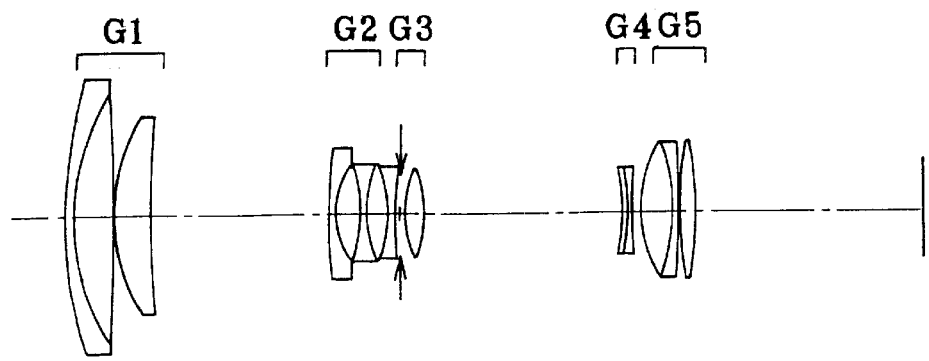

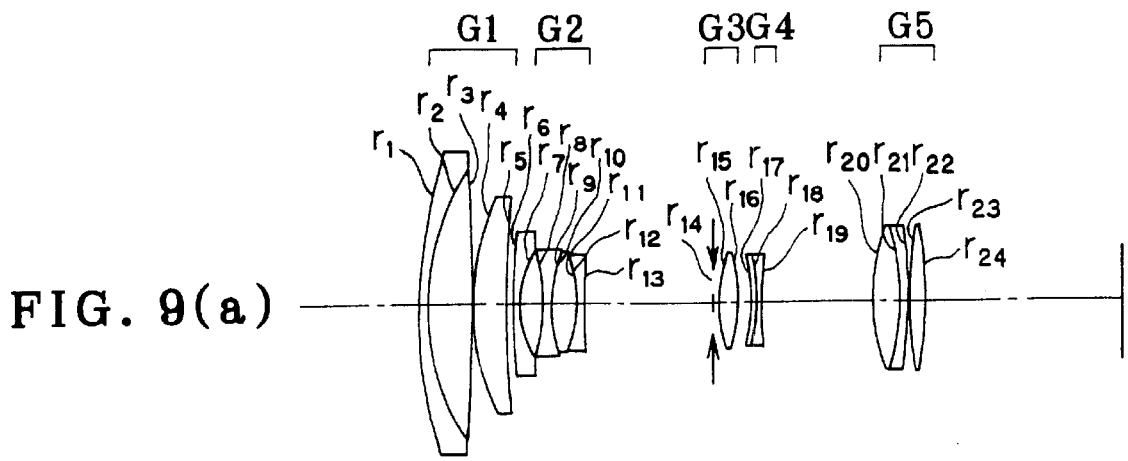
FIG. 9(a)
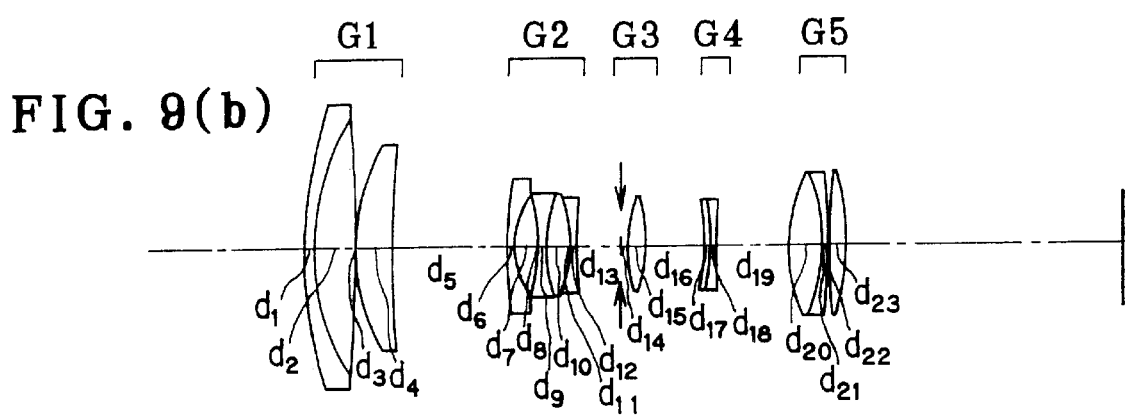
FIG. 9(b)
FIG. 9(c)
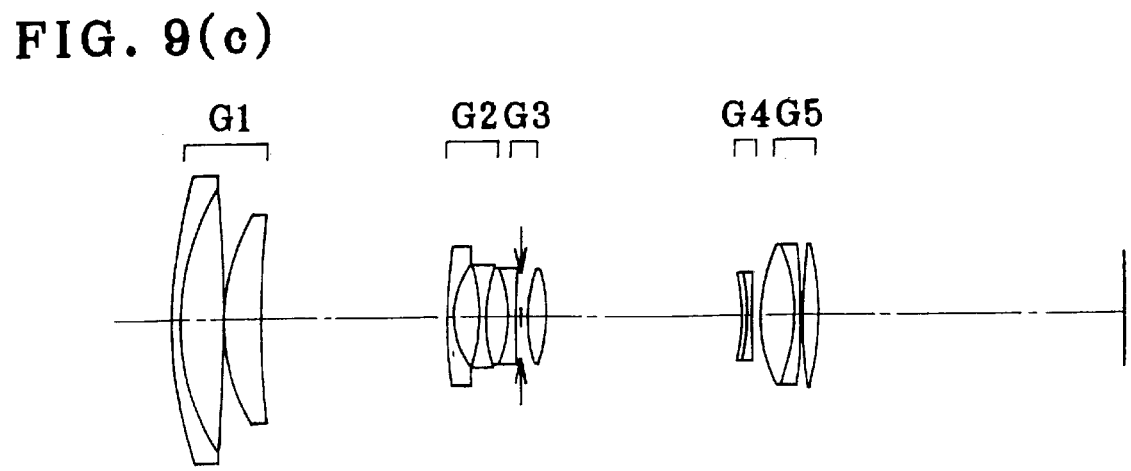

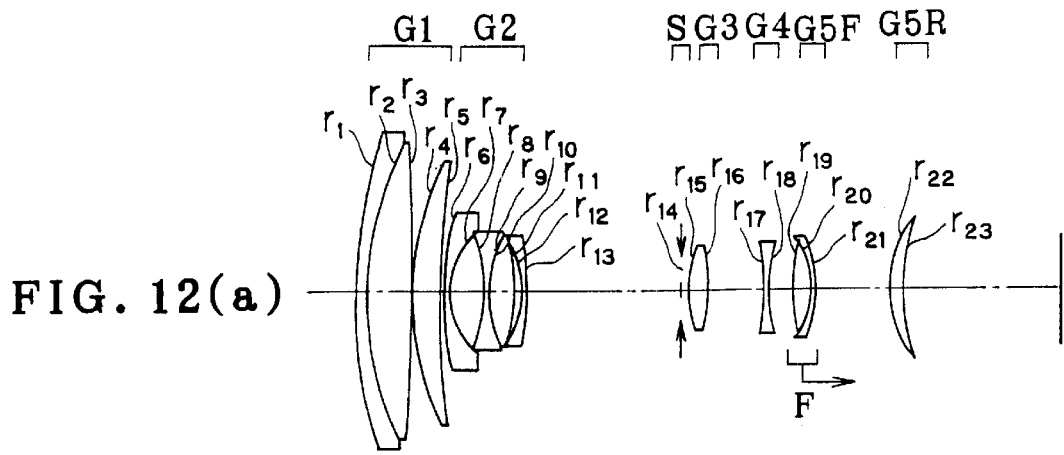
FIG. 12(a)
FIG. 12(b)
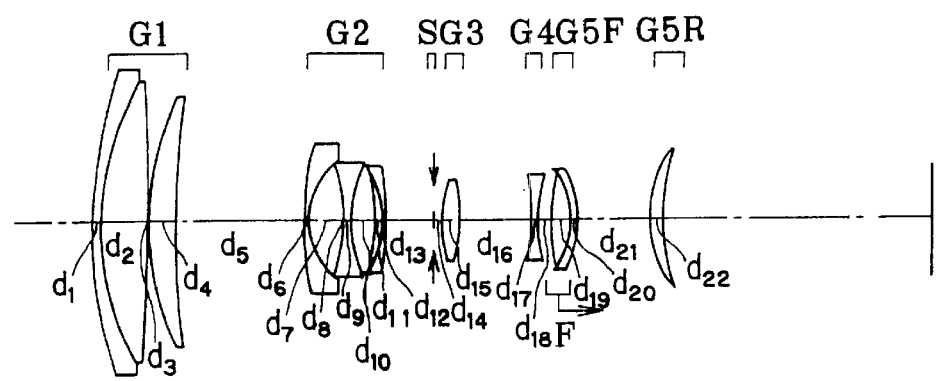
FIG. 12(c)
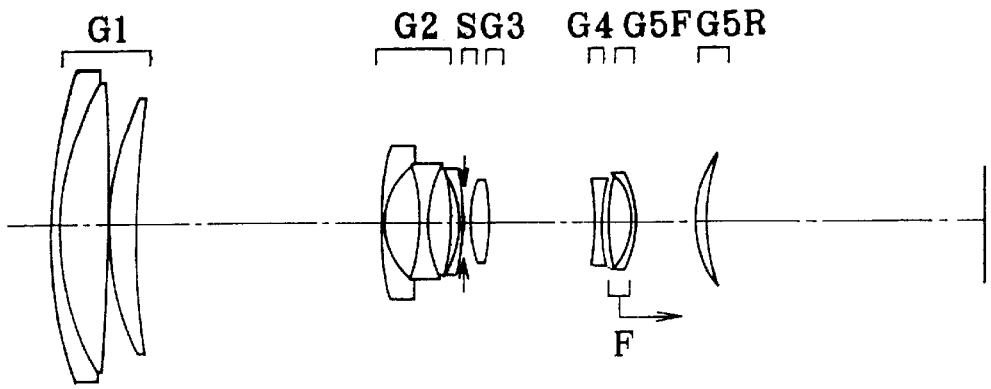

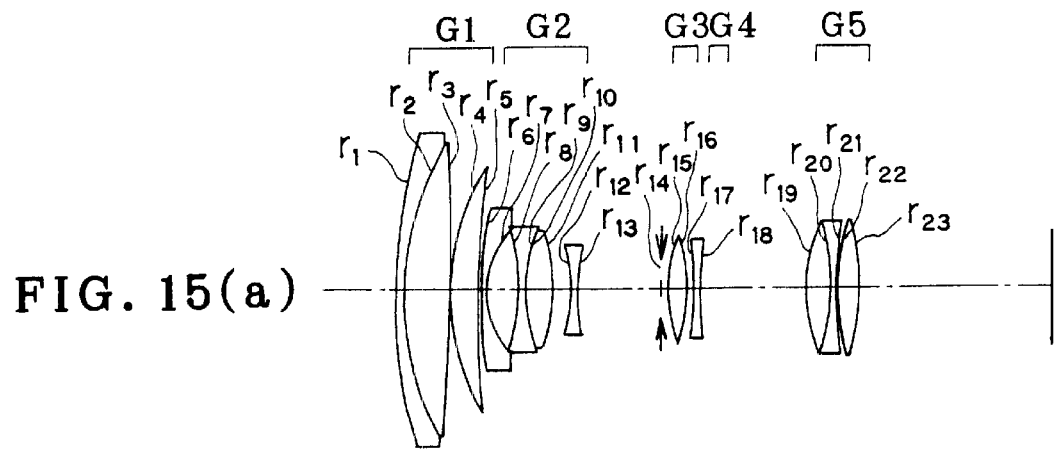
FIG. 15(a)
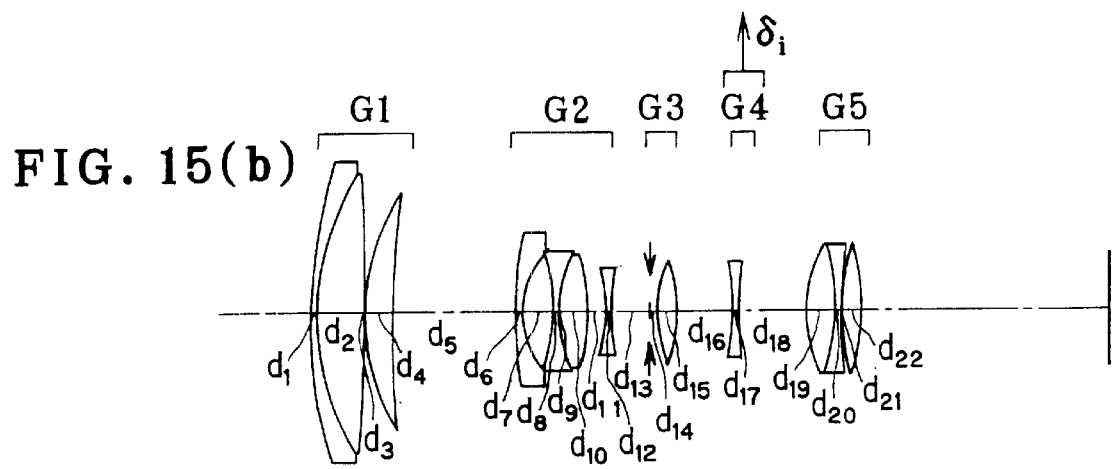
FIG. 15(b)
FIG. 15(c)
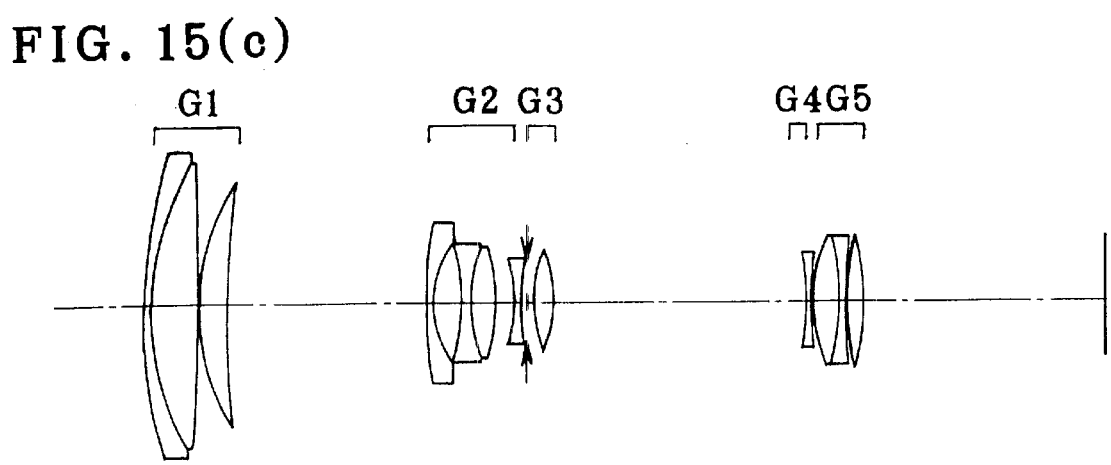

ZOOM LENS

This application claims benefit of Japanese Application (s) No. Hei 11-257056 filed in Japan on Sep. 10, 1999, No. Hei 11-266593 filed in Japan on Sep. 21, 1999, and No. 2000-35164 field in Japan on Feb. 14, 2000, the contents of which are incorporated by this reference.

BACKGROUND OF THE INVENTION

The present invention relates generally to a zoom lens, and more particularly to a wide-angle yet high-magnification zoom lens system best suited for use on cameras, etc.

From relatively old times, high-magnification zoom lenses for use with cameras have been developed in TV camera and chine camera applications. On video cameras, on the other hand, innovation has been spurred for both commercial and consumer purposes since their widespread use. For a zoom lens having high magnification and a field angle of 70° or greater on its wide-angle side, a very high level of optical design is known to be required. one commonly used old type of zoom lens system comprises, in order from its object side, a first lens group having positive refracting power, a second lens group having negative refracting power, a third lens group having positive refracting power and a fourth lens group having positive refracting power, as typically shown in JP-B 2-48087. A great feature of this system is that both the first and fourth lens groups remain fixed during zooming.

There is a version stemming from this type, which is based on the concept of locating a front converter in the first lens group, as typically set forth in U.S. Pat. No. 3,682,534. This version is of large size due to an increased number of lenses, and is used in a focusing mode relying chiefly on the first lens group of the basic arrangement.

There is also proposed a wide-angle yet high-magnification zoom lens system comprising, from its object side, a first lens group having positive refracting power, a second lens group having negative refracting power, a third lens group having positive refracting power and a fourth lens group having positive refracting power, wherein the second to fourth lens groups are movable during zooming and focusing is carried out with the fourth lens group, as typically set forth in JP-A 6-148520. So far, this system has been used in video applications.

For instance, JP-A 9-5628 shows a zoom lens of the type comprising, in order from its object side, a first lens group having positive refracting power, a second lens group having negative refracting power, a third lens group having negative refracting power and a fourth lens group having positive refracting power. This type is one predecessor of the wide-angle yet high-magnification zoom lens system according to the present invention as will be described later. In this type, too, the same focusing mode as mentioned above is used.

For instance, JP-A 7-20381 shows a zoom lens of the type comprising, in order from its object side, a first lens group having positive refracting power, a second lens group having negative refracting power, a third lens group having positive refracting power and a fourth lens group having positive refracting power, wherein all the lens groups are movable during zooming.

The aforesaid zoom lens systems are found to have difficulty in accommodating to future image pick devices expected to increase in the number of pixels, although their lens arrangement is simple. In other words, these zoom lens systems have been originally developed for conventional silver salt film cameras. For instance, U.S. Pat. No. 4,299, 454 shows a zoom lens system comprising, in order from its object side, a first lens group having positive refracting power, a second lens group having negative refracting power, a third lens group having positive refracting power and a fourth lens group having positive refracting power which are all movable for zooming, and having a field angle of 80° or greater at its wide-angle end.

JP-B 58-33531 has already showed a zoom lens system having a field angle of about 74° to about 19° and a zoom ratio of about 5 and comprising, in order from its object side, a first lens group having positive refracting power, a second lens group having negative refracting power, a third lens group positive refracting power, a fourth lens group having negative refracting power and a fifth lens group having positive refracting power. A great feature of this system is that the first and second lens groups are moved as an integral unit for focusing.

U.S. Pat. No. 4,896,950 shows a zoom lens system encompassing a field angle range of about 74° to about 8.3°, and comprising, in order from its object side, a first lens group having positive refracting power, a second lens group negative refracting power, a third lens group having positive refracting power, a fourth lens group having negative refracting power and a fifth lens group having positive refracting power, with the fifth lens group remaining fixed during zooming. Focusing is carried out with the second lens group having large power, as typically shown in JP-A 9-184982.

How to move the third lens group for focusing is typically disclosed in JP-A 10-133109, and the lens system disclosed therein is characterized by its large size and power profile. How to move back the fourth lens group for focusing is typically disclosed in JP-A 11-133303.

A high-magnification zoom lens system having a wide angle layout with its telephoto end including even a super-telephoto range such as one contemplated herein is susceptible to shakes during camera manipulation, which may otherwise cause a deterioration in image-formation capability. To this end, some compensation mechanism is needed. How to move an image in such a direction as to counteract an image movement on an image-formation plane due to shakes, etc. has been proposed in the prior art. For instance, JP-A 63-202714 shows a method of moving a part of image pickup lenses as a correction lens system in a direction vertical with respect to an optical axis which an optical system is assumed to have.

A primary purpose of the present invention is to develop a wide-angle yet high-magnification zoom lens system best suited for use on cameras, etc.

Some wide-angle yet high-magnification zoom lens systems have been proposed for conventional video cameras; however, never until now is any optical system having optical performance enough to fit for image pickup devices having more pixels than ever before proposed. In addition, much is still left to be desired in terms of the optical performance, and affinity for CCDs or the like, of silver salt cameras.

In view of an image pickup device having a microlens and influences of aliasing due to chromatic aberrations, etc., there is still growing demand for a zoom lens system, which is suitable for conventional video cameras and provides an optical system having a certain degree of telecentric nature. optical design based on a zoom lens for conventional video cameras makes a zoom lens system very large, and so offers a practically grave problem.

SUMMARY OF THE INVENTION

In view of such states of the prior art as explained above, one object of the present invention is to provide a zoom lens system of reduced size, which is applicable to a relatively large image pickup device and can keep sufficient image-formation capability even with a zoom ratio of about 10 or greater at a wide-angle end of 70° or greater.

Another object of the present invention is to provide a zoom lens system of reduced size, which can be operated in a proper focusing mode.

Yet another object of the present invention is to provide a zoom lens system of reduced size, which can compensate for the movement of an image by moving lens groups in a proper manner.

According to one aspect of the present invention, these objects are achievable by the provision of a zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, characterized in that:

for zooming from a wide-angle end to a telephoto end of said zoom lens system, a spacing between said first lens group and said second lens group and a spacing between said third lens group and said fourth lens group become wide and a spacing between said second lens group and said third lens group and a spacing between said fourth lens group and said fifth lens group become narrow, and the following conditions are satisfied:

$$2.0 < f_1/f_w < 8.0 \quad (1)$$

$$0.4 < |f_2/f_w| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

where $f_w$ is the focal length of said zoom lens system at said wide-angle end, $f_1$ is the focal length of said first lens group, $f_2$ is the focal length of said second lens group, $f_3$ is the focal length of said third lens group, $f_4$ is the focal length of said fourth lens group, $f_5$ is the focal length of said fifth lens group, and $f_{T345}$ is the focal length of said third lens group to said fifth lens group at said telephoto end.

According to another aspect of the present invention, there is provided a zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, characterized in that:

for zooming from a wide-angle end to a telephoto end of said zoom lens system, a spacing between said first lens group and said second lens group and a spacing between said third lens group and said fourth lens group become wide and a spacing between said second lens group and said third lens group and a spacing between said fourth lens group and said fifth lens group become narrow, and said zoom lens system is focused on a finite object by moving said third lens group or a lens or lenses therein.

According to yet another aspect of the present invention, there is provided a zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, characterized in that:

for zooming from a wide-angle end to a telephoto end of said zoom lens system, a spacing between said first lens group and said second lens group and a spacing between said third lens group and said fourth lens group become wide and a spacing between said second lens group and said third lens group and a spacing between said fourth lens group and said fifth lens group become narrow, and said zoom lens system is focused on a finite object by moving said fourth lens group or a lens or lenses therein.

According to a further aspect of the present invention, there is provided a zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, characterized in that:

for zooming from a wide-angle end to a telephoto end of said zoom lens system, a spacing between said first lens group and said second lens group and a spacing between said third lens group and said fourth lens group become wide and a spacing between said second lens group and said third lens group and a spacing between said fourth lens group and said fifth lens group become narrow, and said zoom lens system is focused on a finite object by moving said fifth lens group or a lens or lenses therein.

According to a further aspect of the present invention, there is provided a zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, characterized in that:

for zooming from a wide-angle end to a telephoto end of said zoom lens system, each of said first lens group to said fifth lens group moves while said first lens group and said third lens group move toward said object side during said zooming in such a way that spacings between said first lens group and said second lens group and between said third lens group and said fourth lens group become wide, a fluctuation of an image plane position with said zooming is compensated for by non-linear movement of at least said third lens group, said fourth lens group or said fifth lens group, and the following conditions are are satisfied:

$$2.0 < f_1/f_w < 8.0 \quad (1)$$

$$0.4 < |f_2/f_w| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

where $f_w$ is the focal length of said zoom lens system at said wide-angle end, $f_1$ is the focal length of said first lens group, $f_2$ is the focal length of said second lens group, $f_3$ is the focal length of said third lens group, $f_4$ is the focal length of said fourth lens group, $f_5$ is the focal length of said fifth lens group, and $f_{T345}$ is the focal length of said third lens group to said fifth lens group at said telephoto end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 is illustrative in section of Example 2 of the present zoom lens system in similar states as in FIG. 1.

FIG. 8 is illustrative in section of Example 8 of the present zoom lens system in similar states as in FIG. 1.

FIG. 9 is illustrative in section of Example 9 of the present zoom lens system in similar states as in FIG. 1.

FIG. 12 is illustrative in section of Example 12 of the present zoom lens system in similar states as in FIG. 1.

FIG. 15 is illustrative in section of Example 15 of the present zoom lens system in similar states as in FIG. 1.

DESCRIPTION OF THE PREFERRED EMBODIMENTS

Figure 1A:
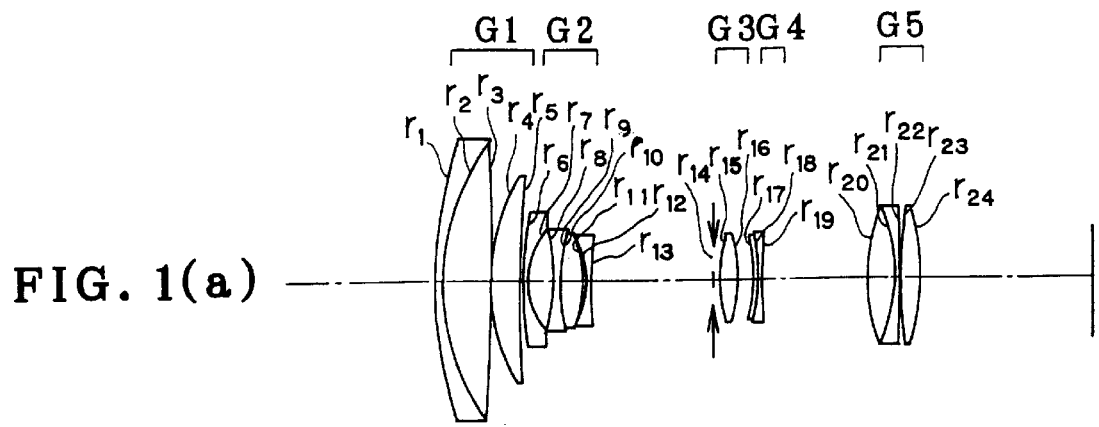
FIG. 1 is illustrative in section of Example 1 of the present zoom lens system at its wide-angle end (a), its intermediate setting (b) and its telephoto end (c).

An account is first given of why the aforesaid arrangements are used and how they act.

As mentioned above, the present invention provides a high-performance, wide-angle yet high-magnification zoom lens system of reduced size.

For silver salt film cameras, a zoom lens system comprising, in order from its object side, a first lens group having positive refracting power, a second lens group having negative refracting power, a third lens group having positive refracting power and a fourth lens group having positive refracting power has so far gone mainstream. In a high-magnification zoom lens system, it is common that the first to fifth lens groups are movable. For correction of a fluctuation of field curvature with zooming it is required to move the third and fourth lens groups. In an extreme case, these lens groups may possibly be thought of as one single unit. To achieve a larger wide angle with a higher zoom ratio, however, it is favorable to move one negative lens group added to the positive lens groups from the standpoints of correction of aberrations as well as zooming. This is particularly preferable for a zoom lens system having a zoom ratio of about 10 or greater such as one contemplated herein. According to a generally accepted idea, correction of chromatic aberrations must be carried out at each lens group with an increasing number of lens groups, and so the number of lenses in each lens increases unavoidably. According to the present invention, however, effective use is made of aspherical surfaces in such a way as to correct distortion at the second lens group and make correction for coma, etc. at the following lens groups.

The principal object of the present invention is to provide a zoom lens optical system which can well accommodate to a field angle of about 70° or greater at its wide-angle end and has high image-formation capability. For this reason, the optical system is constructed of, in order from an object side thereof, a first lens group having positive refracting power, a second lens group having negative refracting power, a third lens group having positive refracting power, a fourth lens group having negative refracting power and a fifth lens group having positive refracting power, wherein the proper power profile conforming to the aforesaid conditions (1) to (5) is provided together with the lens arrangement best suited therefor. According to the present invention, size and performance problems, as is often the case with a wide-angle yet high-magnification zoom lens system, can be solved.

Condition (1) gives a definition of the power profile of the first lens group. For the first lens group designed to move during zooming according to the zooming mode of the present invention, it is of importance to maintain image-formation capability while care is taken of the amount of its movement and an increase in the diameter of the front lens.

Exceeding the upper limit of 8.0 to condition (1) may be preferable for correction of aberrations because of a decrease in the amount of aberrations remaining in the first lens group. However, this is not desirable because the amount of zooming movement and diameter of the first lens group increase, and so the whole size of the first lens group tends to increase. When the lower limit of 2.0 is not reached, some size reductions may be achieved because the diameter and amount of movement of the first lens group tend to decrease. However, this is not preferable in view of correction of aberrations.

Condition (2) gives a definition of the power profile of the second lens group having negative refracting power. The second lens group also takes part in the determination of the power of the first lens group. In other words, the power of the first lens group decreases with a decrease in the power of the second lens group, again resulting unavoidably in size increases.

Exceeding the upper limit of 1.0 to condition (2) may possibly be preferable in view of the number of lenses and correction of aberrations as well. However, this offers many other problems, e.g., decreases in the power of the second lens group as well as the power of the first lens group, an increase in the diameter of the front lens in the first lens group, and an increase in the amount of zooming movement. When the lower limit of 0.4 is not re ached, on the other hand, it is difficult to make correction for aberrations although the diameter of the lens arrangement may be reduced. In particular, considerable distortion and off-axis coma occur. Within the range defined by this condition, it is also possible to achieve an appropriate lens arrangement, thereby reducing the diameter of the lens arrangement and obtaining high image-formation capability.

Condition (3) is provided to determine the power of the third lens group. In t he zoom lens system contemplated herein, the third, fourth and fifth lens groups define an image-formation unit. From the viewpoint of how to zoom, this unit may be thought of as comprising three independent groups. This zooming mode is quite different from many conventional zooming modes relying on the third lens group having positive refracting power and the fourth lens group having positive refracting power. In the present invention, the third lens group plays one role of converging a light beam from the second lens group having strongly divergent power, thereby making correction for spherical aberrations and off-axis aberrations, and another role of making satisfactory correction for longitudinal spherical aberration.

Exceeding the upper limit of 1.2 to condition (3) is not preferable because of an increase in the amount of zooming movement of the third lens group, al though this is very favorable for correction of aberrations at the third lens group. Falling below the lower limit of 0.3 may possibly be favorable for size reductions because of a decrease in the amount of zooming movement. Still, this incurs undesired results because of difficulty in making correction for not only spherical aberrations but also off-axis coma.

Condition (4) is provided to determine the power of the fourth lens group having negative refracting power. When the upper limit of 5.0 to condition (4) is exceeded, the amount of movement of the fourth lens group between the third lens group and the fifth lens group increases, making it difficult to obtain a high zoom ratio. When the lower limit of 0.6 is not reached, the amount of zooming movement decreases. Still, this is not desired from the viewpoint of correction of aberrations; it is difficult to make correction for the aberrations. It is here noted that a substantially afocal light beam is obtained at the first to fourth lens groups, especially in the vicinity of the wide-angle end.

Condition (5) is provided to determine the power of the fifth lens group that plays an important role in controlling the principal ray of an off-axis light beam. Especially when used with a CCD image pickup device or the like, the fifth lens group plays a great role in imparting a certain degree of telecentric nature to the off-axis principal ray. Exceeding the upper limit of 4.0 to this condition is not preferable because of an increase in the amount of zooming movement of the fifth lens group, although aberrations at the fifth lens group may easily be corrected. When the lower limit of 0.5 is not reached, it is difficult to make correction for off-axis aberrations and, at the same time, it is difficult to make correction for aberrations without using an increased number of lenses. In addition, this lens group, if it increases in the number of lenses, often leads to an increase in the size of the zoom lens system, and so makes it impossible to obtain any desired results.

One purport of the present invention is to provide a zoom lens system which is reduced in size by simplifying its lens arrangement as much as possible. In this case, the refracting power profile of each lens group is of importance. This refracting power profile correlates with not only the lens arrangement of each lens group but also the amount of zooming movement of each lens group.

Another purport of the present invention is to provide an optical system which encompasses a field angle of about 70° or greater at its wide-angle end albeit having high magnification, and is simpler in construction than those according to prior inventions.

In the parlance of focal length, it is desired that the focal length of the zoom lens system at its wide-angle end be shorter than the effective diagonal length of its image-formation plane or an image pickup device.

According to the present invention, an optical system wherein a certain degree of telecentric nature can be maintained irrespective of a longer effective diagonal length than ever before is provided while chromatic problems such as aliasing and shading on the image-formation plane are taken in consideration on the assumption that CCDs are used as image pickup devices, as will be understood from the examples given later.

In other words, it is desired that the principal ray emerging from the optical system be determined on the basis of the following condition:

$$10 < |expdw \times Y|/Lw \tag{6}$$

Here Expdw is the optical axis distance from an image-formation plane position to an exit pupil, Y is an actual maximum image height on an image-formation plane, and Lw is an optical axis distance at the wide-angle end from an apex of a surface located nearest to the object side in the first lens group to the image-formation plane.

If this condition is satisfied, it is then possible to meet a condition that enables a clear image to be obtained.

It is also desired that the following conditions be satisfied upon zooming from the wide-angle end to the telephoto end:

$$1.6 < \Delta_{1T}/f_w < 5.0 \quad (7)$$

$$1.0 < \Delta_{3T}/f_w < 4.0 \quad (8)$$

Here $\Delta_{1T}$ is the amount of zooming movement of the first lens group to the telephoto end, as measured on the basis of the wide angle end, and $\Delta_{3T}$ is the amount of zooming movement of the third lens group to the telephoto end, as measured on the basis of the wide-angle end.

Condition (7) is provided to control the amount of zooming movement of the first lens group from the wide-angle end to the telephoto end, and condition (8) is provided to control the amount of zooming movement of the third lens group from the wide-angle end to the telephoto end.

Condition (7) is to gain proper control of the amount of zooming movement of the first lens group, thereby achieving significant size reductions. When the upper limit of 5.0 to condition (7) is exceeded, it is difficult to reduce the size of the zoom lens system including a lens barrel structure because even when the overall length of the zoom lens system is short at the wide-angle end, the amount of movement of the first lens group to the telephoto end increases. Falling below the lower limit of 1.6 is not desired because the amount of movement of the first lens group becomes too small to obtain any desired high zoom ratio.

Exceeding the upper limit of 4.0 to condition (8) is not desired because the amount of movement of the third lens group increases, resulting in size increases. At a value less than the lower limit of 1.0, the present zooming mode cannot be used; other zooming modes may be used.

The image-formation magnification is now explained. The features of the zoom lens system according to the invention are that the first to fifth lens groups are all moving during zooming. When these lens groups move from the wide-angle end to the telephoto end, the second lens group have a great zooming action, as can be seen from the following condition. The second lens group itself may also be fixed during zooming.

To be more specific, the second lens group should preferably have a paraxial transverse magnification capable of satisfying the following relation:

$$2.5 < \beta_{2T}/\beta_{2W} < 7 \quad (9)$$

Here $\beta_{2W}$ is the image-formation magnification of the second lens group at the wide-angle end, and $\beta_{2T}$ is the image-formation magnification of the second lens group at the telephoto end.

Given the paraxial arrangement determined by the aforesaid condition, it is then possible to determine a thick lens arrangement. First of all, it desired that the first lens group be made up of at least one negative lens and a positive lens.

According to the present invention, the first lens group is basically made up of a set of cemented lens or air-spaced doublet, to which one positive lens is added. Where the telephoto end is set in the telephoto range of the high-magnification zoom lens, it is preferable to use glass having anomalous dispersion because of ease of accommodation to an image pickup device having much more pixels than ever before.

It is desired that the second lens group be made up of at least two negative lenses and one positive lens.

According to the present invention, it is intended to achieve significant size reductions by increasing the power of the second lens group, as can be seen from condition (2). It is thus desired that the second lens group be made up of, in order from its object side, a negative meniscus lens, a double-concave negative lens, a positive lens and a negative lens.

According to the characteristic lens arrangement of the present invention, the constructions of the third and fourth lens groups are simplified to significantly reduce the size of the zoom lens system. That is, the third lens group may be constructed of one positive lens; the simpler the lens arrangement, the more favorably significant size reductions are achieved. It is here understood that the lens arrangement becomes more complicated with increasing magnification. The third lens group having positive refracting power should be a positive lens if it is composed of one lens. When an aperture stop is located adjacent to the third lens group, a deeper significance is attached to correction of axial aberrations rather than off-axis aberrations. Spherical aberrations are susceptible to undercorrection only by use of one positive lens. To correct them, it is effective to use one or two aspherical surfaces on the positive lens. It is here important to understand the fact that the action of the aspherical surface varies depending on the balance of correction of aberrations rather than to define the shape thereof, because the aspherical surface is regarded as one element of the zoom lens system. If, in this case, importance is placed on correction of longitudinal spherical aberration, the aspherical surface should then be designed in such a way that the power of the lens decreases gradually from its center to its periphery. In some cases, the aspherical surface may have a point of inflection although depending on the balance of off-axis aberrations. Alternatively, the third lens group may be made up of two positive lenses or a cemented lens.

The fourth lens group is constructed of one negative lens. Since the fourth lens group is a negative group, it is desired to use a single lens therein if size reductions are intended. This lens plays a particularly important role in correction of off-axis aberrations rather than in zooming. This will be apparent from in what state light rays pass through the lens system. Alternatively, the fourth lens group may be made up of one negative lens and a negative lens having extremely limited power.

It is desired that the fifth lens group be made up of at least one positive lens and one negative lens.

It is also desired that the fifth lens group be made up of a cemented lens or air-spaced doublet consisting of at least one positive lens and a negative lens.

Preferably, at least one aspherical surface should be used in the second lens group.

By using at least one aspherical surface in the second lens group, distortion and coma can be easily corrected. It is particularly preferable to use the aspherical surface at the first surface of the negative meniscus lens because the balance between distortion and coma can be corrected in a relatively easy manner.

Preferably, at least one aspherical surface should be used in the third lens group.

When at least one aspherical surface is used in the third lens group, spherical aberrations can be very easily corrected.

Preferably, at least one aspherical surface should be used in the fourth lens group.

If at least one aspherical surface is used in the fourth lens group, it is then possible to make correction for delicate field curvature.

Preferably, at least one aspherical surface should be used in the fifth lens group.

If at least one aspherical surface is used in the fifth lens group, it is then possible to achieve an optical system wherein the quantity of ambient light is maintained while a certain degree of telecentric nature is kept.

In the present invention, the first to fifth lens groups are all moving during zooming. The first and third lens groups move toward the object side in the process of zooming from the wide-angle end to the telephoto end. At least the fourth lens group or the fifth lens group is so designed to move nonlinearly that fluctuations of an image plane position with zooming can be compensated for.

In the present invention, the first and third lens groups move almost linearly for zooming. Referring here to the magnification of other lens groups except for the fourth lens group, the absolute value of the magnification increases in the direction of a doubling, generally in terms of movement from the wide-angle end to the telephoto end. This in turn makes more efficient zooming possible.

Focusing is now explained. In view of size, fluctuations of aberrations, etc., it is not practical to apply to a wide-angle yet high-magnification zoom lens system such as one contemplated herein a first lens group-moving focusing mode used for past zoom lenses. In other words, it is preferable to rely on a focusing mode wherein both the first lens group and the second lens group are moved. In view of the fluctuations of aberrations, it is acceptable to move the second lens group or the like for close-up purposes. Focusing may also be carried out by the movement of at least one lens group located in the rear of the third lens group.

According to the first embodiment of the present invention, there is provided a zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, characterized in that:

for zooming from a wide-angle end to a telephoto end of said zoom lens system, a spacing between said first lens group and said second lens group and a spacing between said third lens group and said fourth lens group become wide and a spacing between said second lens group and said third lens group and a spacing between said fourth lens group and said fifth lens group become narrow, and said zoom lens system is focused on a finite object by moving said third lens group or a lens or lenses therein.

In this focusing mode wherein the third lens group is moved, the paraxial layout of the focusing group changes depending on the zooming position, and varies in the amount of focusing with respect to the same distance. In the third lens group having positive refracting power, both the third-order spherical aberration coefficient and the third-order astigmatism coefficient are under, and so fluctuations of aberrations at each lens group with focusing on a finite object correlate substantially with changes in the aberration coefficients. For instance, when the third lens group in the present invention is focused from infinity on a 1.5 m point, such third-order aberration coefficients as set out below are obtained with respect to the lens groups of Example 10 given later.

| OBJECT AT INFINITY | | | | | |
|---|---|---|---|---|---|
| Lens Group | SA3 | CM3 | AS3 | DT3 | PZ3 |
| G1 | −0.1397 | 0.6038 | −0.3400 | 0.6179 | −0.04904 |
| G2 | 0.2336 | −0.1638 | 0.3705 | −0.3128 | 0.2480 |
| G3 | −0.2532 | −0.8800 | −0.2133 | −0.0434 | −0.1390 |
| G4 | 0.0764 | 0.2352 | 0.1973 | 0.3777 | 0.0697 |
| G5 | 0.0357 | 0.2906 | 0.0031 | −0.3438 | −0.1419 |
| Σ | −0.0472 | 0.0858 | 0.0175 | 0.2956 | −0.01226 |

| Lens Group | PAC | PLC |
|---|---|---|
| G1 | −0.0424 | 0.03902 |
| G2 | 0.0771 | −0.0706 |
| G3 | −0.1909 | −0.0106 |
| G4 | 0.1400 | 0.0993 |
| G5 | 0.0069 | −0.0240 |
| Σ | −0.0093 | 0.0333 |

| 1.5 m | | | | | |
|---|---|---|---|---|---|
| Lens Group | SA3 | CM3 | AS3 | DT3 | PZ3 |
| G1 | −0.0379 | 0.2277 | −0.2165 | 0.7106 | −0.0466 |
| G2 | 0.1120 | 0.1272 | 0.3001 | −0.3842 | 0.2355 |
| G3 | −0.2032 | −0.8444 | −0.2697 | −0.1496 | −0.1320 |
| G4 | 0.0654 | 0.2185 | 0.1921 | 0.3984 | 0.0662 |
| G5 | 0.03062 | 0.2651 | 0.0087 | −0.3476 | −0.1348 |
| Σ | −0.0330 | −0.0059 | 0.0146 | 0.2276 | −0.0116 |

| Lens Group | PAC | PLC |
|---|---|---|
| G1 | −0.0232 | 0.0345 |
| G2 | 0.0424 | −0.0620 |
| G3 | −0.1762 | −0.0326 |
| G4 | 0.1329 | 0.1037 |
| G5 | 0.0065 | −0.0237 |
| Σ | −0.0176 | 0.0199 |

Here SA3, CM3, AS3, DT3, PZ3, PAC, and PLC represent the spherical aberration coefficient, coma coefficient, astigmatism coefficient, distortion coefficient, field curvature coefficient, chromatic-aberration-of-magnification coefficient, and longitudinal chromatic aberration coefficient, respectively.

In this embodiment of the present invention, the fluctuations of aberrations with focusing are greatly stabilized even when the third lens group is composed of a single lens.

The above aberration coefficients imply that the change in performance during focusing is as a whole reduced, although there is a slightly large fluctuation of chromatic aberrations due to the fact that the focusing lens group is composed of a single lens.

According to this first embodiment, it is possible to provide not only a simple high-magnification zoom lens system but also a wide-angle yet high-magnification zoom lens system having a field angle of 70° or greater. It is thus possible to achieve a proper zooming mode together with a suitable power profile and a proper lens arrangement as well as effective use of aspherical surfaces.

According to the second embodiment of the present invention, there is provided a zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, characterized in that:

for zooming from a wide-angle end to a telephoto end of said zoom lens system, a spacing between said first lens group and said second lens group and a spacing between said third lens group and said fourth lens group become wide and a spacing between said second lens group and said third lens group and a spacing between said fourth lens group and said fifth lens group become narrow, and said zoom lens system is focused on a finite object by moving said fourth lens group or a lens or lenses therein.

For instance, when the fourth lens group in this embodiment is focused from infinity on a 2.0 m point, such third-order aberration coefficients as set out below are obtained with respect to the lens groups of Example 13 given later.

| OBJECT AT INFINITY | | | | | |
|---|---|---|---|---|---|
| Lens Group | SA3 | CM3 | AS3 | DT3 | PZ3 |
| G1 | −0.1240 | 0.5024 | −0.2849 | 0.5325 | −0.0495 |
| G2 | 0.4562 | −0.2930 | 0.3107 | −0.3128 | 0.2334 |
| G3 | −0.8298 | −1.0553 | −0.2102 | −0.0322 | −0.1382 |
| G4 | 0.7088 | 1.9160 | 0.8415 | 1.2460 | 0.1546 |
| G5 | −0.2163 | −0.9878 | −0.6405 | −1.2929 | −0.2128 |
| Σ | −0.0050 | 0.0823 | 0.0166 | 0.1406 | −0.0126 |

| Lens Group | PAC | PLC |
|---|---|---|
| G1 | −0.0278 | 0.0227 |
| G2 | 0.0325 | −0.0865 |
| G3 | −0.1913 | −0.0081 |
| G4 | 0.2890 | 0.2218 |
| G5 | −0.1059 | −0.1036 |
| Σ | −0.0035 | 0.0464 |

| 2.0 | | | | | |
|---|---|---|---|---|---|
| Lens Group | SA3 | CM3 | AS3 | DT3 | PZ3 |
| G1 | −0.0699 | 0.3286 | −0.2542 | 0.6878 | −0.0587 |
| G2 | 0.3550 | −0.0786 | 0.3210 | −0.4226 | 0.2766 |
| G3 | −0.8092 | −1.2274 | −0.2547 | −0.0451 | −0.1638 |
| G4 | 0.8766 | 2.6300 | 1.1624 | 1.6708 | 0.1832 |
| G5 | −0.3601 | −1.5939 | −0.9490 | −1.8293 | −0.2522 |
| Σ | −0.0075 | 0.0587 | 0.0255 | 0.0615 | −0.0149 |

| Lens Group | PAC | PLC |
|---|---|---|
| G1 | −0.0195 | 0.0212 |
| G2 | 0.0126 | −0.0797 |
| G3 | −0.1621 | −0.0079 |
| G4 | 0.2902 | 0.2250 |
| G5 | −0.1255 | −0.1275 |
| Σ | −0.0042 | 0.0311 |

Set out in the above tables are the third-order aberration coefficients for Example 13 at its telephoto end at infinity and a finite point (2.0 m) when focusing is carried out by the movement of the fourth lens group. In this focusing mode, the fourth lens group is moved out, as mentioned just above. The movement of the fourth lens group produces a large benefit since the fourth and fifth lens groups are close to each other at the telephoto end. With this embodiment of the present invention, a very favorable focusing mechanism is achieved because the fourth lens group is composed of a single lens. The fluctuations of the third-order aberration coefficients with focusing are in such a direction as to reduce pin-cushion distortion at a finite distance. The fluctuations of aberrations are also very limited. In addition, the fluctuations of aberrations must be evaluated because there is actually some margin in the axial spacing between the third lens group and the fourth lens group. With this focusing mode, however, the near-by distance can be reduced.

For the focusing mode using a single lens, however, it is necessary to make evaluation of actual aberrations because the chromatic aberration of magnification actually includes higher-order components. To make better correction of the chromatic aberration of magnification, indeed, it is preferable to correct chromatic aberrations in the fourth lens group and construct the fourth lens group of a cemented lens, a doublet having an air space or the like.

According to the third embodiment of the present invention, there is provided a zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, characterized in that:

for zooming from a wide-angle end to a telephoto end of said zoom lens system, a spacing between said first lens group and said second lens group and a spacing between said third lens group and said fourth lens group become wide and a spacing between said second lens group and said third lens group and a spacing between said fourth lens group and said fifth lens group become narrow, and said zoom lens system is focused on a finite object by moving said fifth lens group or a lens or lenses therein.

For instance, when the fifth lens group in this embodiment is focused from infinity on a 2.0 m point, such third-order aberration coefficients as set out below are obtained.

| OBJECT AT INFINITY | | | | | |
|---|---|---|---|---|---|
| Lens Group | SA3 | CM3 | AS3 | DT3 | PZ3 |
| G1 | −0.0995 | 0.4560 | −0.2811 | 0.5593 | −0.0461 |
| G2 | 0.2809 | −0.2434 | 0.2636 | −0.2942 | 0.2226 |
| G3 | −0.5379 | −1.0011 | −0.2182 | −0.0392 | −0.1444 |
| G4 | 0.4549 | 1.3168 | 0.6370 | 0.9433 | 0.1365 |
| G5 | −0.1193 | −0.4822 | −0.3941 | −0.9673 | −0.1812 |
| Σ | −0.0209 | 0.0462 | 0.0082 | 0.2019 | −0.0126 |

| Lens Group | PAC | PLC |
|---|---|---|
| G1 | −0.0362 | 0.0344 |
| G2 | 0.0636 | −0.0910 |
| G3 | −0.2321 | −0.0118 |
| G4 | 0.2342 | 0.1634 |
| G5 | −0.0428 | −0.0616 |
| Σ | −0.0132 | 0.0334 |

| 2.0 m | | | | | |
|---|---|---|---|---|---|
| Lens Group | SA3 | CM3 | AS3 | DT3 | PZ3 |
| G1 | −0.0522 | 0.2881 | −0.2525 | 0.7518 | −0.0559 |
| G2 | 0.2070 | −0.0721 | 0.2774 | −0.4170 | 0.2697 |
| G3 | −0.5439 | −1.1729 | −0.2713 | −0.0577 | −0.1749 |
| G4 | 0.5360 | 1.8997 | 0.9671 | 1.5058 | 0.1655 |
| G5 | −0.1851 | −0.9374 | −0.7176 | −1.7262 | −0.2196 |
| Σ | −0.0381 | 0.0055 | 0.0031 | 0.0567 | −0.0152 |

| Lens Group | PAC | PLC |
|---|---|---|
| G1 | −0.0242 | 0.0315 |
| G2 | 0.0375 | −0.0832 |
| G3 | −0.1922 | −0.0116 |
| G4 | 0.2202 | 0.1752 |
| G5 | −0.0528 | −0.0720 |
| Σ | −0.0114 | 0.03882 |

The aforesaid tables show the case where focusing is carried out by moving the fifth lens group. However, this focusing mode, when carried out by the fifth lens group alone, is not suitable for a long exit pupil distance. In this case, the fifth lens group is divided into two subgroups.

During zooming, these subgroups are floating with respect to each other, so that actual correction of aberrations can be more effectively made at each zooming position. In this embodiment, some fluctuations of spherical aberrations are found, and the third-order spherical aberration coefficients and coma coefficients are slightly larger as compared with the former two embodiments. However, if these subgroups are made up of a cemented lens, chromatic aberrations can then be corrected at the fifth lens group itself, and so no significant problem arises.

The mechanism for compensating for an image movement by camera shake or movement is now explained.

According to the present invention, the displacement of the image-formation point of the zoom lens system may be compensated for by moving the second lens group in a direction almost vertical to the optical axis, moving the third lens group in a direction almost vertical to the optical axis, moving the fourth lens group in a direction almost vertical to the optical axis, or moving the fifth lens group in a direction almost vertical to the optical axis.

In any case, the magnification of each moving lens group varies at each zooming point with a variation in the amount of vertical movement of each lens group with respect to the optical axis for the purpose of compensating for an image movement on an image-formation plane. It is here understood that for control of movement of each lens group, that movement should preferably be as simple as possible. There is also proposed a method for compensating for the image movement by providing an additional lens element to the zoom lens system. However, this method is not preferred because the size of the optical system becomes large. In the examples given later, the third or fourth lens group is composed of a single lens, so that the amount of aberrations remaining in the lens group can be further reduced, thereby inhibiting fluctuations of aberrations with the movement of the lens group. When chromatic aberrations out of off-axis aberrations should be corrected as much as possible, it is often desired to make correction for aberrations with a plurality of lens groups.

In the present invention, the second lens group has large power and high image-formation magnification. Accordingly, when the image moves on the image plane by camera movement or the like, the amount of shifting of the second lens group to compensate for this becomes small. On the other hand, the fourth lens group has large power and relatively low magnification. In this case, the amount of shifting of the lens group becomes large. In consideration of image-formation magnification, the longer the focal length, the larger the amount of image movement on the telephoto side becomes even at the same amount of camera movement, resulting in an increase in the amount of shifting.

In the examples given later, when the whole camera shakes with the zoom lens system, a specific lens group is allowed to move in a direction almost vertical with respect to the optical axis, thereby compensating for the resulting image deterioration. It is here noted that the amount of this compensation should be properly preset. Care must be taken to be sure that this amount does not exceed the required amount, because the image-formation capability in the standard state may otherwise become low. In most of the examples given later, the amount of shifting with respect to camera movement assumed to be about 0.5° is referred to.

In the zoom lens system of the present invention, too, it is desired to satisfy the aforesaid conditions (1) to (9).

Examples 1 to 17 of the zoom lens system according to the present invention are now explained. FIGS. 1 to 17 are illustrative in section of the lens arrangements of Examples 1 to 17 at their wide-angle ends (a), intermediate settings (b) and telephoto ends (c). Numerical data on each example will be set out later.

EXAMPLE 1

Figure 1B:
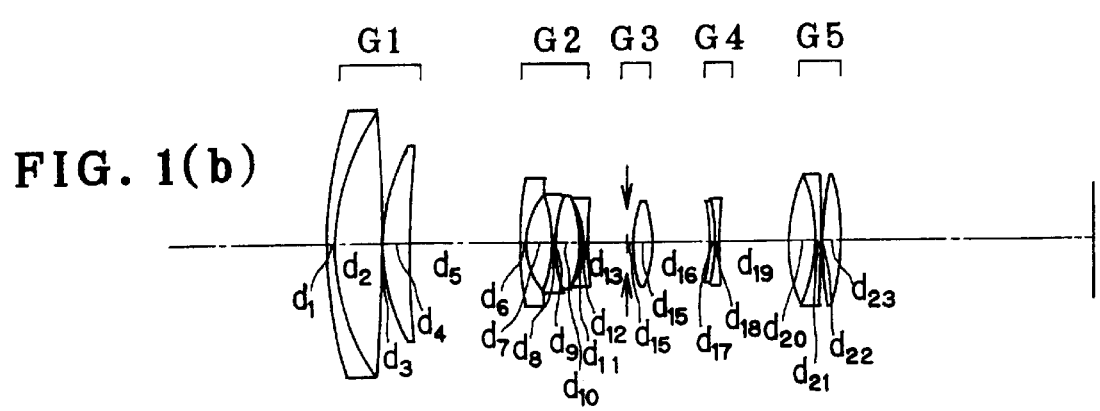
Figure 1C:
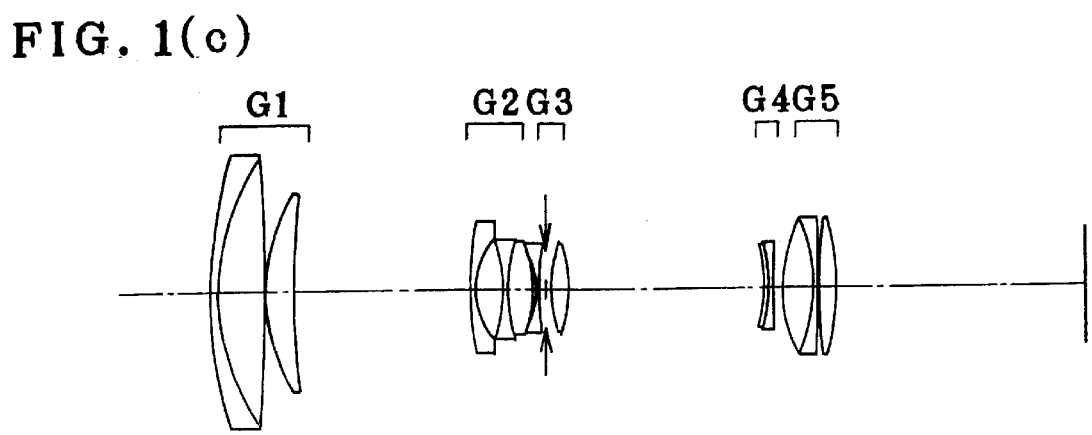

Example 1 is directed to a wide-angle zoom lens system having a focal length of 14.36 to 140.5 mm and an F-number of 3.85 to 4.53. For zooming from the wide-angle end to the telephoto end of the system, the first lens group G1 moves toward the object side of the system, as shown in FIG. 1. The second lens group G2 moves slightly. The third lens group G3 moves together with an aperture stop toward the object side. The fourth lens group G4 moves back toward the image side of the system with respect to the wide-angle end position. The fifth lens group G5 moves nonlinearly, unlike that of a conventional zoom lens system for silver salt film cameras.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than on an object side thereof, a double-concave lens, a slight air lens, a double-convex lens and a double-concave lens. The third lens group G3 is made up of an aperture stop and a double-convex lens contiguous thereto. The fourth lens group G4 is made up of a cemented lens consisting of two negative lenses; one being a negative meniscus lens having a strong curvature on an object side thereof and another being a double-concave lens. The fifth lens group G5 is made up of a cemented lens consisting of a double-convex lens and a negative meniscus lens and a double-convex lens.

By use of two aspherical surfaces, one at the first surface of the first lens in the second lens group G2 and another at the object-side surface of the second lens therein, correction of distortion can be well balanced with respect to correction of coma. The use of such aspherical surfaces produces a marked effect especially because the wider the wide-angle arrangement of the system, the more difficult it is to correct distortion. An aspherical surface used at the object-side surface of the double-convex lens in the third lens group G3 enables spherical aberrations to be well corrected. Aspherical surfaces used at both surfaces of the double-convex lens located nearest to the image side in the fifth lens group G5 produce an effect so marked that off-axis aberrations can be corrected while a telecentric nature is imparted to the system. Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

EXAMPLE 2

Example 2 is directed to a wide-angle zoom lens system having a focal length of 14.36 to 140.5 mm and an F-number of 3.58 to 4.63. The specification is much the same as in Example 1 except that the fourth lens group G4 is made up of a single lens. For zooming from the wide-angle end to the telephoto end of the system, the first lens group G1 moves toward the object side of the system, as shown in FIG. 2. The second lens group G2 moves slightly. The third lens group G3 moves together with an aperture stop toward the object side. The fourth lens group G4 moves back toward the image side of the system with respect to the wide-angle end position. The fifth lens group G5 moves nonlinearly.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than on an object side thereof, a double-concave lens, a slight air lens, a double-convex lens and a double-concave lens. The third lens group G3 is made up of an aperture stop and a double-convex lens contiguous thereto. The fourth lens group G4 is made up of one double-concave lens. The fifth lens group G5 is made up of a cemented lens consisting of a double-convex lens and a negative meniscus lens and a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

The zoom lens system according to Example 1, and Example 2 has a field angle of 70° or greater at the wide-angle end and a zoom ratio of about 10 while a certain telecentric nature is imparted thereto. The potential image-formation capability of these systems is very excellent. If the focal length on the telephoto end side is increased, the zoom ratio can then be enlarged with relative ease.

EXAMPLE 3

Figure 3A:
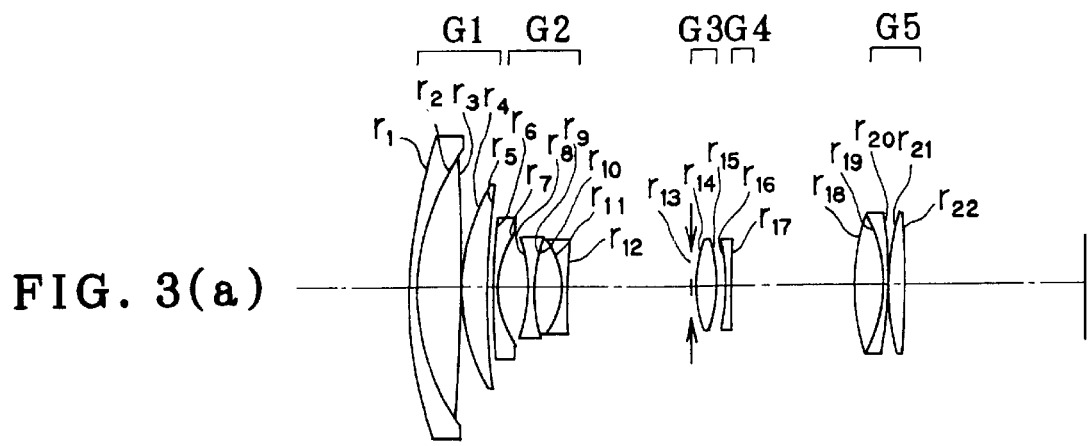
FIG. 3 is illustrative in section of Example 3 of the present zoom lens system in similar states as in FIG. 1.
Figure 3B:
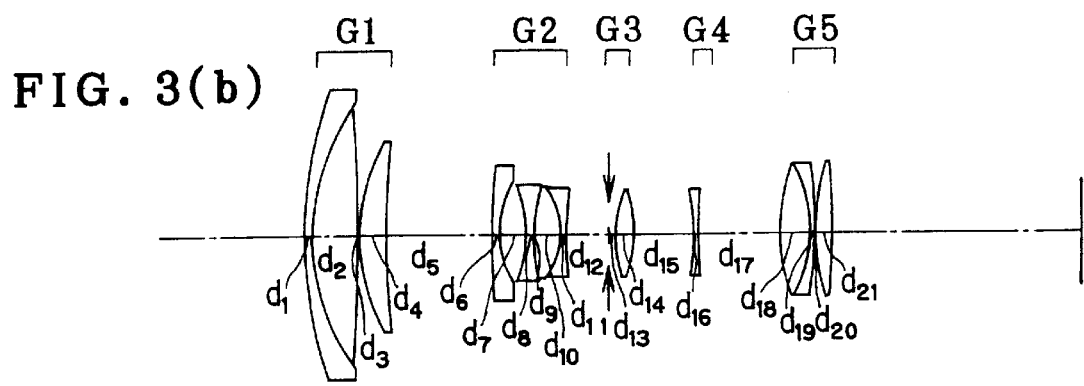
Figure 3C:
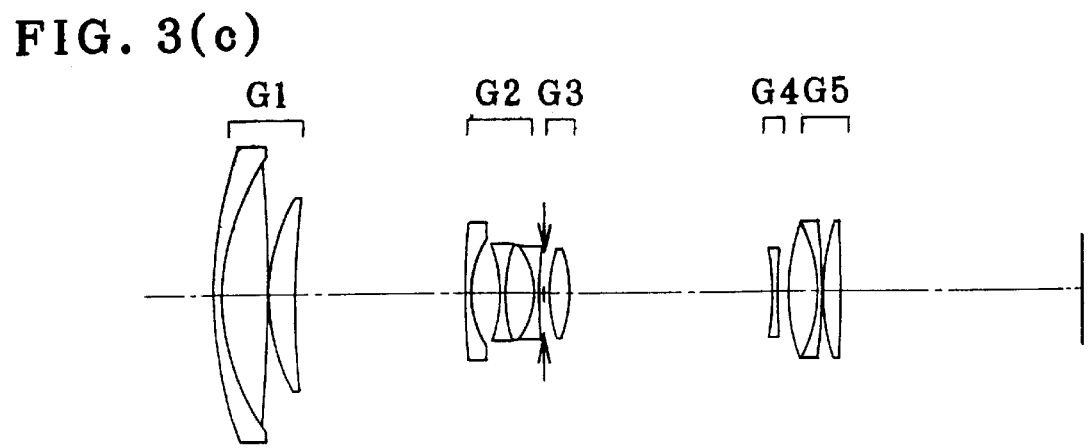

Example 3 is directed to a wide-angle zoom lens system having a focal length of 14.36 to 140.5 mm and an F-number of 3.67 to 4.4. For zooming from the wide-angle end to the telephoto end of the system, the first lens group G1 moves toward the object side of the system, as shown in FIG. 3. The second lens group G2 moves slightly. The third lens group G3 moves together with an aperture stop toward the object side. The fourth lens group G4 moves back toward the image side of the system with respect to the wide-angle end position. Th e fifth lens group G5 moves nonlinearly. In the instant example, the third and fourth lenses in the second lens group G2 are defined by a double-convex lens and a double-concave lens, respectively, which are cemented together The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a double-concave lens having a very strong curvature on an image side thereof, a double-concave lens, a slight air lens, and a cemented lens consisting of a double-convex lens and a double-concave lens. The third lens group G3 is made up of an aperture stop and a double-convex lens contiguous thereto. The fourth lens group G4 is made up of one double-concave lens. The fifth lens group G5 is made up of a cemented lens consisting of a double-convex lens and a negative meniscus lens and a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

EXAMPLE 4

Figure 4A:
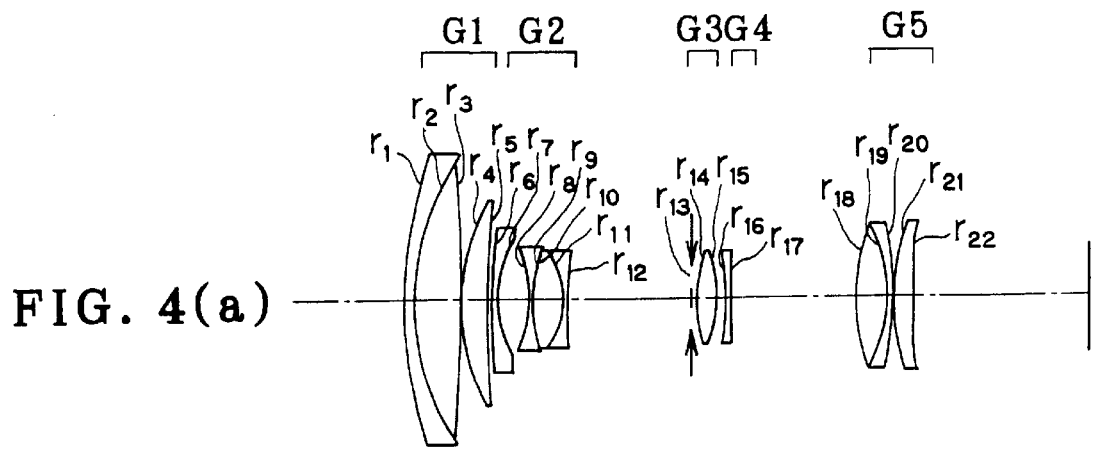
FIG. 4 is illustrative in section of Example 4 of the present zoom lens system in similar states as in FIG. 1.
Figure 4B:
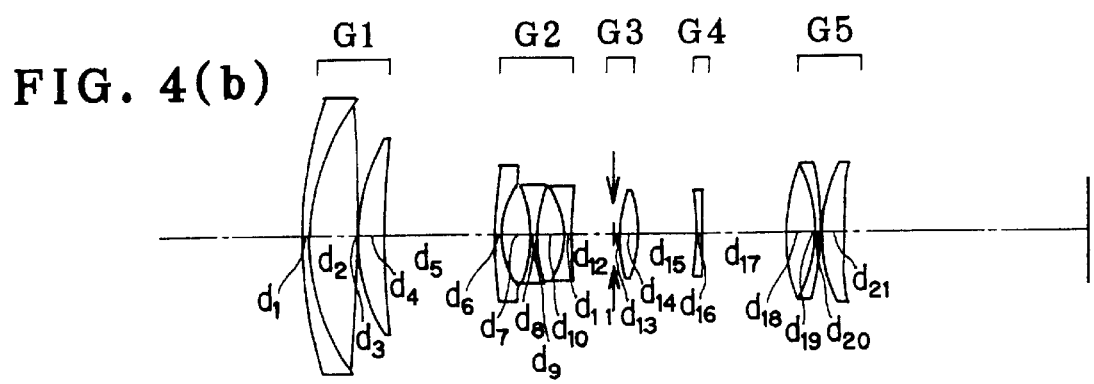
Figure 4C:
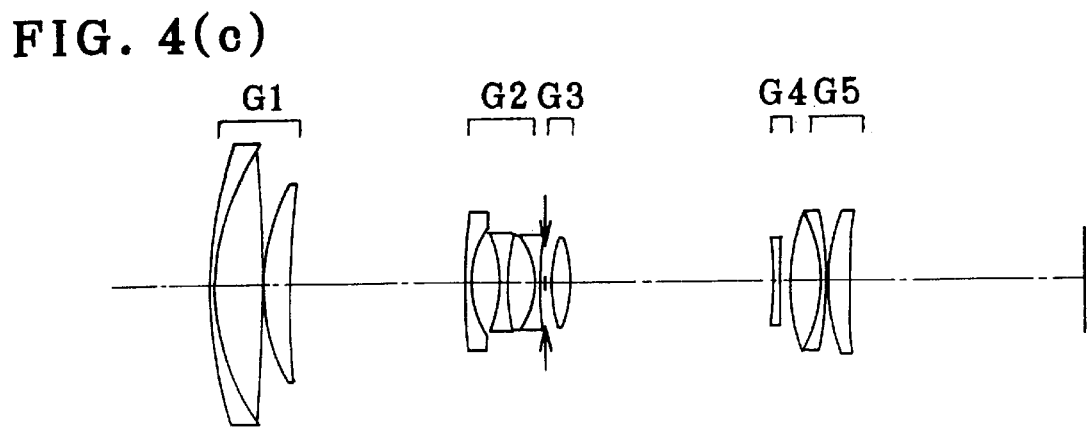

Example 4 is directed to a wide-angle zoom lens system having a focal length of 14.36 to 140.5 mm and an F-number of 3.66 to 4.42. This example is constructed as in Example 3. For zooming from the wide-angle end to the telephoto end of the system, the first lens group G1 moves toward the object side of the system, as shown in FIG. 4. The second lens group G2 moves slightly. The third lens group G3 moves together with an aperture stop toward the object side. The fourth lens group G4 moves back toward the image side of the system with respect to the wide-angle end position. The fifth lens group G5 moves nonlinearly.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a double-concave lens having a very strong curvature on an image side thereof, a double-concave lens, a slight air lens, and a cemented lens consisting of a double-convex lens and a double-concave lens. The third lens group G3 is made up of an aperture stop and a double-convex lens contiguous thereto. The fourth lens group G4 is made up of one double-concave lens. The fifth lens group G5 is made up of a cemented lens consisting of a double-convex lens and a negative meniscus lens and a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

In Examples 3 and 4, the zooming movements of the respective lens groups are relatively limited. By the provision of the cemented lens in the second lens group G2, it is possible to reduce an error in the fabrication and assembly of the air lens. On the other hand, the degree of freedom in Petzval sum control may rather decrease, resulting often in an increase in the thickness of the double-convex lens. The air lens between the second lens and the third lens provides a surface at which high-order aberrations are produced.

EXAMPLE 5

Figure 5A:
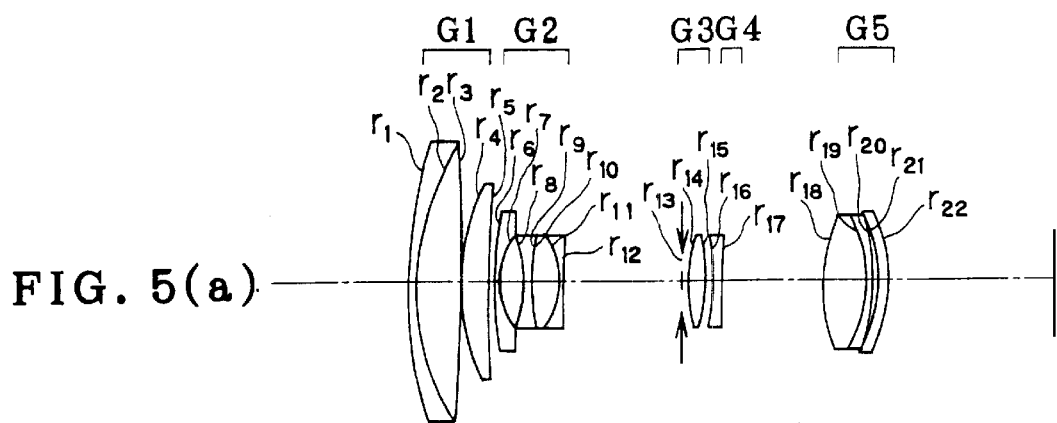
FIG. 5 is illustrative in section of Example 5 of the present zoom lens system in similar states as in FIG. 1.
Figure 5B:
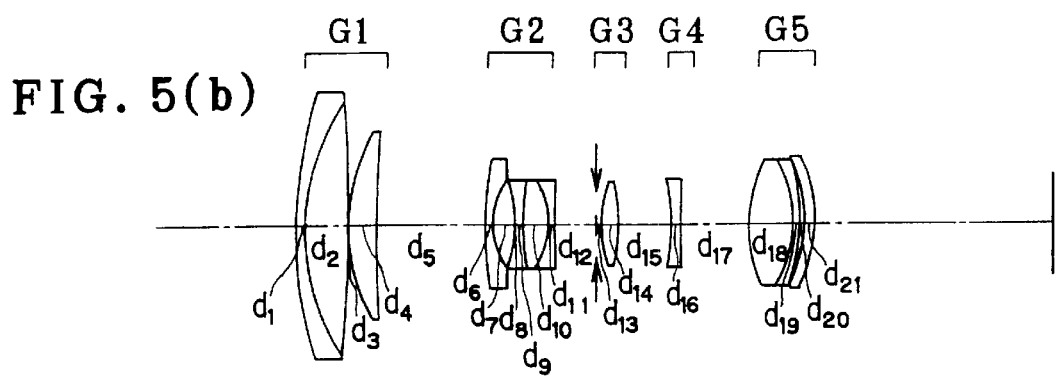
Figure 5C:
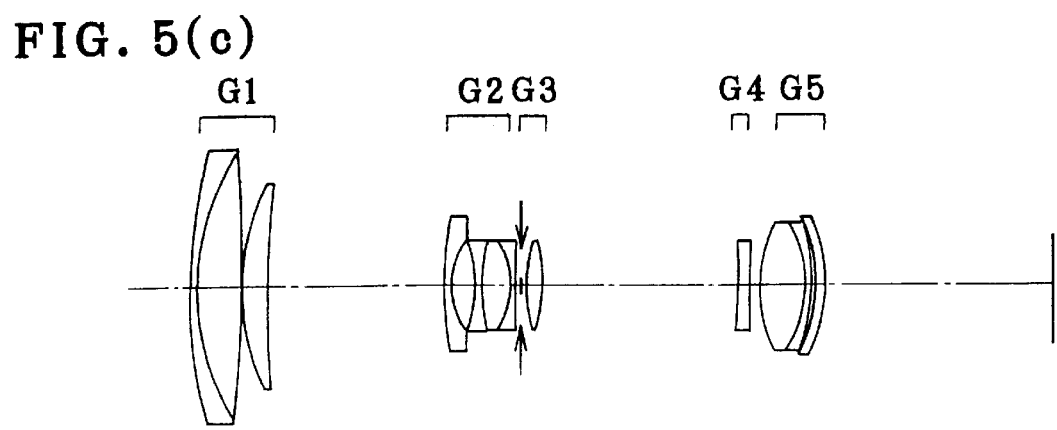

Example 5 is directed to a wide-angle zoom lens system having a focal length of 14.38 to 140.9 mm and an F-number of 3.79 to 4.45. As shown in FIG. 5, the instant lens system is characterized by the construction of the fifth lens group G5, wherein the lens located nearest to an image side thereof is a positive meniscus lens convex on the image side, with aspherical surfaces applied to both its surfaces.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than an object side thereof, a double-concave lens, a slight air lens, and a cemented lens consisting of a double-convex lens and a double-concave lens. The third lens group G3 is made up of an aperture stop and a double-convex lens contiguous thereto. The fourth lens group G4 is made up of one double-concave lens. The fifth lens group G5 is made up of a cemented lens consisting of a double-convex lens and a negative meniscus lens and a positive meniscus lens convex on an image side thereof.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the positive meniscus lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

EXAMPLE 6

Figure 6A:
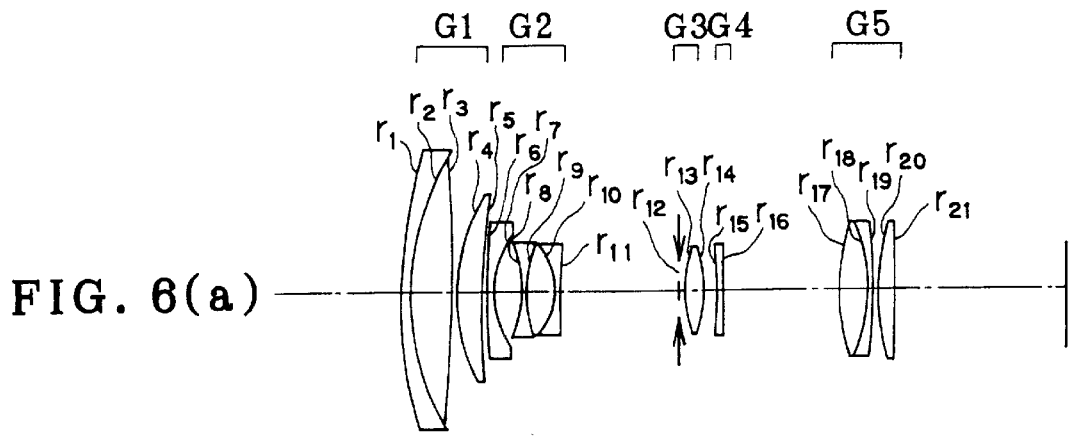
FIG. 6 is illustrative in section of Example 6 of the present zoom lens system in similar states as in FIG. 1.
Figure 6B:
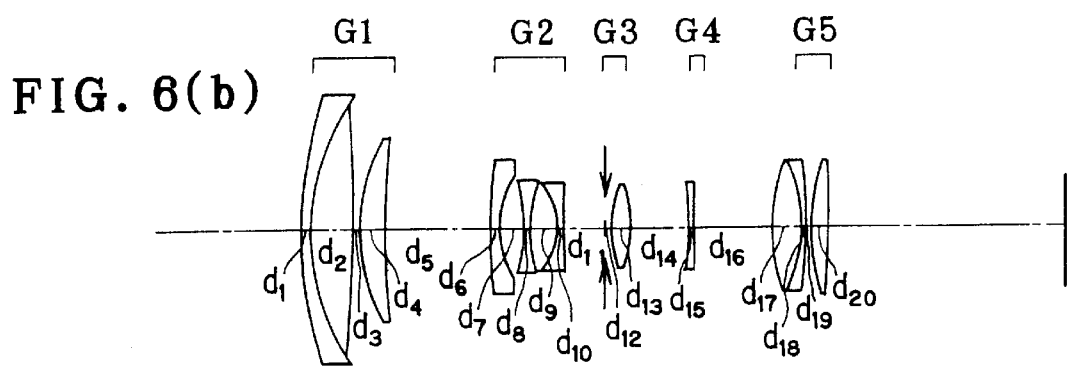
Figure 6C:
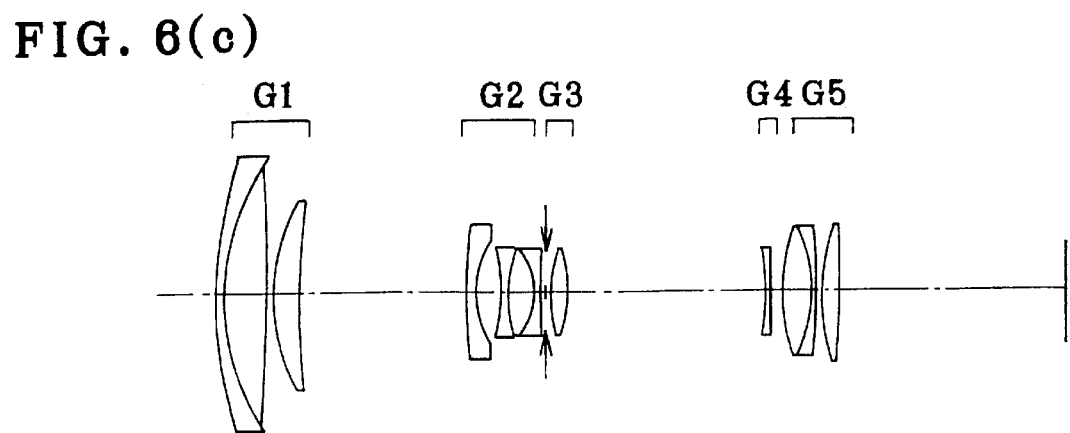

Example 6 is directed to a wide-angle zoom lens system having a focal length of 14.36 to 140.5 mm and an F-number of 3.97 to 4.47. As shown in FIG. 6, the feature of this lens system is that the second, third and fourth lenses in the second lens group G2 are cemented together to form a triplet.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than an object side thereof, and a triplet consisting of a double-concave lens, a double-convex lens and a double-concave lens. The third lens group G3 is made up of an aperture stop and a double-convex lens contiguous thereto. The fourth lens group G4 is made up of one double-concave lens. The fifth lens group G5 is made up of a cemented lens consisting of a double-convex lens and a negative meniscus lens and a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

EXAMPLE 7

Figure 7A:
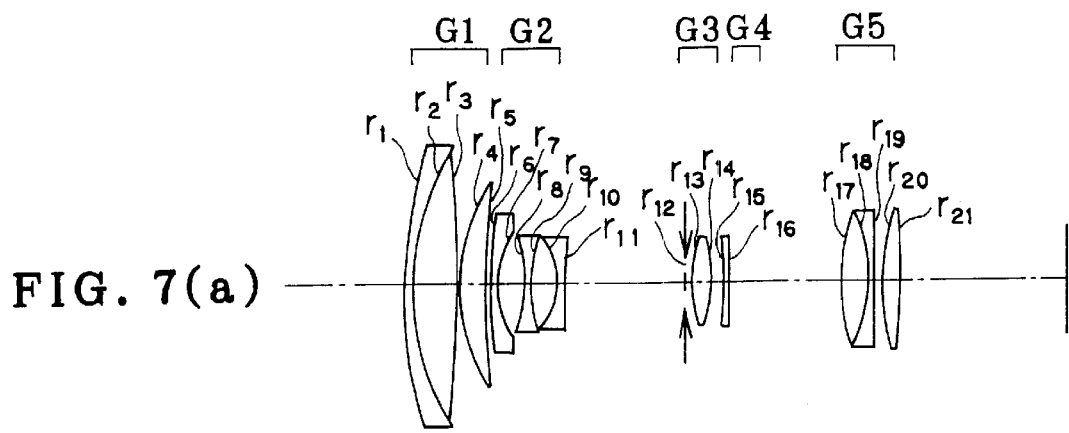
FIG. 7 is illustrative in section of Example 7 of the present zoom lens system in similar states as in FIG. 1.
Figure 7B:
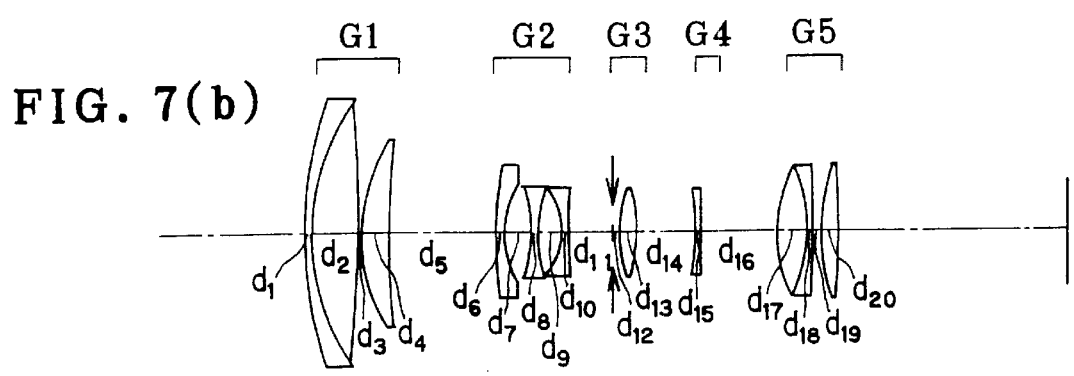
Figure 7C:
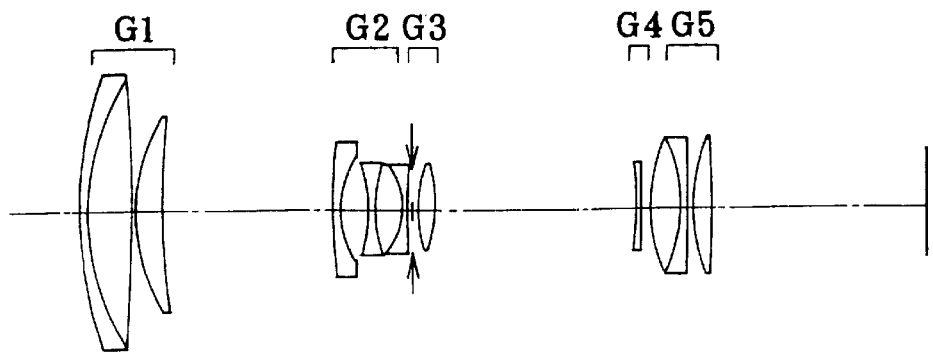

Example 7 is directed to a wide-angle yet high-magnification zoom lens system having a focal length of 14.36 to 140.5 mm and an F-number of 3.8 to 4.5. As shown in FIG. 7, this lens system is made up as in Example 6.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a double-concave lens having a very strong curvature on an image side thereof, and a triplet consisting of a double-concave lens, a double-convex lens and a double-concave lens. The third lens group G3 is made up of an aperture stop and a double-convex lens contiguous thereto. The fourth lens group G4 is made up of one double-concave lens. The fifth lens group G5 is made up of a cemented lens consisting of a double-convex lens and a negative meniscus lens and a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

EXAMPLE 8

Example 8 is directed to a wide-angle yet high-magnification zoom lens system having a focal length of 14.78 to 147.78 mm and an F-number of 3.63 to 4.55.

As shown in FIG. 8, the first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than an object side thereof, a double-concave lens, a slight air lens, a double-convex lens and a double-concave lens. The third lens group G3 is made up of an aperture stop and a double-convex lens contiguous thereto. The fourth lens group G4 is made up of a cemented lens consisting of two negative lenses; one being a negative meniscus lens having a strong curvature on an object side thereof and another being a double-concave lens. The fifth lens group G5 is made up of a cemented lens consisting of a double-convex lens and a negative meniscus lens and a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

EXAMPLE 9

Example 9 is directed to a wide-angle yet high-magnification zoom lens system having a focal length of 14.78 to 150.6 mm and an F-number of 3.64 to 4.94. In this example, an aspherical surface is added to the fourth lens group G4. As shown in FIG. 9, much the same lens arrangement as in Example 1 is used, but with a higher magnification.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than an object side thereof, a double-concave lens, a slight air lens, a double-convex lens and a double-concave lens. The third lens group G3 is made up of an aperture stop and a double-convex lens contiguous thereto. The fourth lens group G4 is made up of a cemented lens consisting of two negative lenses; one being a negative meniscus lens having a strong curvature on an object side thereof and another being a double-concave lens. The fifth lens group G5 is made up of a cemented lens consisting of a double-convex lens and a negative meniscus lens and a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

Upon zooming from the wide-angle end to the telephoto end, the magnification of the second lens group G2 changes from −0.2445 to −0.8156, the magnification of the third lens group G3 changes from −1.1549 to −4.2082, the magnification of the fourth lens group G4 changes from −4.8661 to −0.8128, and the magnification of the fifth lens group G5 changes from −0.15027 to −0.7544.

EXAMPLE 10

Figure 10A:
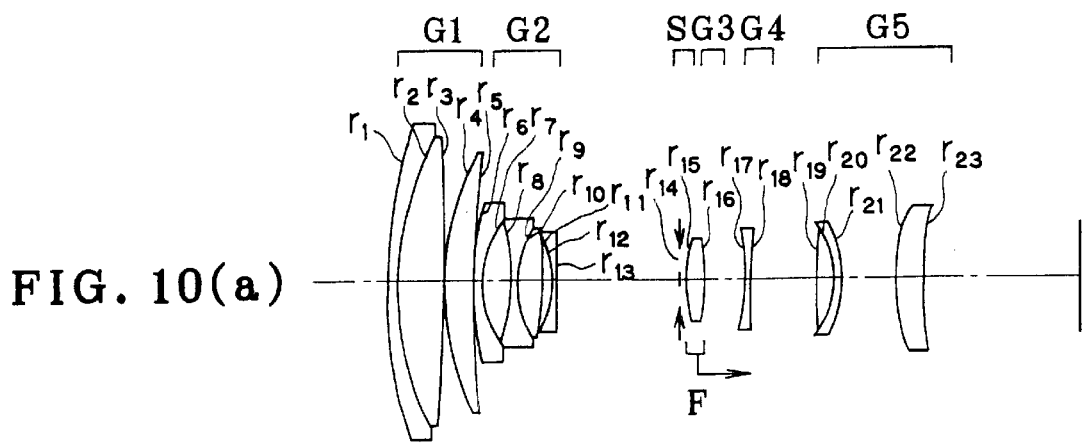
FIG. 10 is illustrative in section of Example 10 of the present zoom lens system in similar states as in FIG. 1.
Figure 10B:
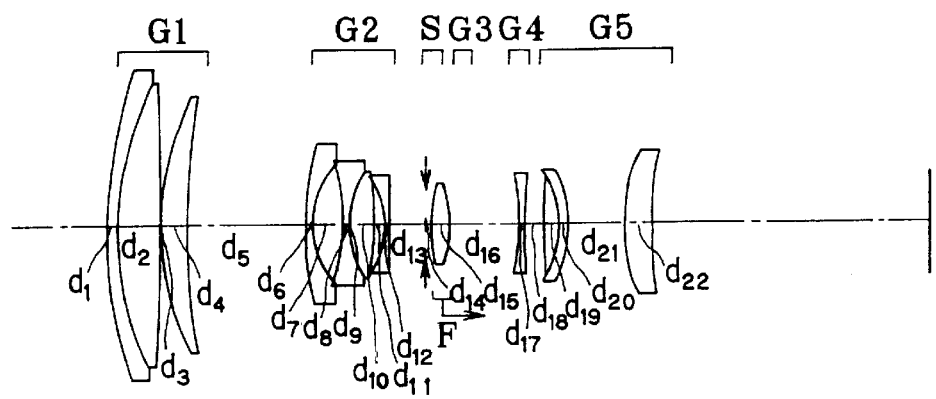
Figure 10C:
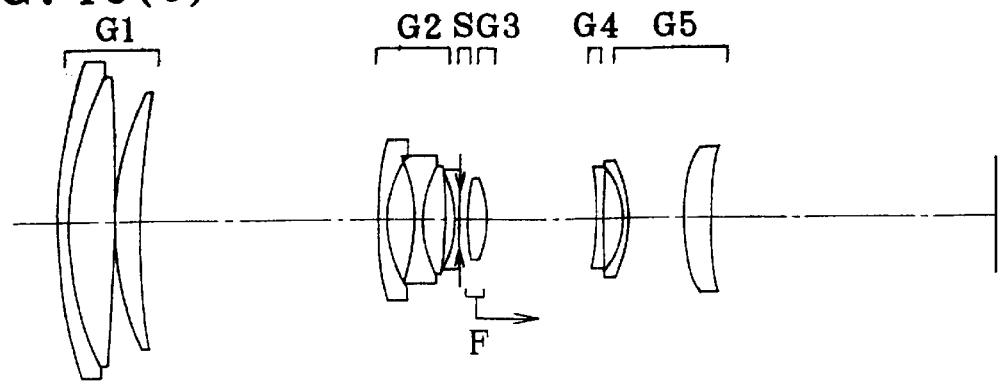

Example 10 is directed to a wide-angle yet high-magnification zoom lens system having a focal length of 14.55 to 140.01 mm and an F-number of 3.6 to 4.41. For zooming from the wide-angle end to the telephoto end of the zoom lens system, the first lens group G1 moves toward the object side of the system, as shown in FIG. 10. The second lens group G2 moves slightly. The third lens group G3 moves together with an aperture stop toward the object side. The fourth and fifth lens groups G4 and G5 move nonlinearly in such a way that the spacing between the third and fourth lens groups G3 and G4 becomes wide and the spacing between the fourth and fifth lens groups G4 and G5 becomes narrow.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. The second lens group G2 is made up of a negative meniscus lens having a very strong curvature on an image side thereof, a double-concave lens, a double-convex lens and a negative meniscus lens having a strong curvature on an object side thereof. The third lens group G3 is made up of an aperture stop S and one double-convex lens contiguous thereto. The fourth lens group G4 is made up of one double-concave lens. The fifth lens group G5 is made up of a cemented lens consisting of a double-convex lens and a negative meniscus lens and a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens located nearest to the image side in the fifth lens group G5.

In this example, the double-convex lens in the third lens group G3 is designed as a focusing unit F to move back.

Figure 27A:
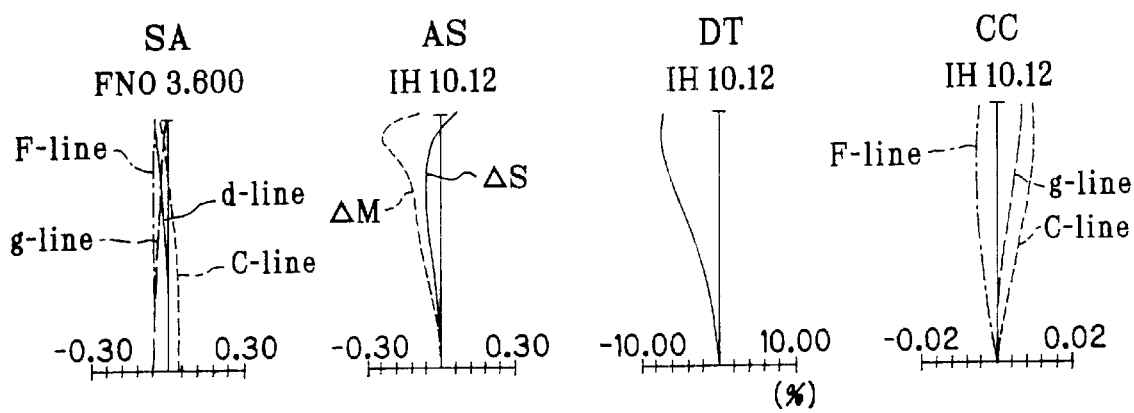
FIG. 27 is an aberration diagram for Example 10 upon focused at infinity.
Figure 27B:
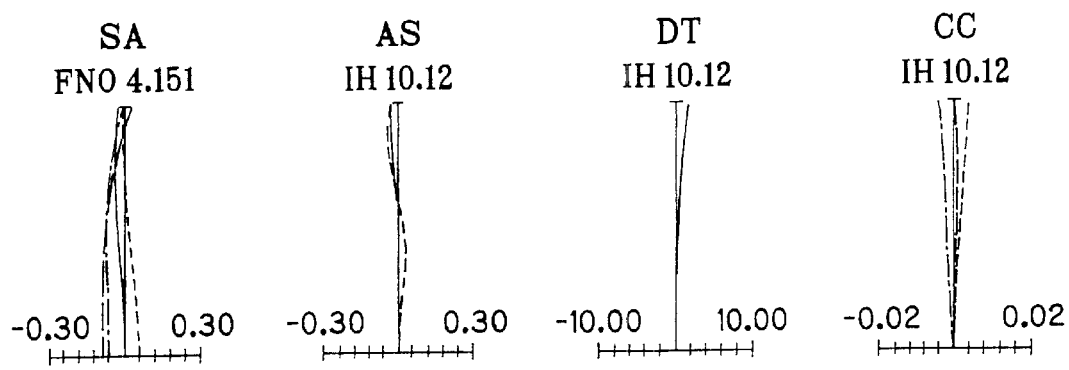
Figure 27C:
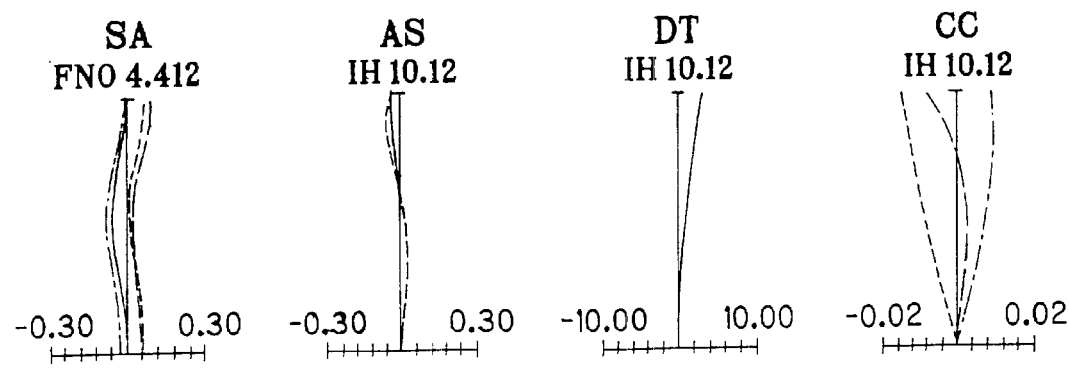
Figure 28A:
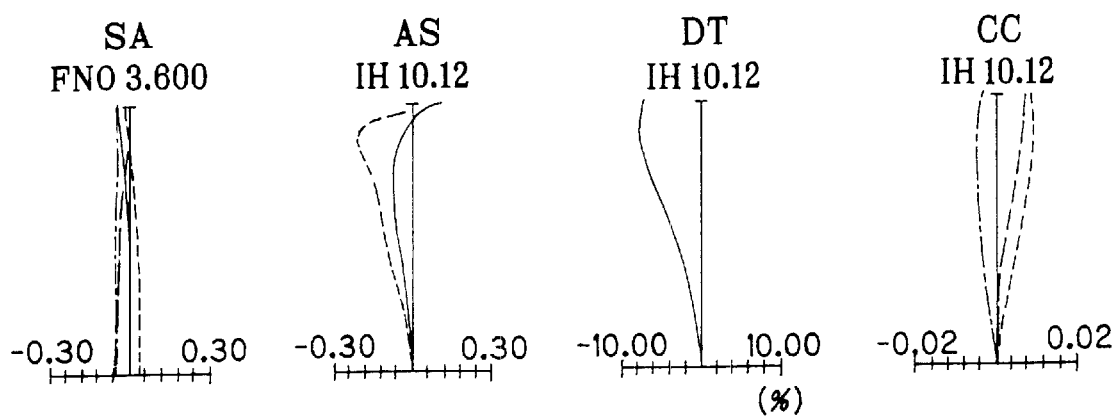
FIG. 28 is an aberration diagram for Example 10 upon focused on a finite point (1.5 m).
Figure 28B:
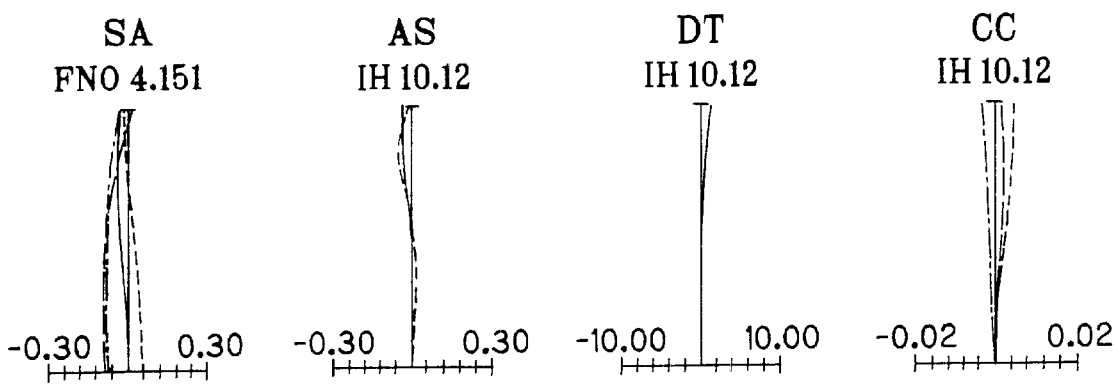
Figure 28C:
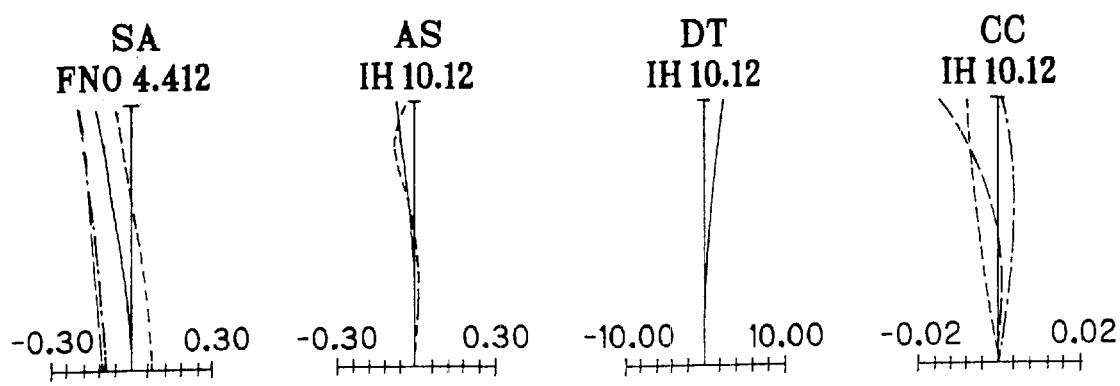

FIG. 27 is an aberration diagram for this example upon focused at infinity, and FIG. 28 is an aberration diagram for this example when the third lens group G3 is focused to 1.5 m. In these aberration diagrams, (a), (b) and (c) represent the wide-angle end, intermediate settings and telephoto end, respectively, and SA, AS, DT and CC stand for spherical aberrations, astigmatism, distortion and chromatic aberration of magnification, respectively, with "IH" representing an image height.

As can be seen from the drawings, fluctuations of aberrations with focusing from infinity to 1.5 m are gentle. Generally preferable results are obtained, although slight fluctuations of spherical aberrations and chromatic aberration of magnification are observed at the telephoto end.

EXAMPLE 11

Example 11 is directed to a wide-angle yet high-magnification zoom lens system having a focal length of 14.55 to 140.01 mm and an F-number of 3.67 to 4.13. This is a reference example wherein the first and second lens groups G1 and G2 are designed as an integral focusing unit F.

Figure 11A:
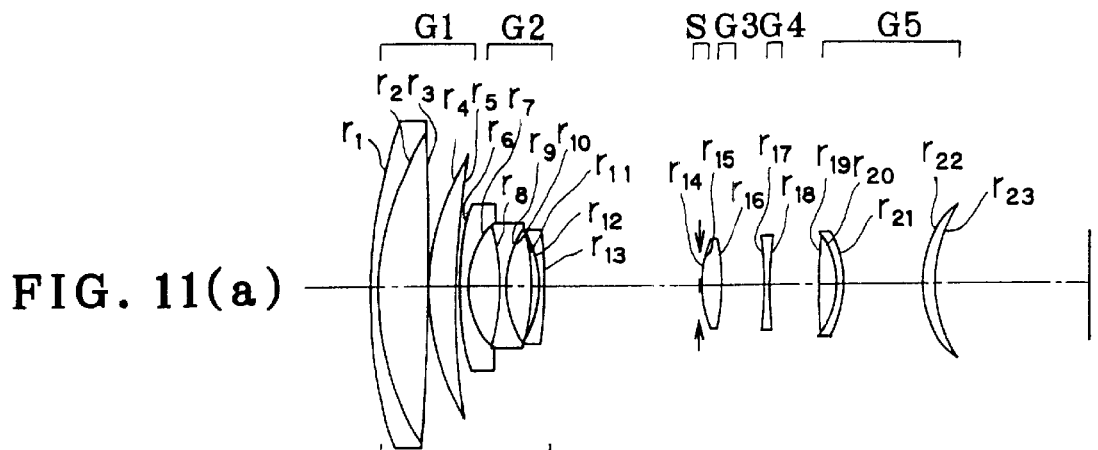
FIG. 11 is illustrative in section of Example 11 of the present zoom lens system in similar states as in FIG. 1.
Figure 11B:
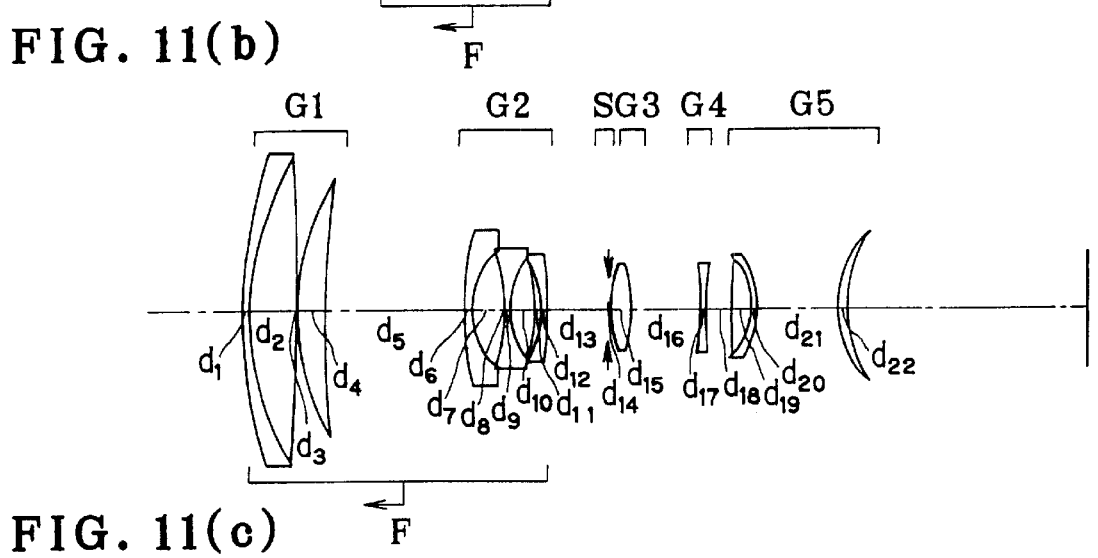
Figure 11C:
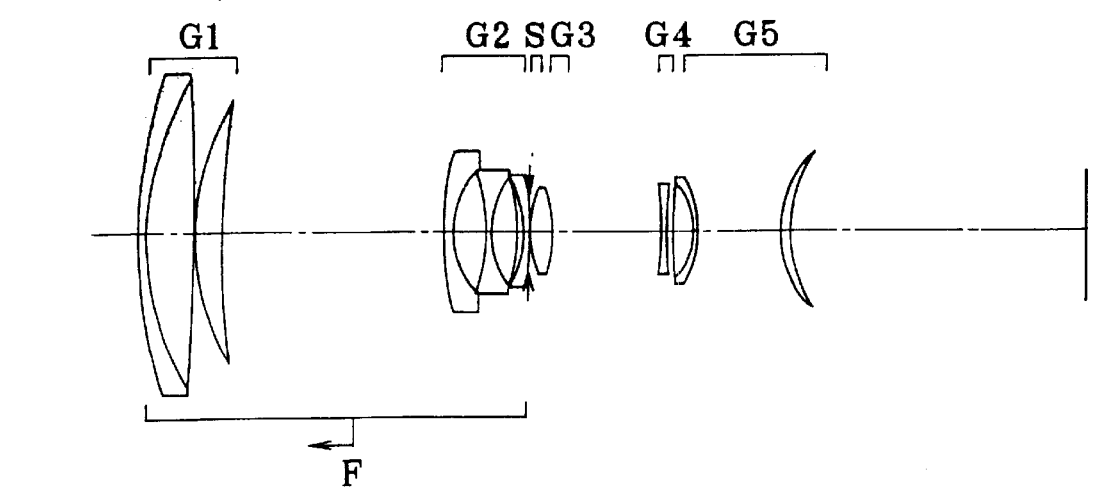

For zooming from the wide-angle end to the telephoto end of the zoom lens system, the first lens group G1 moves toward the object side of the system, as shown in FIG. 11. The second lens group G2 moves slightly. The third lens group G3 moves together with an aperture stop toward the object side. The fourth and fifth lens groups G4 and G5 move nonlinearly in such a way that the spacing between the third and fourth lens groups G3 and G4 becomes wide and the spacing between the fourth and fifth lens groups G4 and G5 becomes narrow.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. The second lens group G2 is made up of a negative meniscus lens having a very strong curvature on an image side thereof, a double-concave lens, a double-convex lens and a negative meniscus lens having a strong curvature on an object side thereof. The third lens group G3 is made up of an aperture stop S and one double-convex lens contiguous thereto. The fourth lens group G4 is made up of one double-concave lens. The fifth lens group G5 is made up of a cemented lens consisting of a double-convex lens and a negative meniscus lens and a positive meniscus lens having a strong curvature on an object side thereof.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the positive meniscus lens located nearest to the image side in the fifth lens group G5.

Figure 29A:
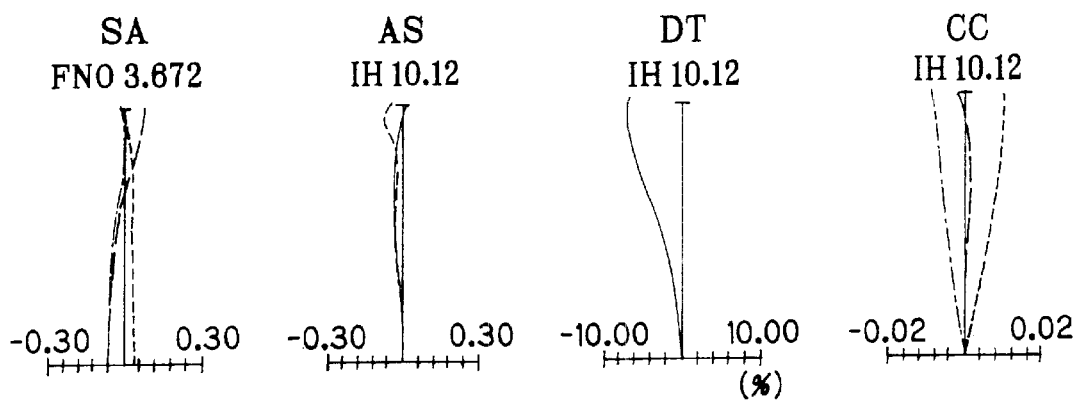
FIG. 29 is an aberration diagram for Example 11 upon focused at infinity.
Figure 29B:
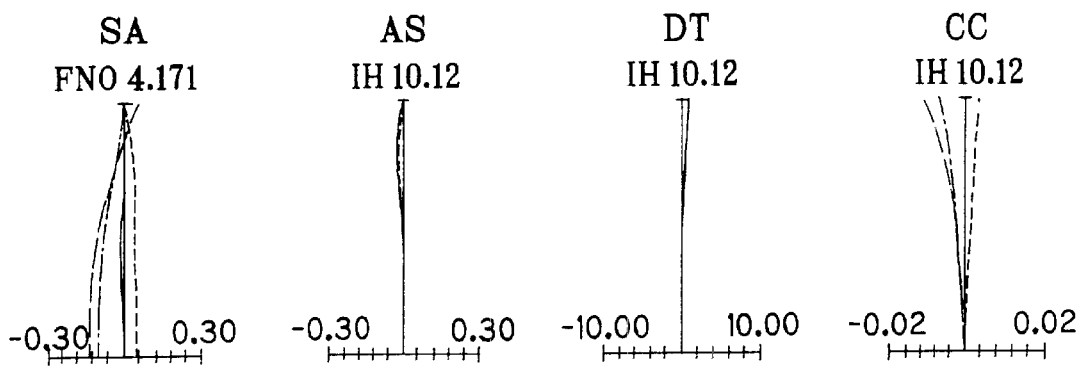
Figure 29C:
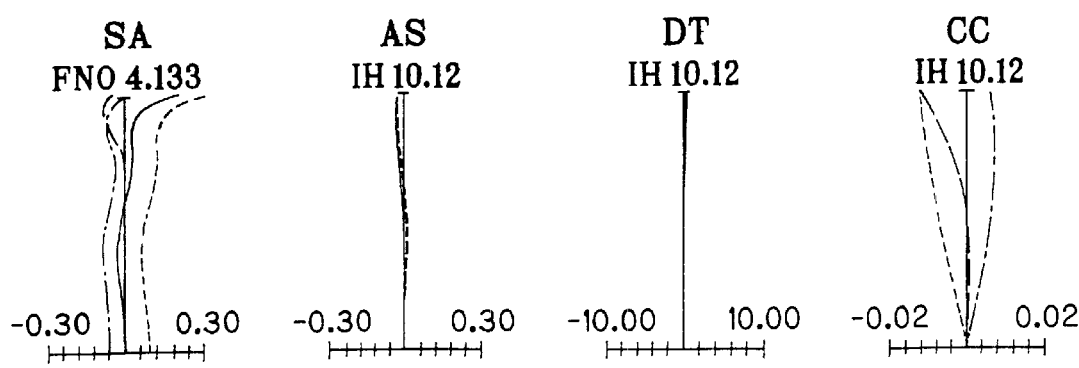
Figure 30A:
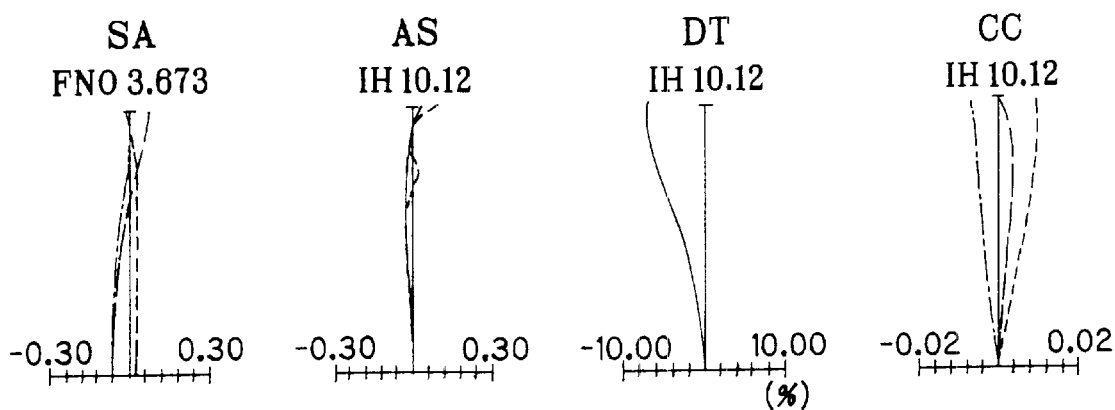
FIG. 30 is an aberration diagram for Example 11 upon focused on a finite point (1.5 m).
Figure 30B:
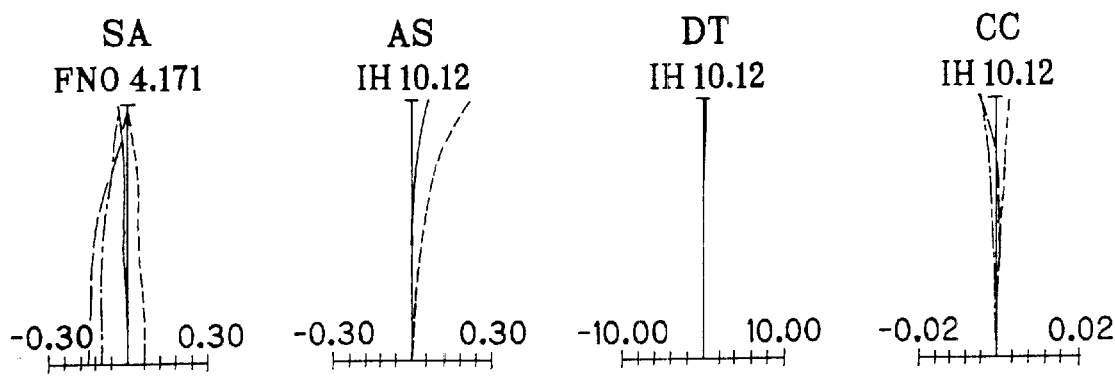
Figure 30C:
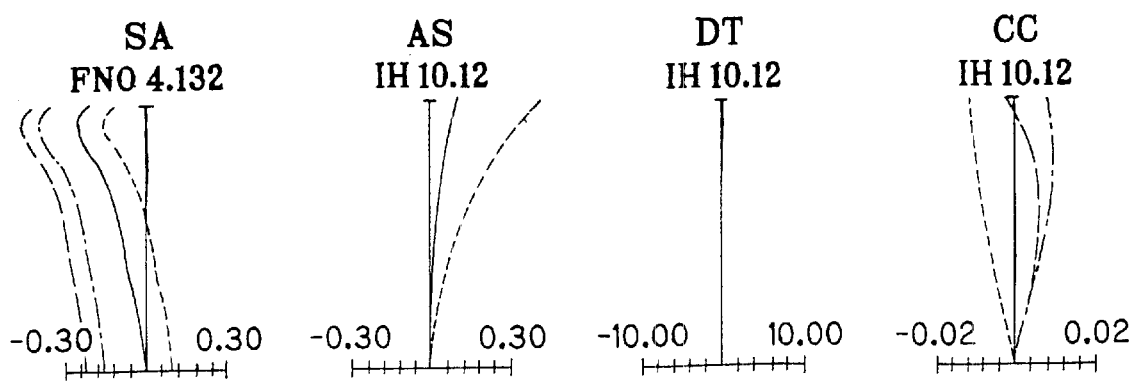

FIG. 29 is an aberration diagram for this example upon focused at infinity, and FIG. 30 is an aberration diagram for this example when focusing to 1.5 m is carried out by the intergral movement of the first and second lens groups G1 and G2.

Fluctuations of aberrations are stabilized to some extents. Still, much is left to be desired in connection with the first and second lens groups G1 and G2 that are both relatively heavy.

EXAMPLE 12

Example 12 is directed to a wide-angle yet high-magnification zoom lens system having a focal length of 14.55 to 140.01 mm and an F-number of 3.77 to 4.61. For zooming from the wide-angle end to the telephoto end of the zoom lens system, the first lens group G1 moves toward the object side of the system, as shown in FIG. 12. The second lens group G2 moves slightly. The third lens group G3 moves together with an aperture stop toward the object side. The fourth lens group G4 moves nonlinearly in such a way that the spacing between the third and fourth lens groups G3 and G4 becomes wide. Divided into a front subgroup G5F and a rear subgroup G5R, the fifth lens group G5 moves nonlinearly in such a way that the spacing between the fourth lens group G4 and the front subgroup G5F of the fifth lens group G5 becomes narrow, while th e spacing between the front subgroup G5F and rear subgroup G5R becomes narrow.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. The second lens group G2 is made up of a negative meniscus lens having a very strong curvature on an image side thereof, a double-concave lens, a double-convex lens and a negative meniscus lens having a strong curvature on an object side thereof. The third lens group G3 is made up of an aperture stop S and one double-convex lens contiguous thereto. The fourth lens group G4 is made up of one double-concave lens. The front subgroup G5F of the fifth lens group G5 is made up of a cemented lens consisting of a double-con vex lens and a negative meniscus lens, and the rear subgroup G5R is made up of a positive meniscus lens having a strong curvature on an object side thereof.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the positive meniscus lens in the rear subgroups G5R of the fifth lens group G5.

This example is figured out to provide a solution to the problem that when the fifth lens group G5 itself is a telecentric optical system, it has difficulty in focusing. Focusing is carried out with the front subgroup G5F of the fifth lens group G5. The rear subgroup G5R or, in another parlance, a field flattener functions to vary the mutual spacing between the front subgroup G5F and the rear subgroup G5R, thereby reducing fluctuations of aberrations with focusing and zooming.

Figure 31A:
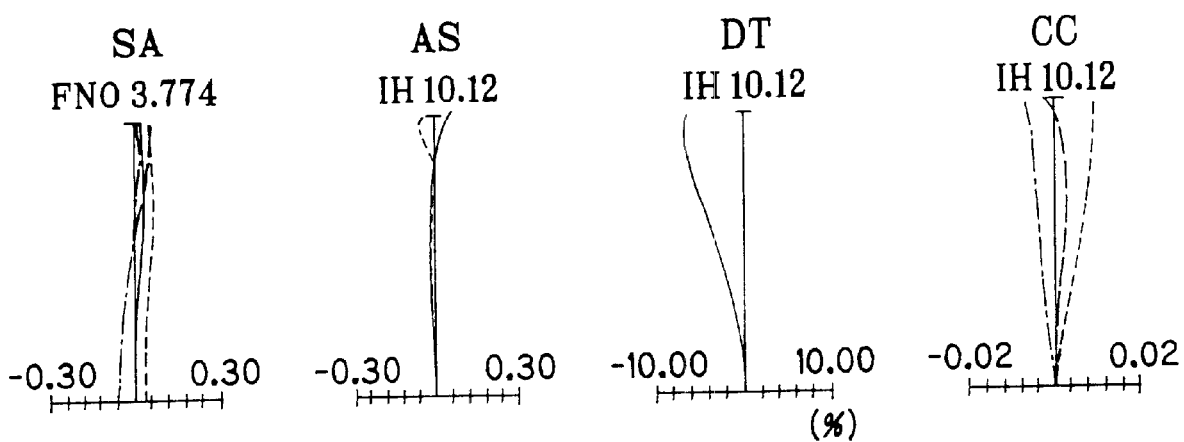
FIG. 31 is an aberration diagram for Example 12 upon focused at infinity.
Figure 31B:
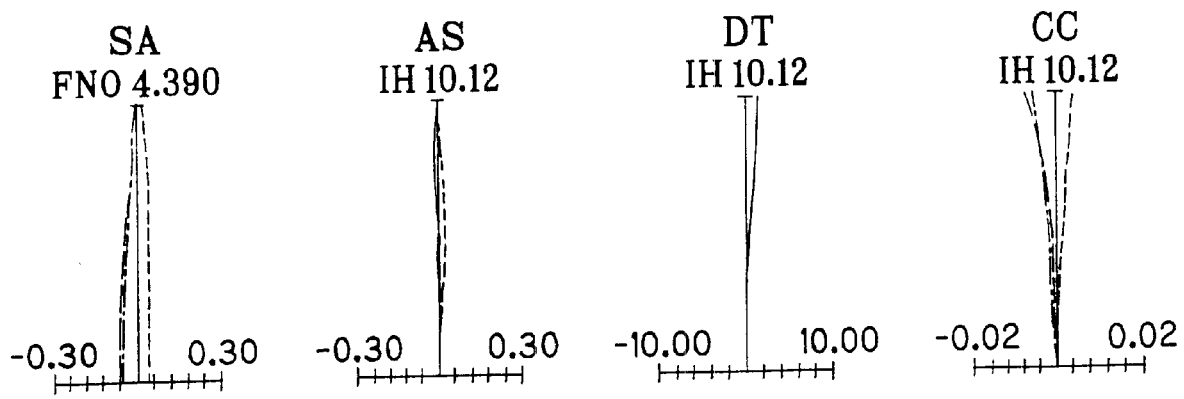
Figure 31C:
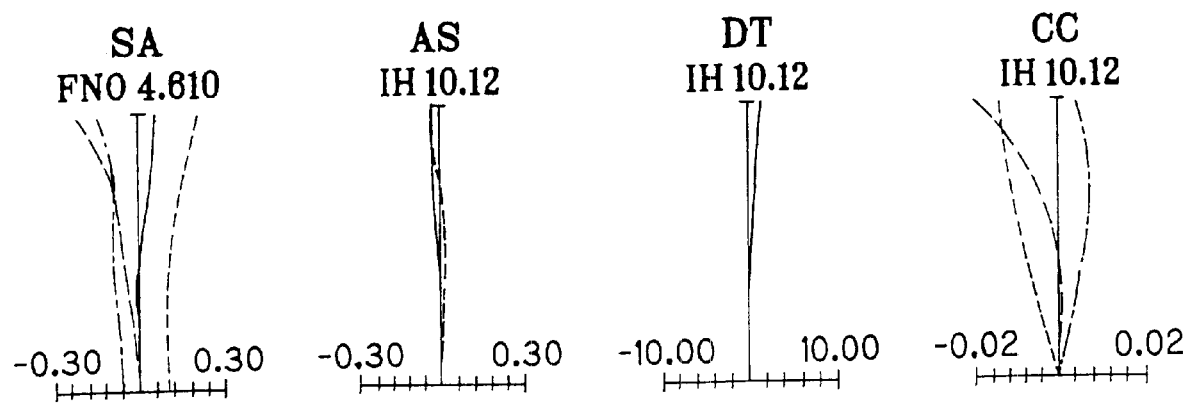
Figure 32A:
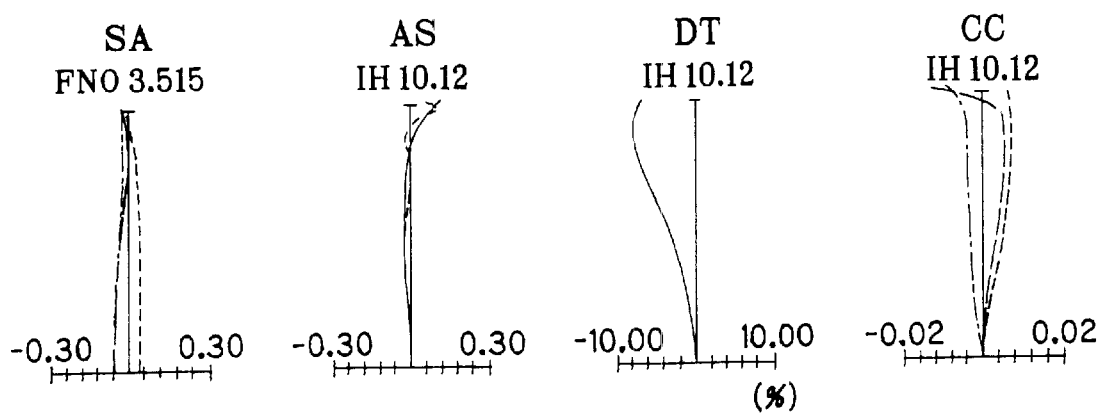
FIG. 32 is an aberration diagram for Example 12 upon focused on a finite point (2.0 m).
Figure 32B:
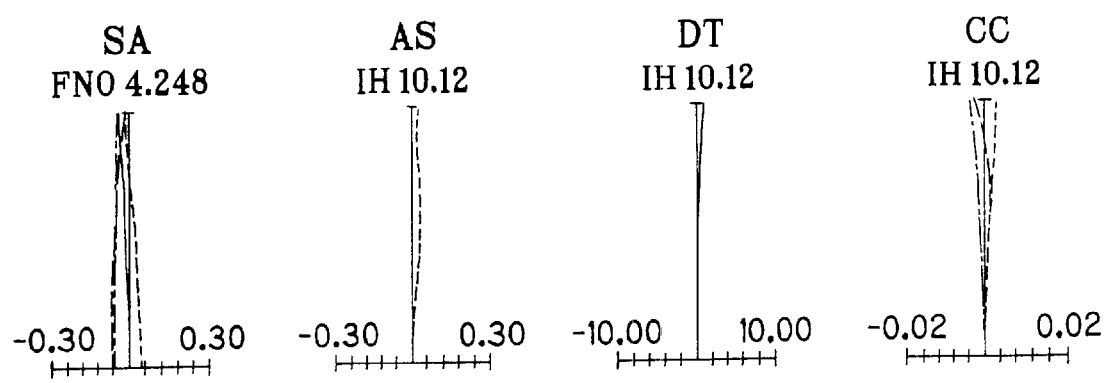
Figure 32C:
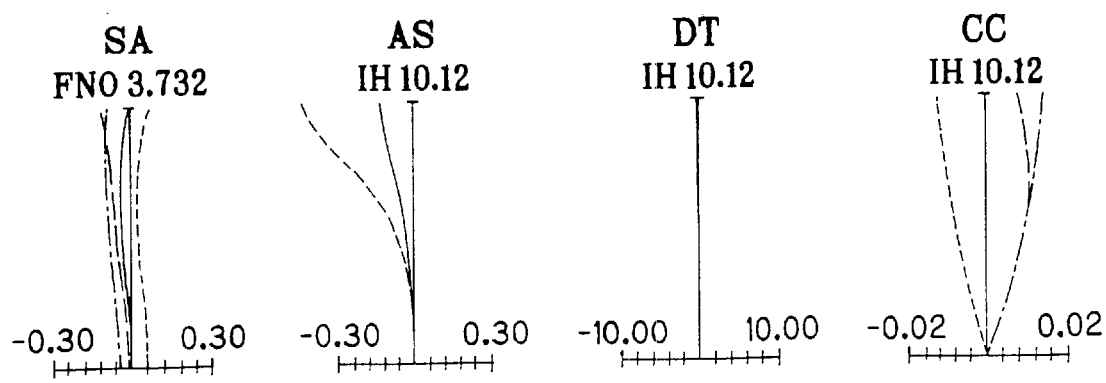

FIG. 31 is an aberration diagram for this example upon focused at infinity, and FIG. 32 is an aberration diagram for this example upon focused on a finite point of 2.0 m.

Excepting somewhat prominent fluctuations of coma at the telephoto end, the instant zoom lens system is found to be satisfactory and stable.

EXAMPLE 13

Figure 13A:
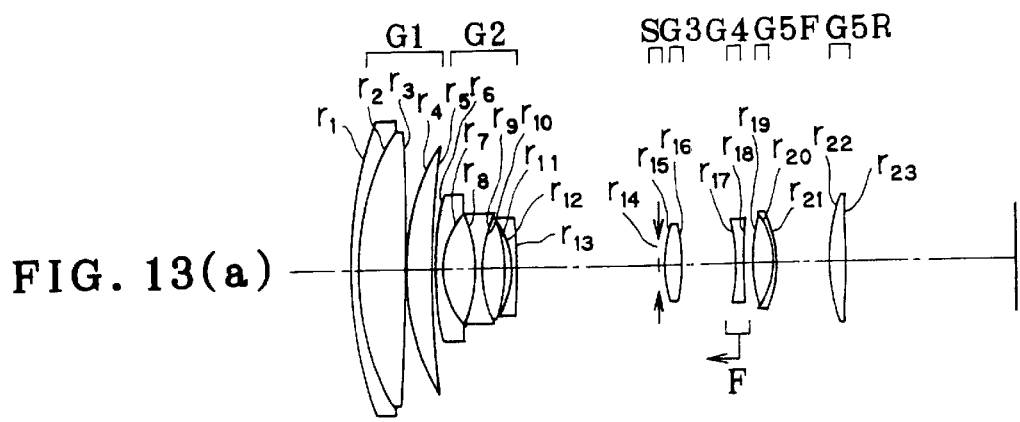
FIG. 13 is illustrative in section of Example 13 of the present zoom lens system in similar states as in FIG. 1.
Figure 13B:
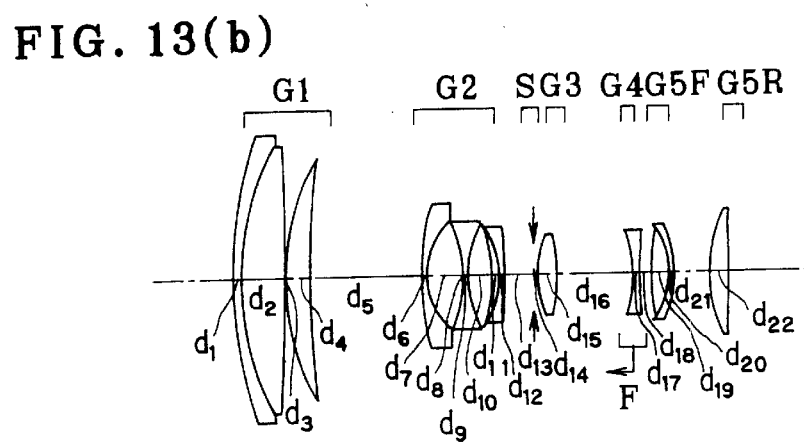
Figure 13C:
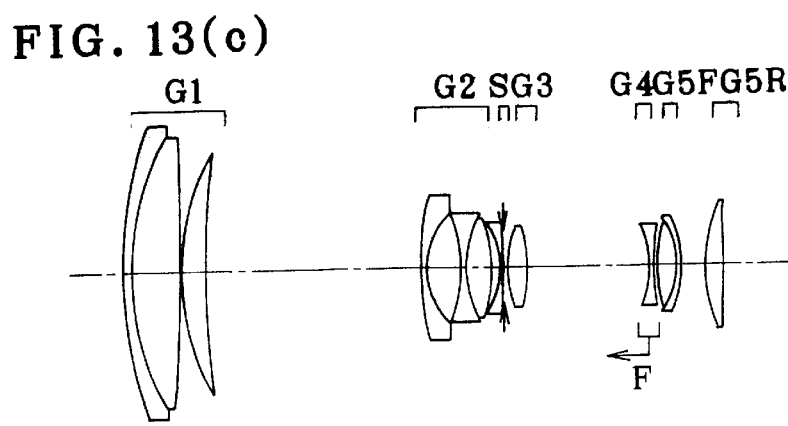

Example 13 is directed to a wide-angle yet high-magnification zoom lens system having a focal length of 14.55 to 140.01 mm and an F-number of 3.78 to 4.49. For zooming from the wide-angle end to the telephoto end of the zoom lens system, the first lens group G1 moves toward the object side of the system, as shown in FIG. 13. The second lens group G2 moves slightly. The third lens group G3 moves together with an aperture stop toward the object side. The fourth lens group G4 moves nonlinearly in such a way that the spacing between the third and fourth lens groups G3 and G4 becomes wide. Divided into a front subgroup G5F and a rear subgroup G5R, the fifth lens group G5 moves nonlinearly in such a way that the spacing between the fourth lens group G4 and the front subgroup G5F of the fifth lens group G5 becomes narrow, while the spacing between the front subgroup G5F and rear subgroup G5R becomes narrow.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. The second lens group G2 is made up of a negative meniscus lens having a very strong curvature on an image side thereof, a double-concave lens, a double-convex lens and a negative meniscus lens having a strong curvature on an object side thereof. The third lens group G3 is made up of an aperture stop S and one double-convex lens contiguous thereto. The fourth lens group G4 is made up of one double-concave lens. The front subgroup G5F of the fifth lens group G5 is made up of a cemented lens consisting of a double-convex lens and a negative meniscus lens, and the rear subgroup G5R is made up of a double-convex lens.

Five aspherical surfaces are used; one at the first surface of the first lens in the second lens group G2, one at the object-side surface of the second lens in the second lens group G2, one at the object-side surface of the double-convex lens in the third lens group G3, and two at both surfaces of the double-convex lens in the rear subgroups G5R of the fifth lens group G5.

This example makes use of a focusing mode of moving the fourth lens group G4.

Figure 33A:
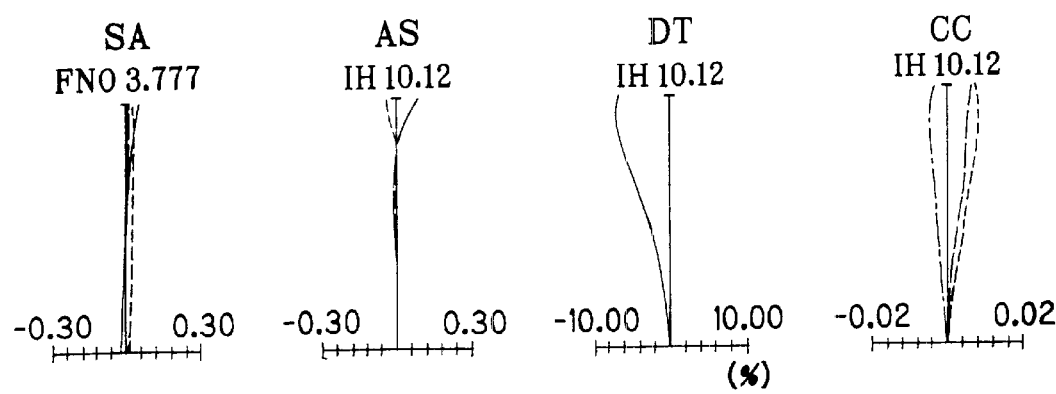
FIG. 33 is an aberration diagram for Example 13 upon focused at infinity.
Figure 33B:
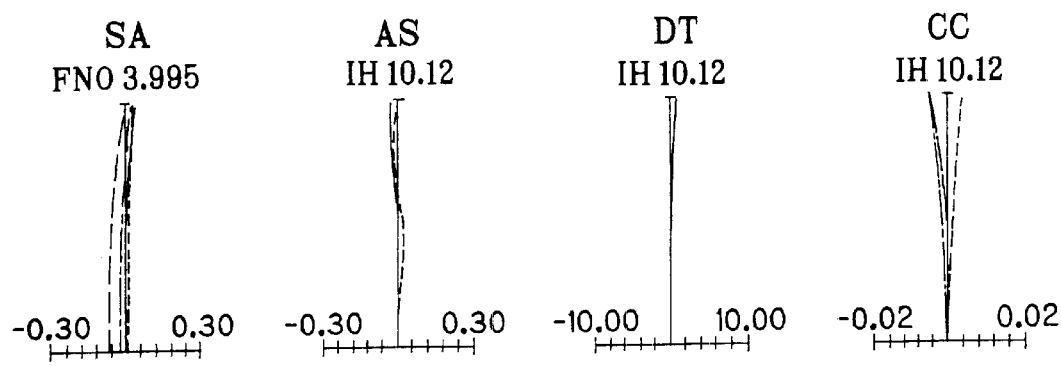
Figure 33C:
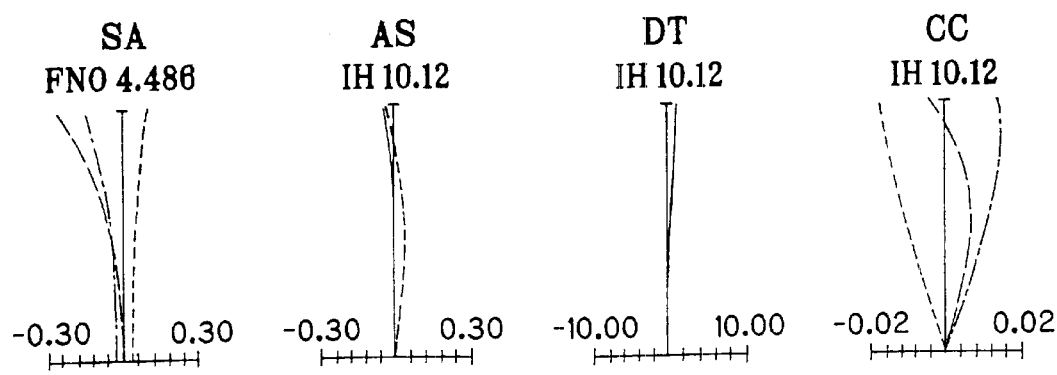
Figure 34A:
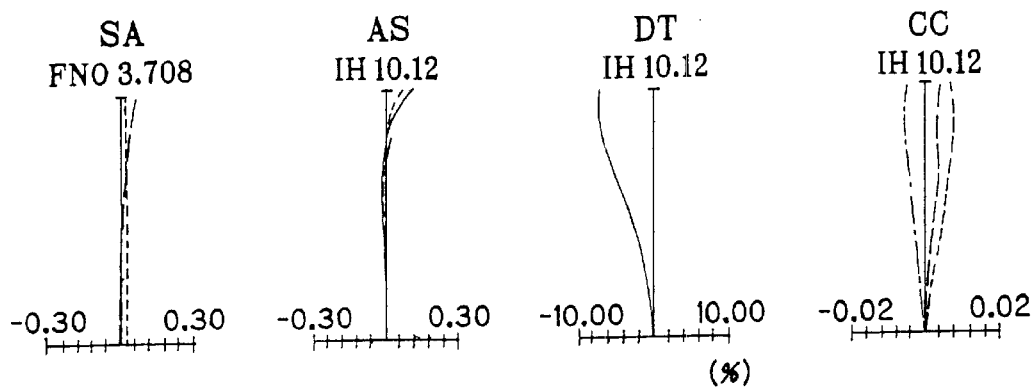
FIG. 34 is an aberration diagram for Example 13 upon focused on a finite point (2.0 m).
Figure 34B:
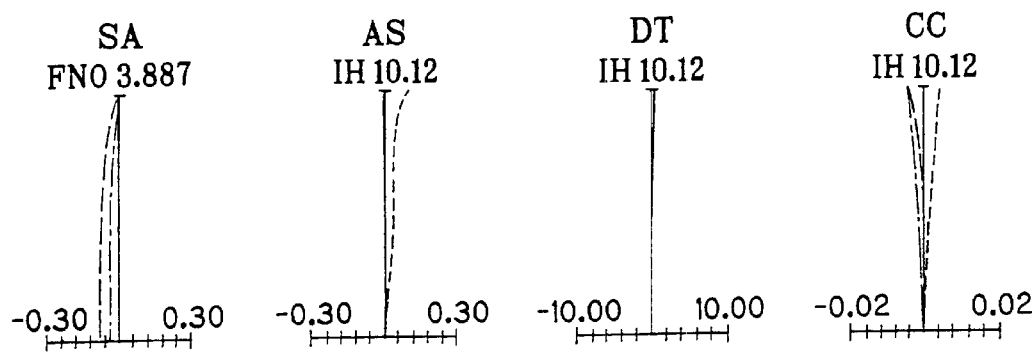
Figure 34C:
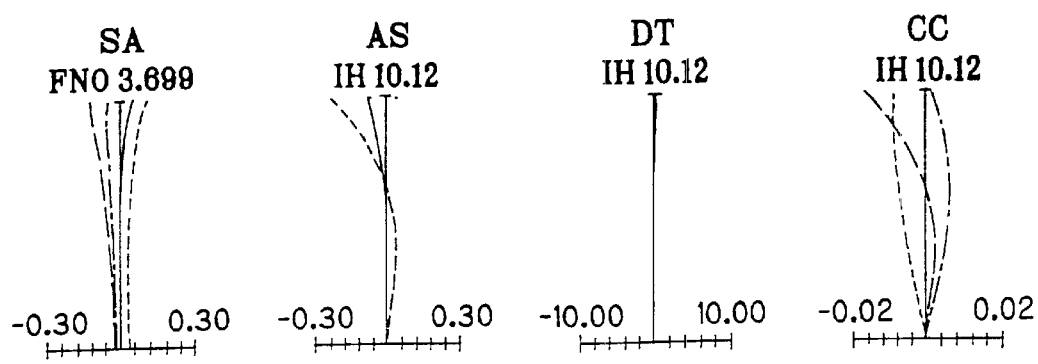

FIG. 33 is an aberration diagram for this example upon focused at infinity, and FIG. 34 is an aberration diagram for this example upon focused on a finite point of 2.0 m.

According to the instant embodiment wherein there is some considerable margin in the space for moving the third and fourth lens groups G3 and G4, it is possible to reduce a close-up distance to considerable degrees if fluctuations of aberrations with focusing can be corrected to some extents.

EXAMPLE 14

Figure 14A:
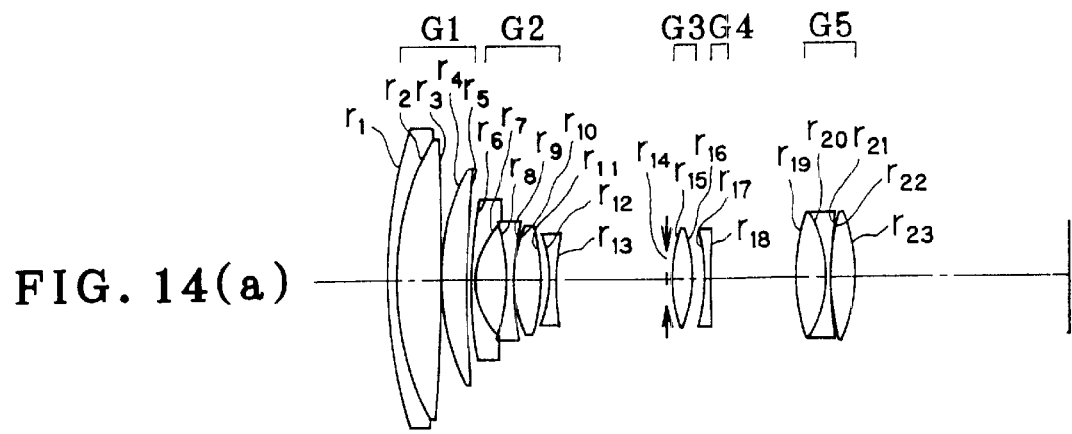
FIG. 14 is illustrative in section of Example 14 of the present zoom lens system in similar states as in FIG. 1.
Figure 14B:
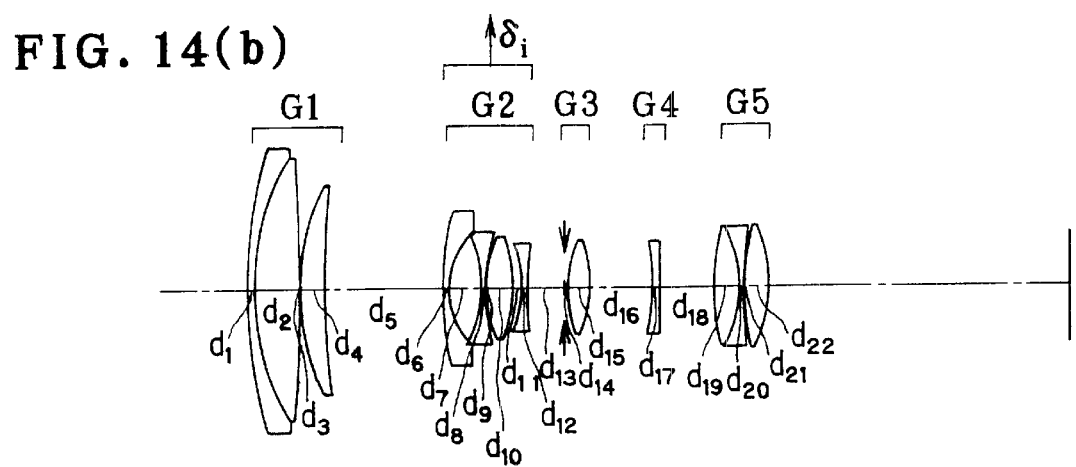
Figure 14C:
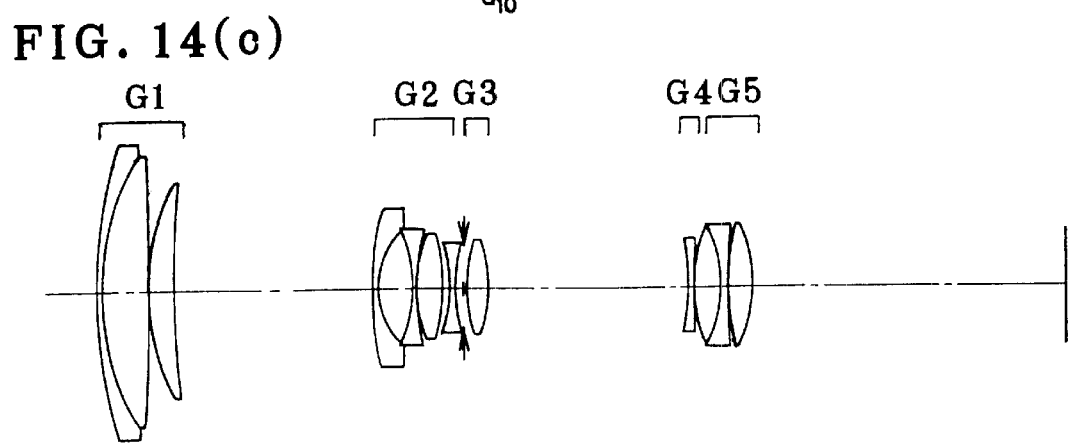

Example 14 is directed to a wide-angle yet high-magnification zoom lens system having a focal length of 14.36 to 140.5 mm and an F-number of 3.6 to 4.4. For zooming from the wide-angle end to the telephoto end of the system, the first lens group G1 moves toward the object side of the system, as shown in FIG. 14. The second lens group G2 moves slightly. The third lens group G3 moves together with an aperture stop toward the object side. The fourth lens group G4 moves back toward the image side of the system with respect to the wide-angle end position. The fifth lens group G5 moves nonlinearly.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than on an object side thereof, a double-concave lens, a slight air lens, a double-convex lens and a double-concave lens. The third lens group G3 is made up of an aperture stop and a double-convex lens contiguous thereto. The fourth lens group G4 is made up of one double-concave lens.

The fifth lens group G5 is made up of a cemented lens consisting of a double-convex lens and a double-concave lens, and a double-convex lens.

By use of two aspherical surfaces, one at the first surface of the first lens in the second lens group G2 and another at the object-side surface of the second lens therein, correction of distortion can be well balanced with respect to correction of coma. The use of such aspherical surfaces produces a marked effect especially because the wider the wide-angle arrangement of the system, the more difficult it is to correct distortion. An aspherical surface used at the object-side surface of the double-convex lens in the third lens group G3 enables spherical aberrations to be well corrected. Aspherical surfaces used at both surfaces of the double-convex lens located nearest to the image side in the fifth lens group G5 produce an effect so marked that off-axis aberrations can be corrected while a telecentric nature is imparted to the system.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

This example is figured out to compensate for an image movement on an image plane, which may otherwise be caused by some camera movement or the like. For instance, an image movement on the image plane due to a camera movement of about 0.5° can be corrected by making a shift δi of the second lens group G2 vertically with respect to the optical axis.

EXAMPLE 15

Example 15 is directed to a wide-angle yet high-magnification zoom lens system having a focal length of 14.36 to 140.5 mm and an F-number of 3.5 to 4.1. The specification is much the same as in Example 14. For zooming from the wide-angle end to the telephoto end of the system, the first lens group G1 moves toward the object side of the system, as shown in FIG. 15. The second lens group G2 moves slightly. The third lens group G3 moves together with an aperture stop toward the object side. The fourth lens group G4 moves back toward the image side of the system with respect to the wide-angle end position. The fifth lens group G5 moves nonlinearly.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than on an object side thereof, a double-concave lens, a slight air lens, a double-convex lens and a double-concave lens. The third lens group G3 is made up of an aperture stop and a double-convex lens contiguous thereto. The fourth lens group G4 is made up of one double-concave lens.

The fifth lens group G5 is made up of a cemented lens consisting of a double-convex lens and a double-concave lens, and a double-convex lens.

Six aspherical surfaces are used; one at the first surface of the first lens in the second lens group G2, one at the object-side surface of the second lens in the second lens group G2, two at both surfaces of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

This example is figured out to compensate for an image movement on an image plane, which may otherwise be caused by some camera movement or the like. For instance, an image movement on the image plane due to a camera movement of about 0.5° can be corrected by making a shift δi of the fourth lens group G4 vertically with respect to the optical axis.

The zoom lens system according to Example 14, and Example 15 has a field angle of 70° or greater at the wide-angle end and a zoom ratio of about 10 while a certain telecentric nature is imparted thereto. The potential image-formation capability of these systems is very excellent. If the focal length on the telephoto end side is increased, the zoom ratio can then be enlarged with relative ease.

EXAMPLE 16

Figure 16A:
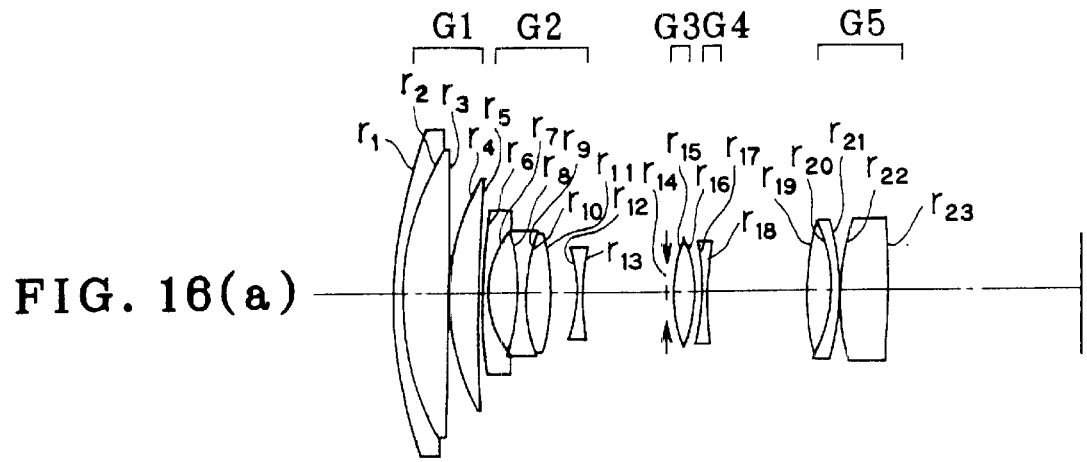
FIG. 16 is illustrative in section of Example 16 of the present zoom lens system in similar states as in FIG. 1.
Figure 16B:
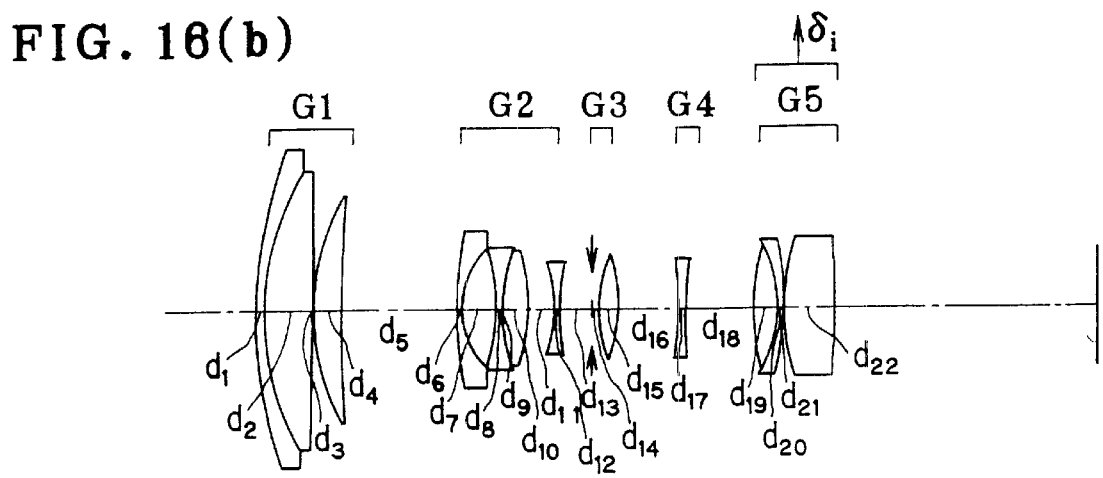
Figure 16C:
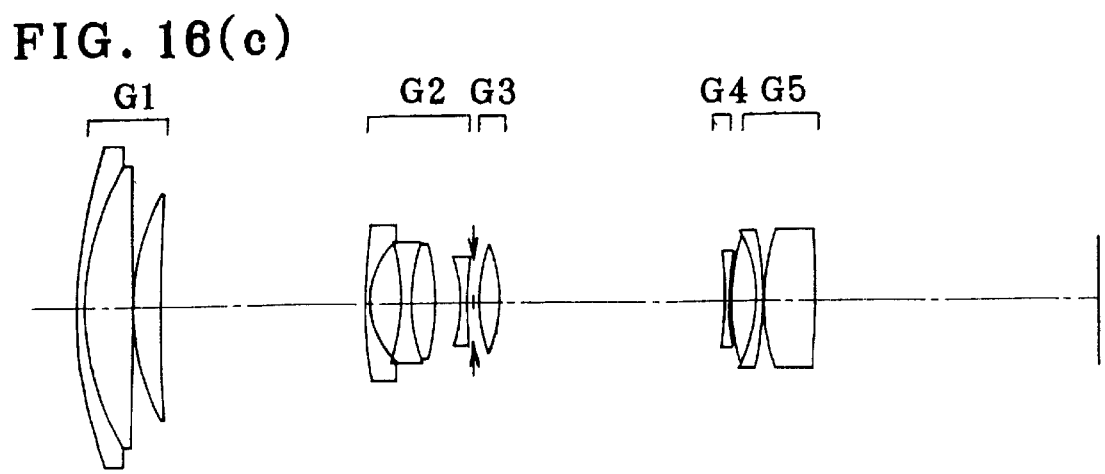

Example 16 is directed to a wide-angle yet high-magnification zoom lens system having a focal length of 14.36 to 140.5 mm and an F-number of 3.5 to 4.36. The specification is much the same as in Example 14. For zooming from the wide-angle end to the telephoto end of the system, the first lens group G1 moves toward the object side of the system, as shown in FIG. 16. The second lens group G2 moves slightly. The third lens group G3 moves together with an aperture stop toward the object side. The fourth lens group G4 moves back toward the image side of the system with respect to the wide-angle end position. The fifth lens group G5 moves nonlinearly.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than on an object side thereof, a double-concave lens, a slight air lens, a double-convex lens and a double-concave lens. The third lens group G3 is made up of an aperture stop and a double-convex lens contiguous thereto. The fourth lens group G4 is made up of one double-concave lens.

The fifth lens group G5 vertically with respect to the optical axis is made up of a cemented lens consisting of a double-convex lens and a negative meniscus lens having a strong curvature on object side thereof, and a double-convex lens.

Six aspherical surfaces are used; one at the first surface of the first lens in the second lens group G2, one at the object-side surface of the second lens in the second lens group G2, two at both surfaces of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 move almost linearly toward the object side. The second lens group G2, too, moves toward the object side although its amount of movement is small. On the other hand, the fourth lens group G4 and the fifth lens group G5 move nonlinearly.

This example is figured out to compensate for an image movement on an image plane, which may otherwise be caused by some camera movement or the like. For instance, an image movement on the image plane due to a camera movement of about 0.5° can be corrected by making a shift δi of the fourth lens group G4 vertically with respect to the optical axis.

EXAMPLE 17

Figure 17A:
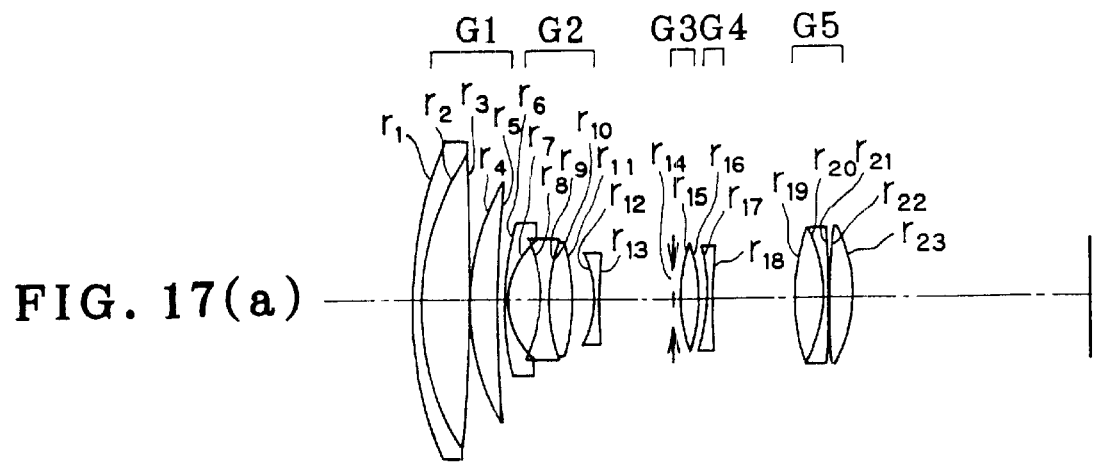
FIG. 17 is illustrative in section of Example 17 of the present zoom lens system in similar states as in FIG. 1.
Figure 17B:
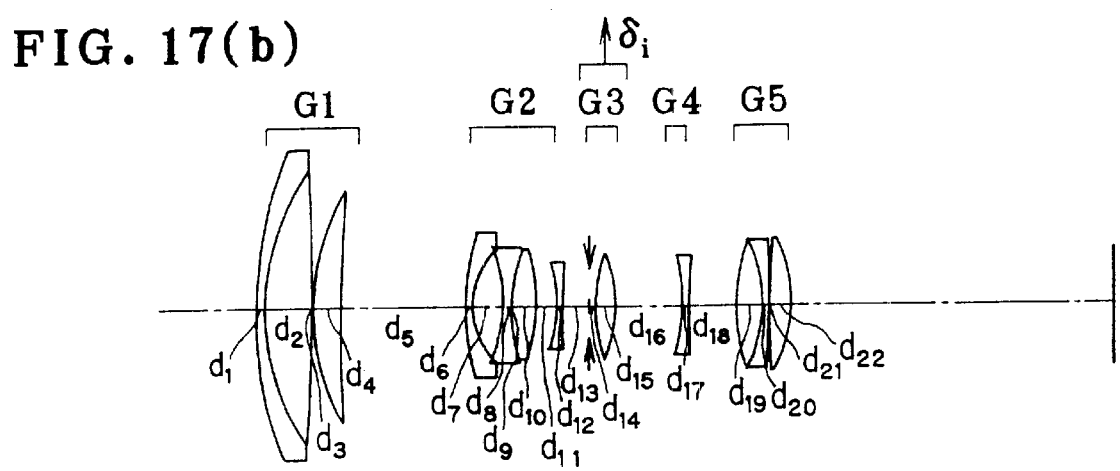
Figure 17C:
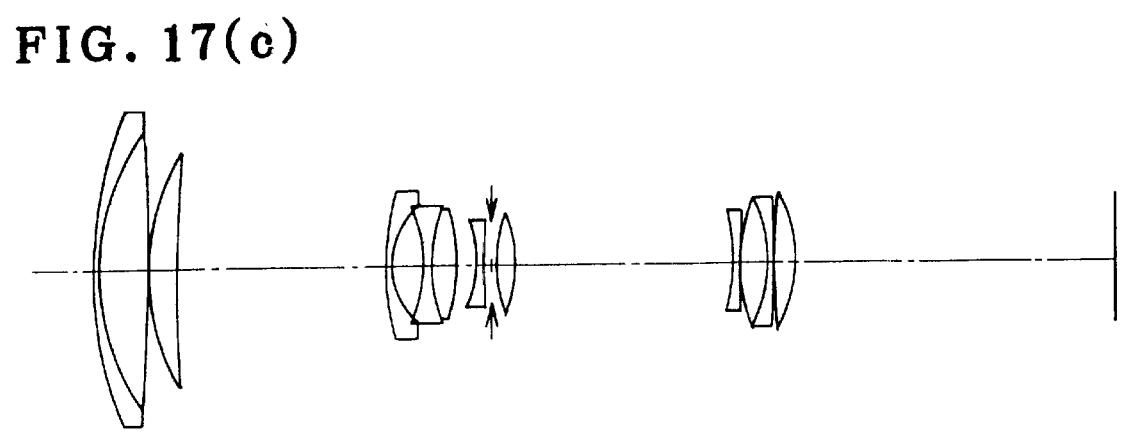
Figure 18A:
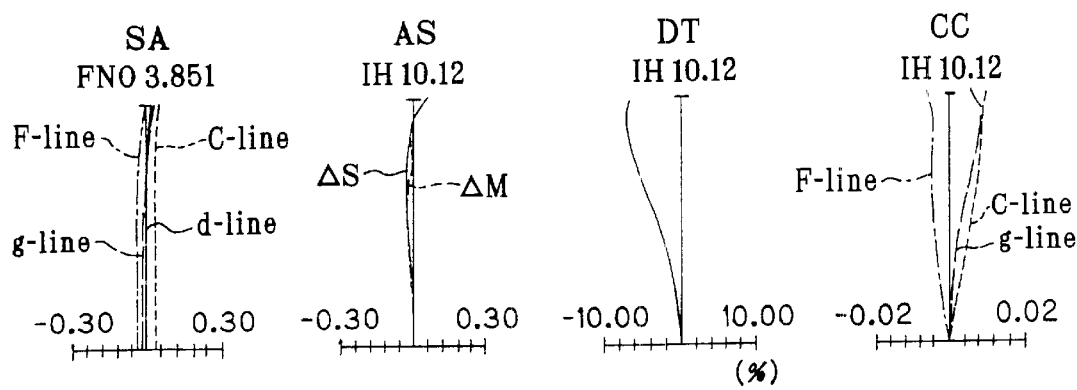
FIG. 18 is an aberration diagram for Example 1 upon focused at infinity.
Figure 18B:
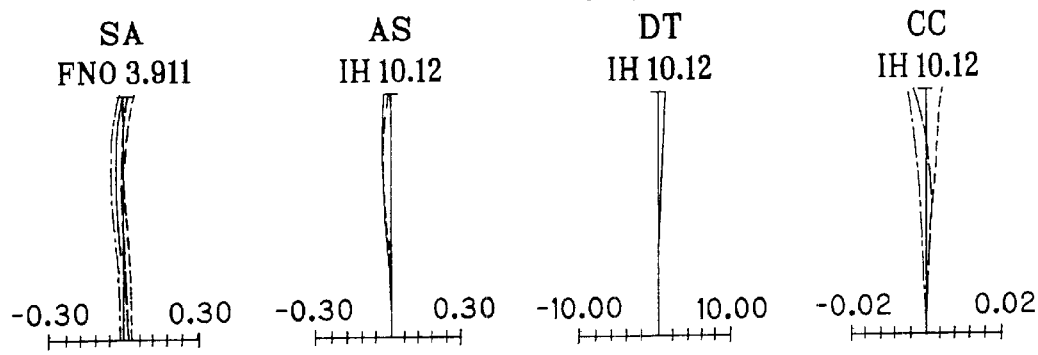
Figure 18C:
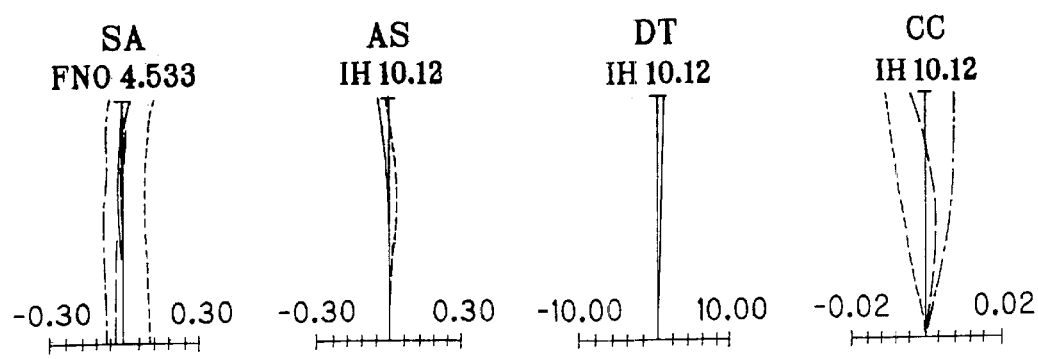
Figure 19A:
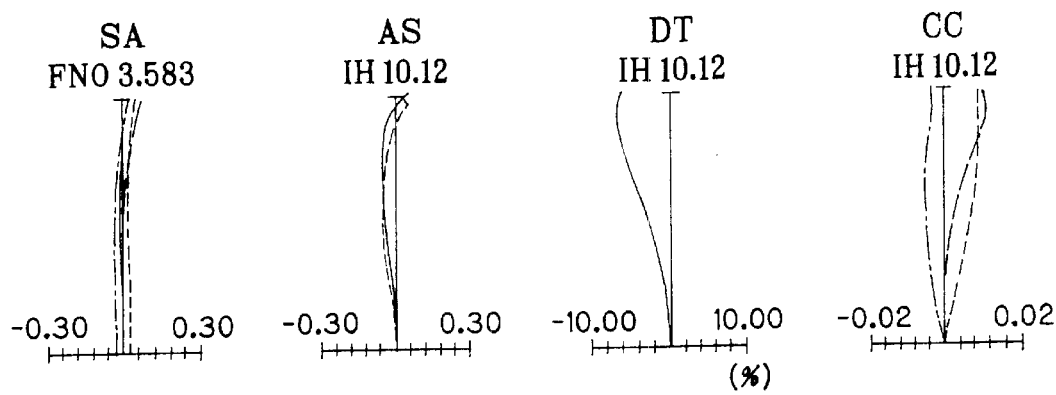
FIG. 19 is an aberration diagram for Example 2 upon focused at infinity.
Figure 19B:
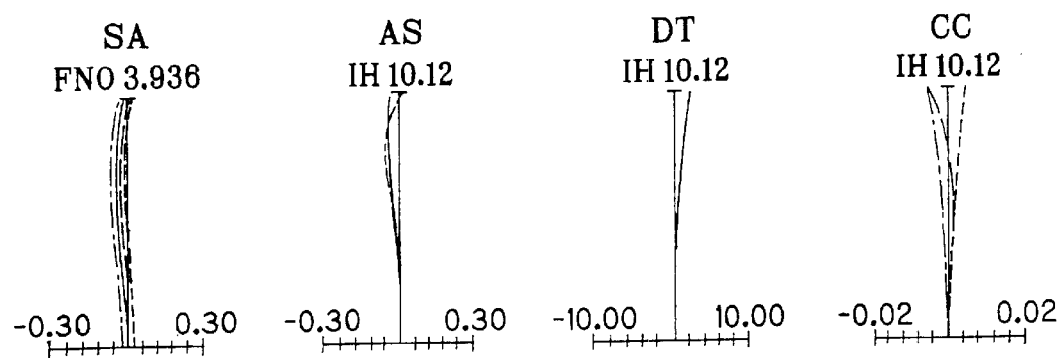
Figure 19C:
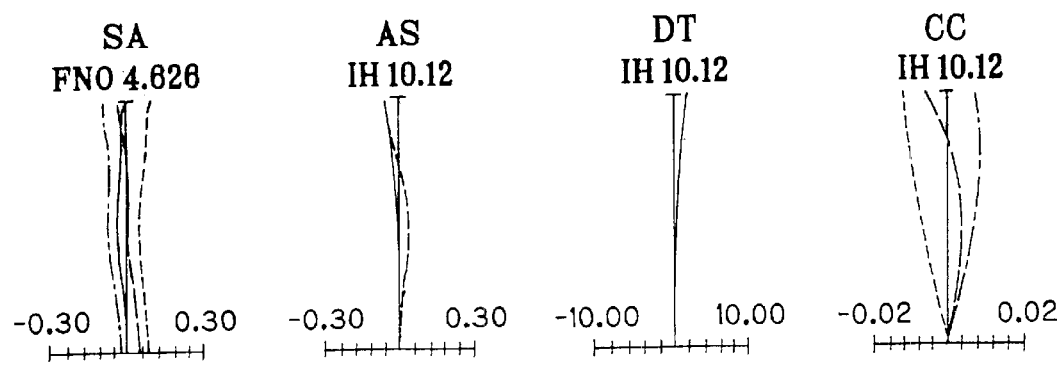
Figure 20A:
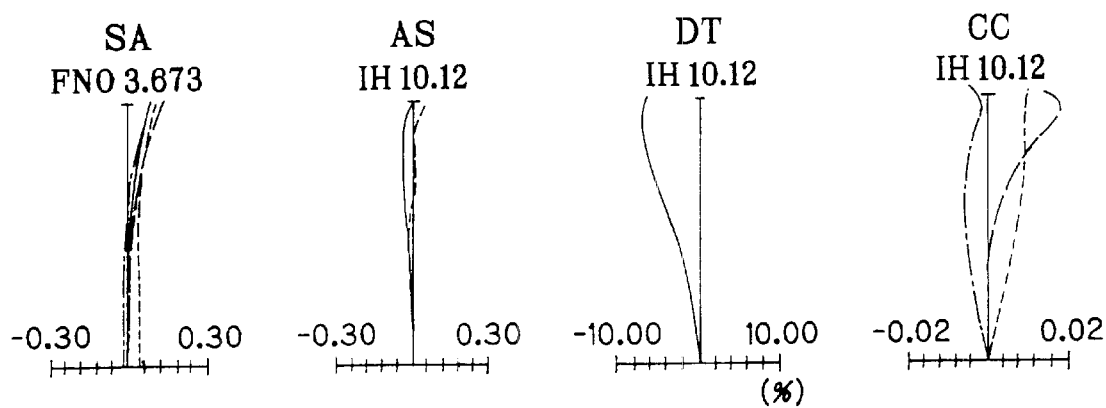
FIG. 20 is an aberration diagram for Example 3 upon focused at infinity.
Figure 20B:
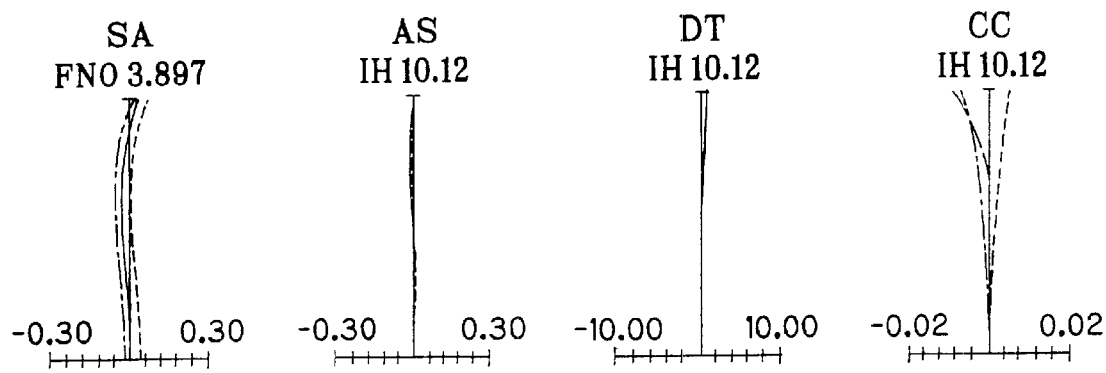
Figure 20C:
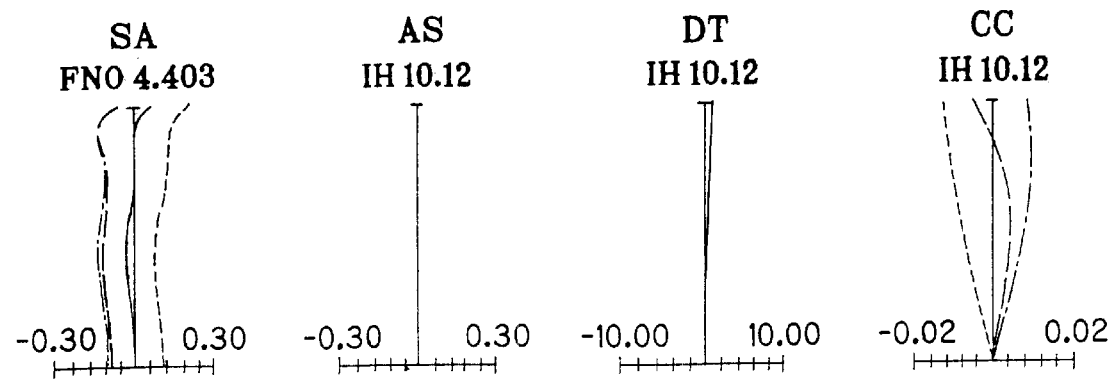
Figure 21A:
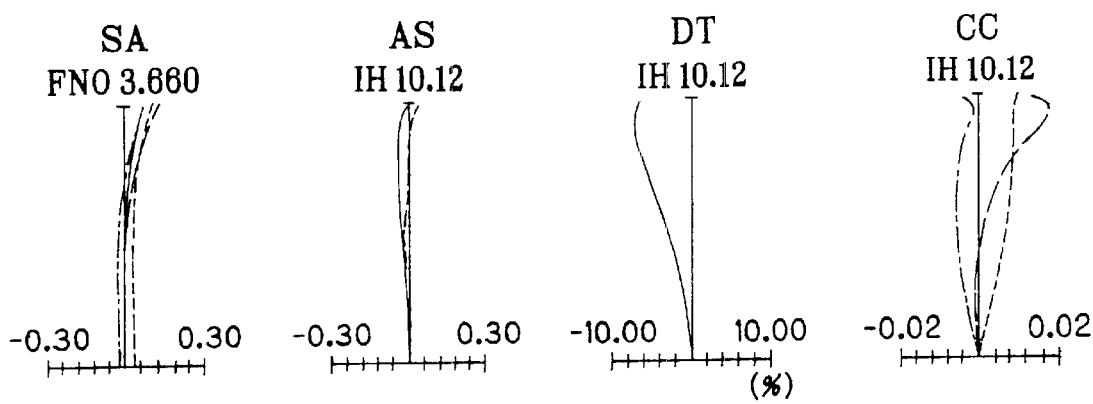
FIG. 21 is an aberration diagram for Example 4 upon focused at infinity.
Figure 21B:
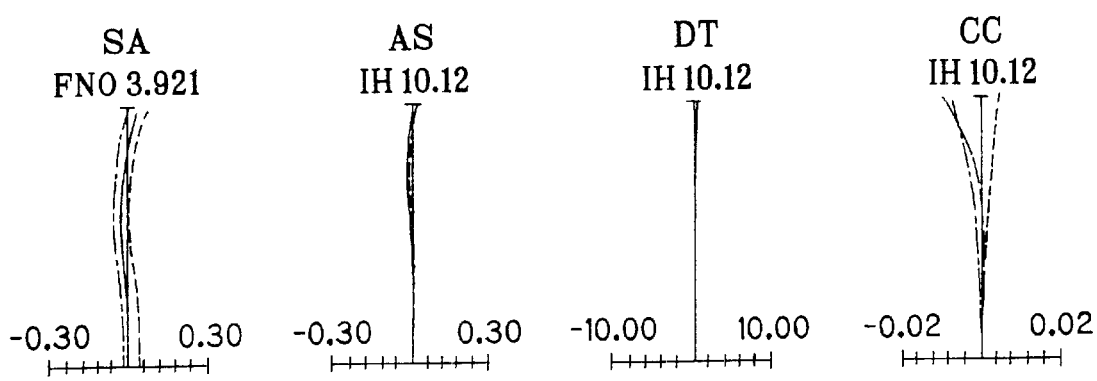
Figure 21C:
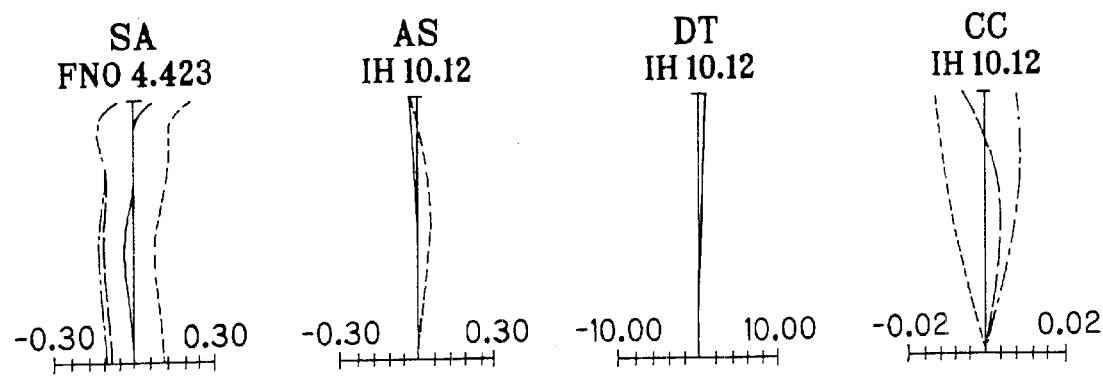
Figure 22A:
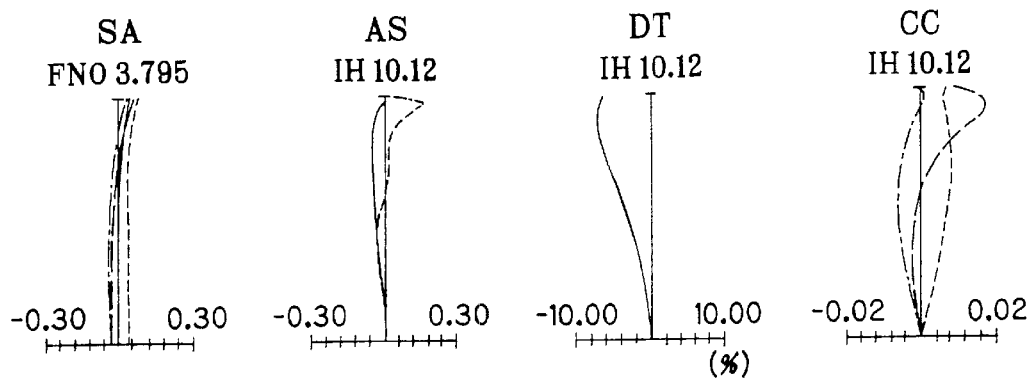
FIG. 22 is an aberration diagram for Example 5 upon focused at infinity.
Figure 22B:
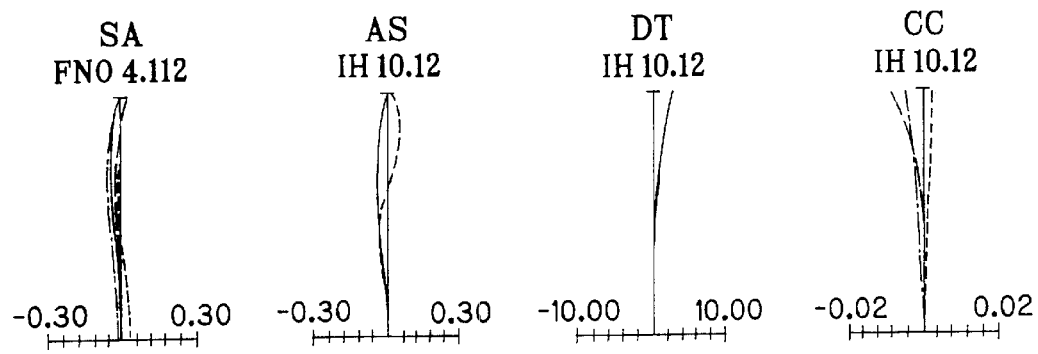
Figure 22C:
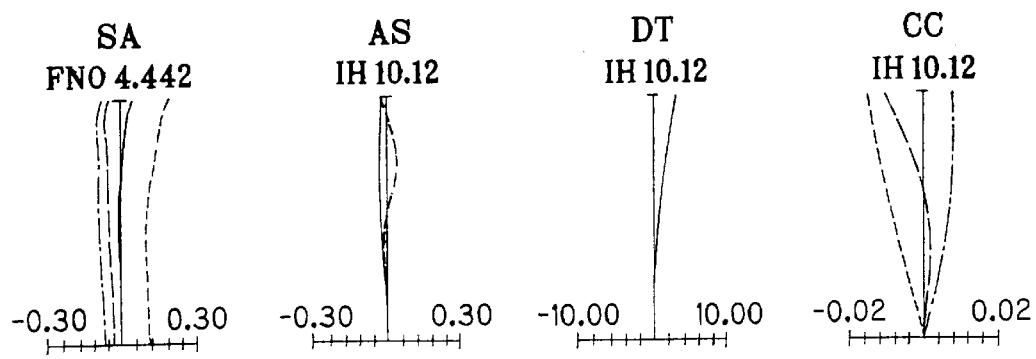
Figure 23A:
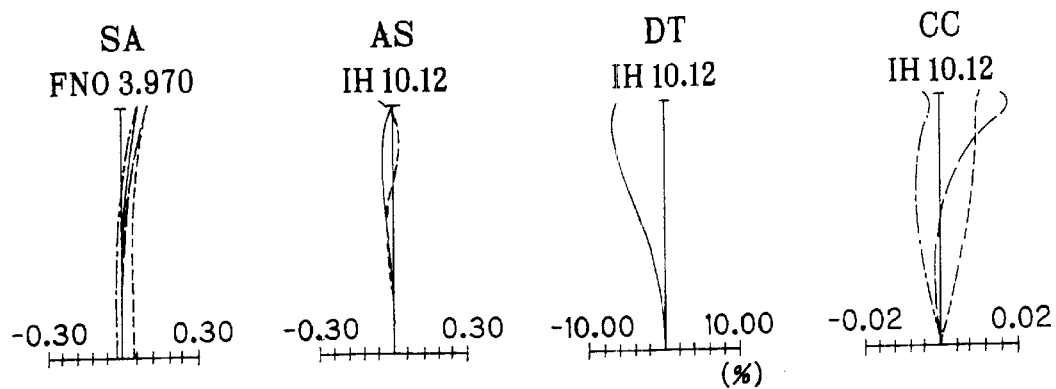
FIG. 23 is an aberration diagram for Example 6 upon focused at infinity.
Figure 23B:
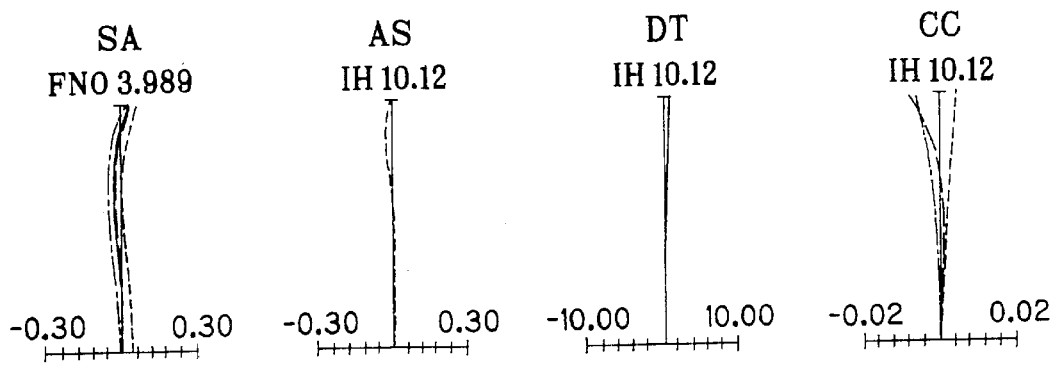
Figure 23C:
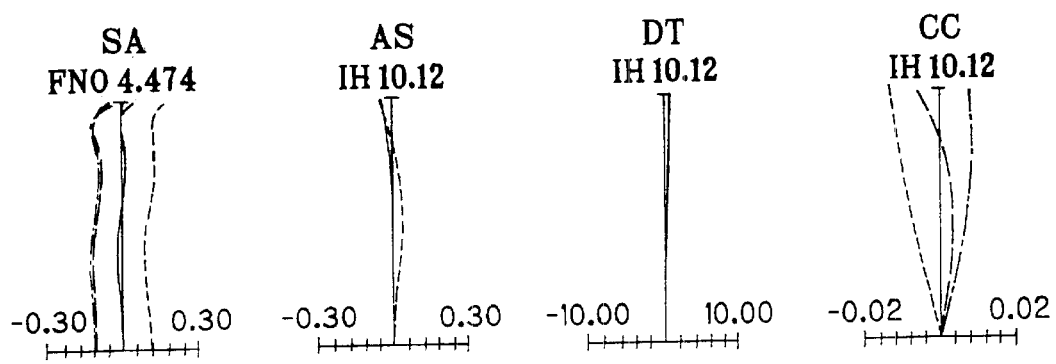
Figure 24A:
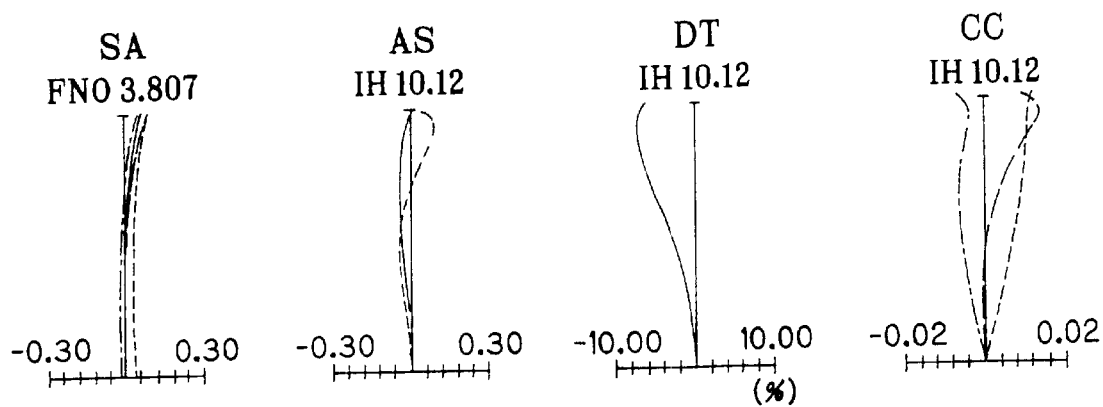
FIG. 24 is an aberration diagram for Example 7 upon focused at infinity.
Figure 24B:
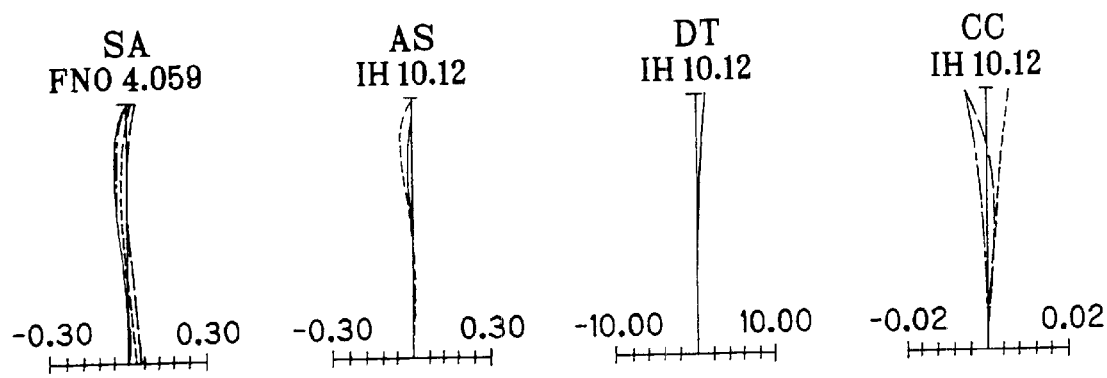
Figure 24C:
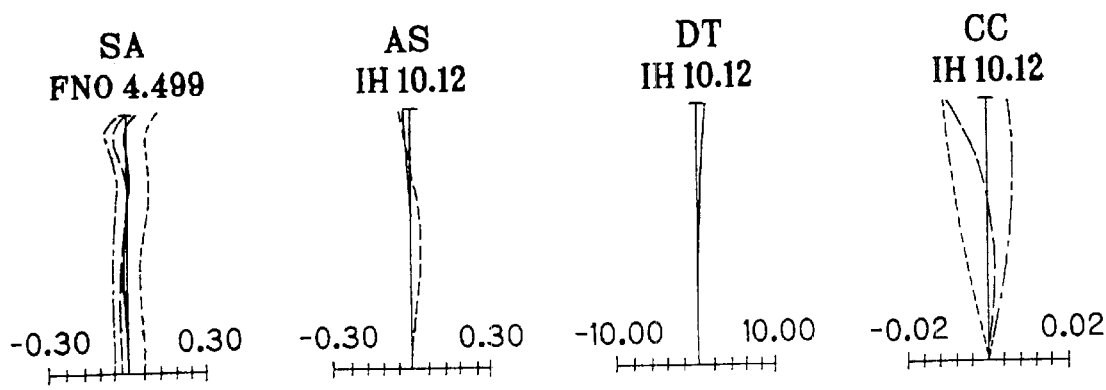
Figure 25A:
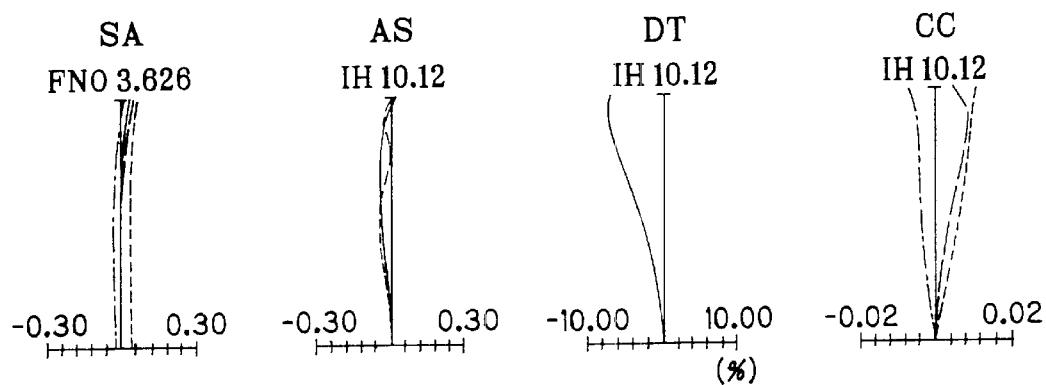
FIG. 25 is an aberration diagram for Example 8 upon focused at infinity.
Figure 25B:
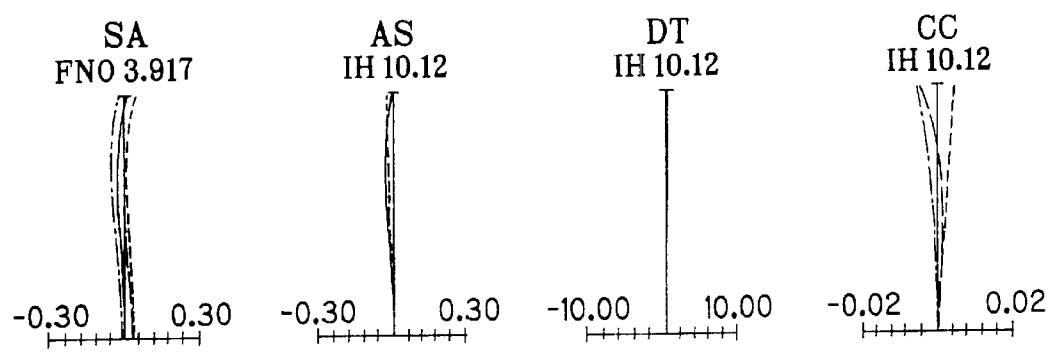
Figure 25C:
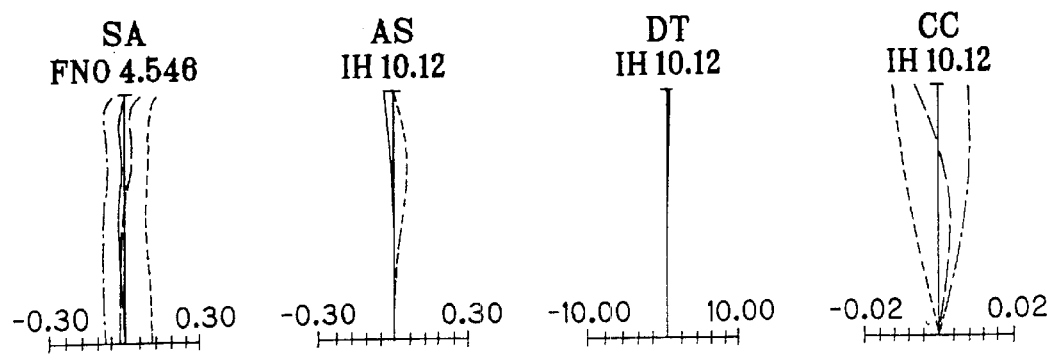
Figure 26A:
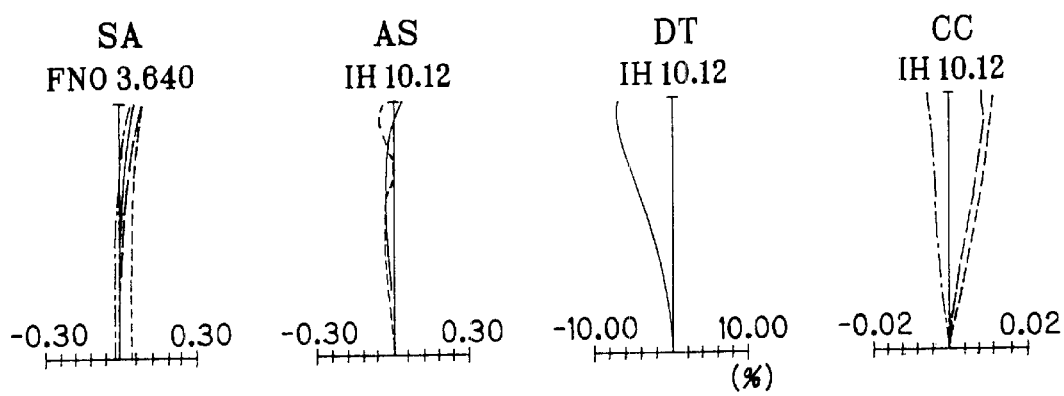
FIG. 26 is an aberration diagram for Example 9 upon focused at infinity.
Figure 26B:
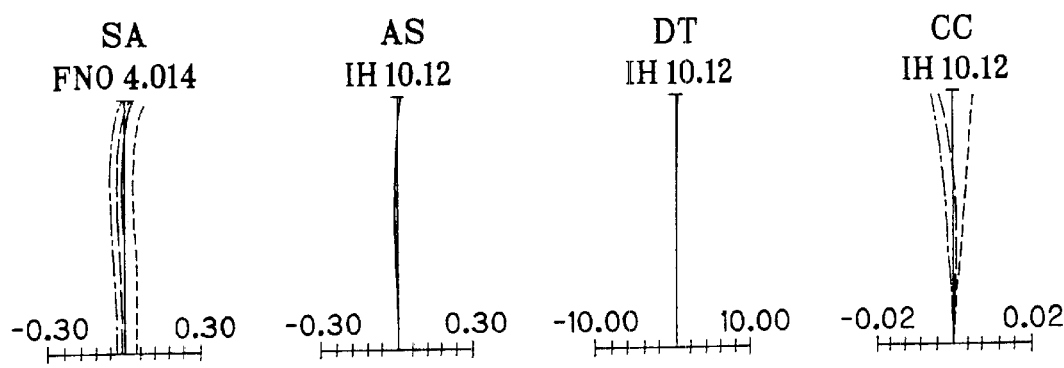
Figure 26C:
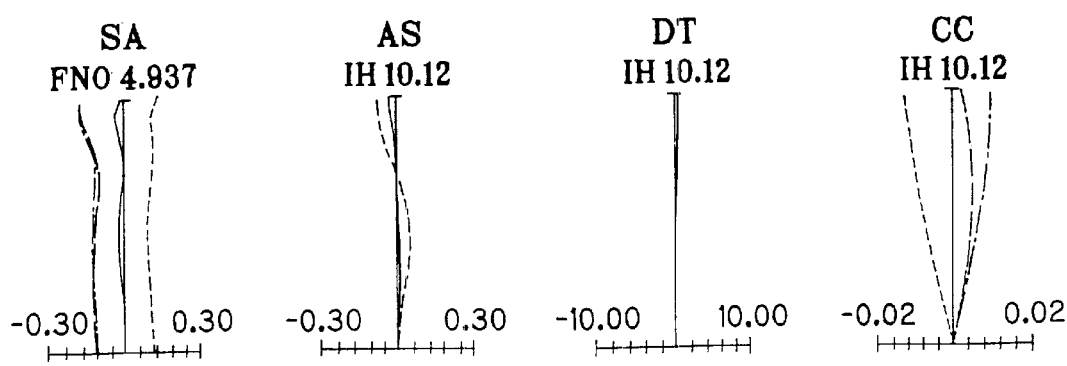

Example 17 is directed to a wide-angle yet high-magnification zoom lens system having a focal length of 14.36 to 140.5 mm and an F-number of 3.25 to 4.43. The specification is much the same as in Example 14. For zooming from the wide-angle end to the telephoto end of the system, the first lens group G1 moves toward the object side of the system, as shown in FIG. 17. The second lens group G2 moves slightly. The third lens group G3 moves together with an aperture stop toward the object side. The fourth lens group G4 moves back toward the image side of the system with respect to the wide-angle end position. The fifth lens group G5 moves nonlinearly.

The first lens group G1 is made up of a cemented lens consisting of a negative meniscus lens having a strong curvature on an image side thereof and a double-convex lens having a strong curvature on an object side thereof, and a positive meniscus lens having a strong curvature on an object side thereof. No aspherical surface is used in the first lens group G1. The second lens group G2 is made up of a negative meniscus lens having a very strong curvature on an image side thereof rather than on an object side thereof, a double-concave lens, a slight air lens, a double-convex lens and a double-concave lens. The third lens group G3 is made up of an aperture stop and a double-convex lens contiguous thereto. The fourth lens group G4 is made up of one double-concave lens.

The fifth lens group G5 is made up of a cemented lens consisting of a double-convex lens and a negative meniscus lens having a strong curvature on object side thereof, and a double-convex lens.

Six aspherical surfaces are used; one at the first surface of the first lens in the second lens group G2, one at the object-side surface of the second lens in the second lens group G2, two at both surfaces of the double-convex lens in the third lens group G3, and two at both surfaces of the double-convex lens located nearest to the image side in the fifth lens group G5.

Upon zooming from the wide-angle end to the telephoto end, the first lens group G1 and the third lens group G3 vertically with respect to the optical axis move almost linearly toward the object side. The second lens group G2, too, moves toward the object side although its amount of movement is small. On the other hand, the fourth lens group G4 and the fifth lens group G5 move nonlinearly.

This example is figured out to compensate for an image movement on an image plane, which may otherwise be caused by some camera movement or the like. For instance, an image movement on the image plane due to a camera movement of about 0.5° can be corrected by making a shift δi of the fourth lens group G4 vertically with respect to the optical axis.

Set out below are numerical data on each example. Symbols used hereinafter but not hereinbefore have the following meanings.

f: the focal length of a zoom lens system,
2ω: a field angle,
$F_{NO}$: an F-number,
FB: a back focus,
WE: a wide-angle end,
ST: intermediate settings,
TE: a telephoto end,
$r_1, r_2, \ldots$ : the radius of curvature of each lens,
$d_1, d_2, \ldots$ : the spacing between adjacent lens surfaces,
$n_{d1}, n_{d2}, \ldots$ : the d-line refractive index of each lens, and
$V_{d1}, V_{d2}, \ldots$ : the Abbe number of each lens.

Here let x represent an optical axis where the direction of propagation of light is assumed to be positive, and y stand for a direction perpendicular with respect to the optical axis. Then, aspherical shape is given by $$x=(y^2/r)/[1+\{1-(K+1)(y/r)^2\}^{1/2}]+A_4y^4+A_6y^6+A_8y^8+A_{10}y^{10}$$

Here r is a paraxial radius of curvature, K is a conical coefficient, and $A_4$, $A_6$, $A_8$ and $A_{10}$ are the fourth, sixth, eighth and tenth aspherical coefficients, respectively.

EXAMPLE 1

| | | | |
|---|---|---|---|
| $r_1 = 91.994$ | $d_1 = 1.500$ | $n_{d1} = 1.84666$ | $\nu_{d1} = 23.78$ |
| $r_2 = 46.027$ | $d_2 = 8.600$ | $n_{d2} = 1.60311$ | $\nu_{d2} = 60.64$ |
| $r_3 = -477.912$ | $d_3 = 0.100$ | | |
| $r_4 = 38.093$ | $d_4 = 5.000$ | $n_{d3} = 1.49700$ | $\nu_{d3} = 81.54$ |
| $r_5 = 147.554$ | $d_5 = D1$ | | |
| $r_6 = 90.488$ (Aspheric) | $d_6 = 0.850$ | $n_{d4} = 1.77250$ | $\nu_{d4} = 49.60$ |
| $r_7 = 14.432$ | $d_7 = 5.378$ | | |
| $r_8 = -29.591$ (Aspheric) | $d_8 = 0.850$ | $n_{d5} = 1.78386$ | $\nu_{d5} = 38.09$ |
| $r_9 = 33.478$ | $d_9 = 0.100$ | | |
| $r_{10} = 32.890$ | $d_{10} = 4.700$ | $n_{d6} = 1.84666$ | $\nu_{d6} = 23.78$ |
| $r_{11} = -22.731$ | $d_{11} = 0.536$ | | |
| $r_{12} = -18.454$ | $d_{12} = 0.750$ | $n_{d7} = 1.74100$ | $\nu_{d7} = 52.64$ |
| $r_{13} = 164.135$ | $d_{13} = D2$ | | |
| $r_{14} = \infty$ (Stop) | $d_{14} = 0.850$ | | |
| $r_{15} = 21.823$ (Aspheric) | $d_{15} = 3.750$ | $n_{d8} = 1.48749$ | $\nu_{d8} = 70.23$ |
| $r_{16} = -25.687$ | $d_{16} = D3$ | | |
| $r_{17} = -34.785$ | $d_{17} = 0.800$ | $n_{d9} = 1.84666$ | $\nu_{d9} = 23.78$ |
| $r_{18} = -39.906$ | $d_{18} = 0.800$ | $n_{d10} = 1.69680$ | $\nu_{d10} = 55.53$ |
| $r_{19} = 304.185$ | $d_{19} = D4$ | | |
| $r_{20} = 31.932$ | $d_{20} = 5.823$ | $n_{d11} = 1.49700$ | $\nu_{d11} = 81.54$ |
| $r_{21} = -34.866$ | $d_{21} = 0.700$ | $nd_{12} = 1.80518$ | $\nu_{d12} = 25.42$ |
| $r_{22} = -358.865$ | $d_{22} = 0.100$ | | |
| $r_{23} = 72.193$ (Aspheric) | $d_{23} = 3.533$ | $n_{d13} = 1.60311$ | $\nu_{d13} = 60.64$ |
| $r_{24} = -45.125$ (Aspheric) | | | |

Aspherical Coefficients

6th surface $K = 0.0000$
$A_4 = 8.0531 \times 10^{-6}$
$A_6 = 3.6708 \times 10^{-9}$
$A_8 = 1.9100 \times 10^{-10}$
$A_{10} = 0.0000$ 8th surface $K = 0.0000$
$A_4 = -8.4129 \times 10^{-6}$
$A_6 = -3.0713 \times 10^{-8}$
$A_8 = -1.5671 \times 10^{-9}$
$A_{10} = 1.3072 \times 10^{-11}$ 15th surface $K = 0.0000$
$A_4 = -2.6090 \times 10^{-5}$
$A_6 = -2.5338 \times 10^{-8}$
$A_8 = 1.9102 \times 10^{-10}$
$A_{10} = -1.7629 \times 10^{-12}$ 23th surface $K = 0.0000$
$A_4 = -6.2426 \times 10^{-6}$
$A_6 = -9.1416 \times 10^{-9}$
$A_8 = -1.1515 \times 10^{-10}$
$A_{10} = -2.3728 \times 10^{-14}$ 24th surface $K = 0.0000$
$A_4 = 9.5538 \times 10^{-6}$
$A_6 = -6.6795 \times 10^{-9}$
$A_8 = -1.3701 \times 10^{-10}$
$A_{10} = 0.0000$ Zooming Data

| | WE | ST | TE |
|---|---|---|---|
| f (mm) | 14.360 | 45.500 | 140.500 |
| $F_{NO}$ | 3.851 | 3.911 | 4.533 |
| 2ω (°) | 74.1 | 24.9 | 8.2 |
| FB (mm) | 34.028 | 47.777 | 48.075 |
| D1 | 1.200 | 21.358 | 34.134 |
| D2 | 23.400 | 7.889 | 1.122 |
| D3 | 2.969 | 11.179 | 37.599 |
| D4 | 18.964 | 13.077 | 1.900 |

EXAMPLE 2

| | | | |
|---|---|---|---|
| $r_1 = 94.952$ | $d_1 = 1.500$ | $n_{d1} = 1.84666$ | $\nu_{d1} = 23.78$ |
| $r_2 = 48.267$ | $d_2 = 8.600$ | $n_{d2} = 1.60311$ | $\nu_{d2} = 60.64$ |
| $r_3 = -472.579$ | $d_3 = 0.177$ | | |
| $r_4 = 41.087$ | $d_4 = 5.000$ | $n_{d3} = 1.49700$ | $\nu_{d3} = 81.54$ |
| $r_5 = 191.554$ | $d_5 = D1$ | | |
| $r_6 = 162.811$ (Aspheric) | $d_6 = 0.850$ | $n_{d4} = 1.80100$ | $\nu_{d4} = 34.97$ |
| $r_7 = 16.166$ | $d_7 = 5.378$ | | |
| $r_8 = -30.360$ (Aspheric) | $d_8 = 0.850$ | $n_{d5} = 1.70154$ | $\nu_{d5} = 41.24$ |
| $r_9 = 20.369$ | $d_9 = 0.100$ | | |
| $r_{10} = 21.075$ | $d_{10} = 4.700$ | $n_{d6} = 1.84666$ | $\nu_{d6} = 23.78$ |
| $r_{11} = -25.650$ | $d_{11} = 0.622$ | | |
| $r_{12} = -19.420$ | $d_{12} = 0.750$ | $n_{d7} = 1.74100$ | $\nu_{d7} = 52.64$ |
| $r_{13} = 102.719$ | $d_{13} = D2$ | | |
| $r_{14} = \infty$ (Stop) | $d_{14} = 0.850$ | | |
| $r_{15} = 21.768$ (Aspheric) | $d_{15} = 3.750$ | $n_{d8} = 1.48749$ | $\nu_{d8} = 70.23$ |
| $r_{16} = -29.026$ | $d_{16} = D3$ | | |
| $r_{17} = -50.167$ | $d_{17} = 0.800$ | $n_{d9} = 1.77250$ | $\nu_{d9} = 49.60$ |
| $r_{18} = 227.025$ | $d_{18} = D4$ | | |
| $r_{19} = 40.619$ | $d_{19} = 4.980$ | $n_{d10} = 1.49700$ | $\nu_{d10} = 81.54$ |
| $r_{20} = -26.501$ | $d_{20} = 0.700$ | $n_{d11} = 1.80518$ | $\nu_{d11} = 25.42$ |
| $r_{21} = -95.736$ | $d_{21} = 0.142$ | | |
| $r_{22} = 80.181$ (Aspheric) | $d_{22} = 3.390$ | $n_{d12} = 1.60311$ | $vd_{12} = 60.64$ |
| $r_{23} = -46.877$ (Aspheric) | | | |

Aspherical Coefficients

6th surface $K = 0.0000$
$A_4 = 1.2942 \times 10^{-5}$
$A_6 = 3.8064 \times 10^{-9}$
$A_8 = 1.2125 \times 10^{-10}$
$A10 = 0.0000$ 8th surface $K = 0.0000$
$A_4 = -1.0616 \times 10^{-5}$
$A_6 = -7.6137 \times 10^{-8}$
$A_8 = -6.0911 \times 10^{-10}$
$A_{10} = 9.2537 \times 10^{-12}$ 15th surface $K = 0.0000$
$A_4 = -2.6708 \times 10^{-5}$
$A_6 = -1.8778 \times 10^{-8}$
$A_8 = 2.8164 \times 10^{-10}$
$A_{10} = -2.7393 \times 10^{-12}$ 22th surface $K = 0.0000$
$A_4 = 2.9174 \times 10^{-6}$
$A_6 = -5.7765 \times 10^{-8}$
$A_8 = 2.4722 \times 10^{-10}$
$A_{10} = -1.26781 \times 10^{-13}$ 23th surface $K = 0.0000$
$A_4 = 1.4258 \times 10^{-5}$
$A_6 = -5.4401 \times 10^{-8}$
$A_8 = 1.9960 \times 10^{-10}$
$A_{10} = 0.0000$ Zooming Data

| | WE | ST | TE |
|---|---|---|---|
| f (mm) | 14.360 | 45.501 | 140.499 |
| $F_{NO}$ | 3.583 | 3.936 | 4.626 |
| 2ω (°) | 71.8 | 25.2 | 8.1 |
| FB (mm) | 34.473 | 47.674 | 48.942 |
| D1 | 1.200 | 21.663 | 35.000 |
| D2 | 23.400 | 8.012 | 1.122 |
| D3 | 1.389 | 11.694 | 41.595 |
| D4 | 21.085 | 13.246 | 0.100 |

EXAMPLE 3

| | | | |
|---|---|---|---|
| $r_1 = 89.318$ | $d_1 = 1.500$ | $n_{d1} = 1.84666$ | $\nu_{d1} = 23.78$ |
| $r_2 = 45.943$ | $d_2 = 8.600$ | $n_{d2} = 1.60311$ | $\nu_{d2} = 60.64$ |
| $r_3 = -421.790$ | $d_3 = 0.100$ | | |
| $r_4 = 38.485$ | $d_4 = 5.000$ | $n_{d3} = 1.49700$ | $\nu_{d3} = 81.54$ |
| $r_5 = 159.848$ | $d_5 = D1$ | | |
| $r_6 = -1925.623$ (Aspheric) | $d_6 = 0.850$ | $n_{d4} = 1.77250$ | $\nu_{d4} = 49.60$ |
| $r_7 = 18.057$ | $d_7 = 5.976$ | | |
| $r_8 = -27.494$ (Aspheric) | $d_8 = 0.800$ | $n_{d5} = 1.76200$ | $\nu_{d5} = 40.10$ |
| $r_9 = 26.944$ | $d_9 = 0.222$ | | |
| $r_{10} = 29.107$ | $d_{10} = 5.678$ | $n_{d6} = 1.84666$ | $\nu_{d6} = 23.78$ |
| $r_{11} = -14.567$ | $d_{11} = 0.850$ | $n_{d7} = -1.80100$ | $\nu_{d7} = 34.97$ |
| $r_{12} = 81.707$ | $d_{12} = D2$ | | |
| $r_{13} = $ (Stop) | $d_{13} = 0.850$ | | |
| $r_{14} = 20.470$ (Aspheric) | $d_{14} = 3.750$ | $n_{d8} = 1.48749$ | $\nu_{d8} = 70.23$ |
| $r_{15} = -30.742$ | $d_{15} = D3$ | | |
| $r_{16} = -50.500$ | $d_{16} = 0.850$ | $n_{d9} = 1.78590$ | $\nu_{d9} = 44.20$ |
| $r_{17} = 179.821$ | $d_{17} = D4$ | | |
| $r_{18} = 37.947$ | $d_{18} = 6.017$ | $n_{d10} = 1.49700$ | $vd_{10} = 81.54$ |
| $r_{19} = -27.466$ | $d_{19} = 0.700$ | $n_{d11} = 1.80518$ | $\nu_{d11} = 25.42$ |
| $r_{20} = -78.435$ | $d_{20} = 0.100$ | | |
| $r_{21} = 54.447$ (Aspheric) | $d_{21} = 2.974$ | $n_{d12} = 1.60311$ | $\nu_{d12} = 60.64$ |
| $r_{22} = -106.590$ (Aspheric) | | | |

Aspherical Coefficients

6th surface $K = 0.0000$
$A_4 = 2.0650 \times 10^{-5}$
$A_6 = -3.5562 \times 10^{-9}$
$A_8 = 1.0752 \times 10^{-10}$
$A_{10} = 9.2537 \times 10^{-12}$ 8th surface $K = 0.0000$
$A_4 = -2.7627 \times 10^{-5}$
$A_6 = -1.3305 \times 10^{-7}$
$A_8 = -2.4215 \times 10^{-10}$
$A_{10} = 9.0912 \times 10^{-12}$ 14th surface $K = 0.0000$
$A_4 = -2.5925 \times 10^{-5}$
$A_6 = -4.5685 \times 10^{-8}$
$A_8 = 4.1569 \times 10^{-10}$
$A_{10} = -3.7206 \times 10^{-12}$ 21th surface $K = 0.0000$
$A_4 = 7.8335 \times 10^{-6}$
$A_6 = -2.1504 \times 10^{-8}$
$A_8 = 1.1794 \times 10^{-10}$
$A_{10} = -6.0983 \times 10^{-15}$ 22th surface $K = 0.0000$
$A_4 = 1.8613 \times 10^{-5}$
$A_6 = -2.3916 \times 10^{-8}$
$A_8 = 1.1243 \times 10^{-10}$
$A_{10} = 0.0000$ Zooming Data

| | WE | ST | TE |
|---|---|---|---|
| f (mm) | 14.360 | 45.500 | 140.500 |
| $F_{NO}$ | 3.673 | 3.897 | 4.392 |
| 2ω (°) | 51.6 | 24.9 | 8.2 |
| FB (mm) | 34.751 | 47.054 | 45.988 |
| D1 | 1.200 | 21.150 | 33.259 |
| D2 | 23.400 | 8.306 | 1.122 |
| D3 | 1.634 | 11.062 | 38.777 |
| D4 | 22.958 | 15.281 | 1.900 |

EXAMPLE 4

| | | | |
|---|---|---|---|
| $r_1 = 89.152$ | $d_1 = 1.500$ | $n_{d1} = 1.84666$ | $\nu_{d1} = 23.78$ |
| $r_2 = 45.882$ | $d_2 = 8.600$ | $n_{d2} = 1.60311$ | $\nu_{d2} = 60.64$ |
| $r_3 = -419.179$ | $d_3 = 0.100$ | | |
| $r_4 = 38.411$ | $d_4 = 5.000$ | $n_{d3} = 1.49700$ | $\nu_{d3} = 81.54$ |
| $r_5 = 158.939$ | $d_5 = D1$ | | |
| $r_6 = -2307.270$ (Aspheric) | $d_6 = 0.850$ | $n_{d4} = 1.77250$ | $\nu_{d4} = 49.60$ |
| $r_7 = 17.969$ | $d_7 = 5.912$ | | |
| $r_8 = -27.885$ (Aspheric) | $d_8 = 0.800$ | $n_{d5} = 1.76200$ | $\nu_{d5} = 40.10$ |
| $r_9 = 26.513$ | $d_9 = 0.222$ | | |
| $r_{10} = 28.519$ | $d_{10} = 5.678$ | $n_{d6} = 1.84666$ | $\nu_{d6} = 23.78$ |
| $r_{11} = -14.662$ | $d_{11} = 0.850$ | $n_{d7} = 1.80100$ | $\nu_{d7} = 34.97$ |
| $r_{12} = 78.835$ | $d_{12} = D2$ | | |
| $r_{13} = \infty$ (Stop) | $d_{13} = 0.850$ | | |
| $r_{14} = 20.371$ (Aspheric) | $d_{14} = 3.750$ | $n_{d8} = 1.48749$ | $\nu_{d8} = 70.23$ |
| $r_{15} = -31.030$ | $d_{15} = D3$ | | |
| $r_{16} = -50.500$ | $d_{16} = 0.850$ | $n_{d9} = 1.78590$ | $\nu_{d9} = 44.20$ |
| $r_{17} = 181.728$ | $d_{17} = D4$ | | |
| $r_{18} = 38.678$ | $d_{18} = 6.128$ | $n_{d10} = 1.49700$ | $\nu_{d10} = 81.54$ |
| $r_{19} = -26.037$ | $d_{19} = 0.700$ | $n_{d11} = 1.80518$ | $\nu_{d11} = 25.42$ |
| $r_{20} = -66.745$ | $d_{20} = 0.145$ | | |
| $r_{21} = 41.819$ (Aspheric) | $d_{21} = 4.045$ | $n_{d12} = 1.60311$ | $\nu_{d12} = 60.64$ |
| $r_{22} = -457.095$ (Aspheric) | | | |

Aspherical Coefficients

6th surface $K = 0.0000$
$A_4 = 2.0699 \times 10^{-5}$
$A_6 = -4.1251 \times 10^{-9}$
$A_8 = 1.1112 \times 10^{-10}$
$A_{10} = 0.0000$ 8th surface $K = 0.0000$
$A_4 = -2.8114 \times 10^{-5}$
$A_6 = -1.2893 \times 10^{-7}$
$A_8 = -2.8298 \times 10^{-10}$
$A_{10} = 9.1108 \times 10^{-12}$ 14th surface $K = = 0.0000$
$A_4 = -2.5544 \times 10^{-5}$
$A_6 = -5.1169 \times 10^{-8}$
$A_8 = 4.6979 \times 10^{-10}$
$A_{10} = -4.1023 \times 10^{-12}$ 21th surface $K = 0.0000$
$A_4 = 1.2216 \times 10^{-5}$
$A_6 = -2.1992 \times 10^{-9}$
$A_8 = 1.2702 \times 10^{-10}$
$A_{10} = 1.8308 \times 10^{-14}$ 22th surface $K = 0.0000$
$A_4 = 2.4188 \times 10^{-5}$
$A_6 = -4.6120 \times 10^{-9}$
$A_8 = 1.4094 \times 10^{-10}$
$A_{10} = 0.0000$ Zooming Data

| | WE | ST | TE |
|---|---|---|---|
| f (mm) | 14.360 | 45.500 | 140.500 |
| $F_{NO}$ | 3.660 | 3.921 | 4.423 |
| 2ω (°) | 74.1 | 24.9 | 8.2 |
| FB (mm) | 33.715 | 45.952 | 44.789 |
| D1 | 1.200 | 21.143 | 33.231 |
| D2 | 23.400 | 8.330 | 1.122 |
| D3 | 1.673 | 11.054 | 38.777 |
| D4 | 22.806 | 15.264 | 1.900 |

EXAMPLE 5

| | | | |
|---|---|---|---|
| $r_1 = 91.941$ | $d_1 = 1.500$ | $n_{d1} = 1.84666$ | $\nu_{d1} = 23.78$ |
| $r_2 = 47.142$ | $d_2 = 8.600$ | $n_{d2} = 1.60311$ | $\nu_{d2} = 60.64$ |
| $r_3 = -403.678$ | $d_3 = 0.178$ | | |
| $r_4 = 40.752$ | $d_4 = 5.000$ | $n_{d3} = 1.49700$ | $\nu_{d3} = 81.54$ |
| $r_5 = 197.015$ | $d_5 = D1$ | | |
| $r_6 = 103.184$ (Aspheric) | $d_6 = 0.850$ | $n_{d4} = 1.77250$ | $\nu_{d4} = 49.60$ |
| $r_7 = 14.488$ | $d_7 = 5.563$ | | |
| $r_8 = -22.871$ (Aspheric) | $d_8 = 0.800$ | $n_{d5} = 1.79952$ | $\nu_{d5} = 42.22$ |
| $r_9 = 44.615$ | $d_9 = 0.222$ | | |
| $r_{10} = 46.819$ | $d_{10} = 5.678$ | $n_{d6} = 1.84666$ | $\nu_{d6} = 23.78$ |
| $r_{11} = -14.396$ | $d_{11} = 0.800$ | $n_{d7} = 1.80100$ | $\nu_{d7} = 34.97$ |
| $r_{12} = 356.669$ | $d_{12} = D2$ | | |
| $r_{13} = \infty$ (Stop) | $d_{13} = 0.800$ | | |
| $r_{14} = 21.174$ (Aspheric) | $d_{14} = 3.750$ | $n_{d8} = 1.48749$ | $\nu_{d8} = 70.23$ |
| $r_{15} = -29.161$ | $d_{15} = D3$ | | |
| $r_{16} = -50.500$ | $d_{16} = 1.853$ | $n_{d9} = 1.78590$ | $\nu_{d9} = 44.20$ |
| $r_{17} = 258.833$ | $d_{17} = D4$ | | |
| $r_{18} = 27.025$ | $d_{18} = 9.415$ | $n_{d10} = 1.49700$ | $\nu_{d10} = 81.54$ |
| $r_{19} = -22.418$ | $d_{19} = 0.800$ | $nd_{11} = 1.84666$ | $\nu_{d11} = 23.78$ |
| $r_{20} = -40.505$ | $d_{20} = 1.200$ | | |
| $r_{21} = -59.684$ (Aspheric) | $d_{21} = 1.864$ | $n_{d12} = 1.48749$ | $\nu_{d12} = 70.23$ |
| $r_{22} = -39.294$ (Aspheric) | | | |

Aspherical Coefficients

6th surface $K = 0.0000$
$A_4 = 1.0707 \times 10^{-5}$
$A_6 = 5.1530 \times 10^{-9}$
$A_8 = 2.9734 \times 10^{-10}$
$A_{10} = 0.0000$ 8th surface $K = 0.0000$
$A_4 = -2.2546 \times 10^{-5}$
$A_6 = -9.6101 \times 10^{-8}$
$A_8 = -2.4231 \times 10^{-9}$
$A_{10} = 2.2900 \times 10^{-11}$ 14th surface $K = = 0.0000$
$A_4 = -2.3976 \times 10^{-5}$
$A_6 = -3.0360 \times 10^{-8}$
$A_8 = 1.5643 \times 10^{-10}$
$A_{10} = -1.8061 \times 10^{-12}$ 21th surface $K = 0.0000$
$A_4 = -8.4196 \times 10^{-5}$
$A_6 = -1.0340 \times 10^{-7}$
$A_8 = 1.6480 \times 10^{-9}$
$A_{10} = -5.3645 \times 10^{-13}$ 22th surface $K = 0.0000$
$A_4 = -6.2003 \times 10^{-5}$
$A_6 = -4.4676 \times 10^{-8}$
$A_8 = 1.1900 \times 10^{-9}$
$A_{10} = 0.0000$ Zooming Data

| | WE | ST | TE |
|---|---|---|---|
| f (mm) | 14.380 | 45.601 | 140.892 |
| $F_{NO}$ | 3.788 | 4.113 | 4.448 |
| $2\omega$ (°) | 74.0 | 24.3 | 8.0 |
| FB (mm) | 32.049 | 45.198 | 41.570 |
| D1 | 1.200 | 21.673 | 35.000 |
| D2 | 23.400 | 8.401 | 1.122 |
| D3 | 1.255 | 9.983 | 38.777 |
| D4 | 18.979 | 12.957 | 1.900 |

EXAMPLE 6

| | | | |
|---|---|---|---|
| $r_1 = 88.508$ | $d_1 = 1.500$ | $n_{d1} = 1.84666$ | $\nu_{d1} = 23.78$ |
| $r_2 = 46.109$ | $d_2 = 8.600$ | $n_{d2} = 1.60311$ | $\nu_{d2} = 60.64$ |
| $r_3 = -437.067$ | $d_3 = 1.140$ | | |
| $r_4 = 38.017$ | $d_4 = 5.000$ | $n_{d3} = 1.49700$ | $\nu_{d3} = 81.54$ |
| $r_5 = 152.472$ | $d_5 = D1$ | | |
| $r_6 = -175.257$ (Aspheric) | $d_6 = 0.850$ | $n_{d4} = 1.77250$ | $\nu_{d4} = 49.60$ |
| $r_7 = 17.553$ | $d_7 = 5.848$ | | |
| $r_8 = -27.666$ (Aspheric) | $d_8 = 0.800$ | $n_{d5} = 1.80100$ | $\nu_{d5} = 34.97$ |
| $r_9 = 30.014$ | $d_9 = 5.678$ | $n_{d6} = 1.84666$ | $\nu_{d6} = 23.78$ |
| $r_{10} = -12.706$ | $d_{10} = 0.800$ | $n_{d7} = 1.80100$ | $\nu_{d7} = 34.97$ |
| $r_{11} = 126.853$ | $d_{11} = D2$ | | |
| $r_{12} = $ (Stop) | $d_{12} = 0.850$ | | |
| $r_{13} = 20.210$ (Aspheric) | $d_{13} = 3.750$ | $n_{d8} = 1.48749$ | $\nu_{d8} = 70.23$ |
| $r_{14} = -29.530$ | $d_{14} = D3$ | | |
| $r_{15} = -50.500$ | $d_{15} = 0.800$ | $n_{d9} = 1.78590$ | $\nu_{d9} = 44.20$ |
| $r_{16} = 154.049$ | $d_{16} = D4$ | | |
| $r_{17} = 34.452$ | $d_{17} = 6.197$ | $n_{d10} = 1.49700$ | $\nu_{d10} = 81.54$ |
| $r_{18} = -27.657$ | $d_{18} = 0.700$ | $n_{d11} = 1.80518$ | $\nu_{d11} = 25.42$ |
| $r_{19} = -90.725$ | $d_{19} = 1.090$ | | |
| $r_{20} = 49.917$ (Aspheric) | $d_{20} = 2.821$ | $n_{d12} = 1.62299$ | $\nu_{d12} = 58.16$ |
| $r_{21} = -141.675$ (Aspheric) | | | |

Aspherical Coefficients

6th surface $K = 0.0000$
$A_4 = 3.1081 \times 10^{-5}$
$A_6 = -3.3915 \times 10^{-8}$
$A_8 = 1.7112 \times 10^{-10}$
$A_{10} = 0.0000$ 8th surface $K = 0.0000$
$A_4 = -3.6433 \times 10^{-5}$
$A_6 = -1.6965 \times 10^{-7}$
$A_8 = -3.4629 \times 10^{-10}$
$A_{10} = 9.9705 \times 10^{-12}$ 13th surface $K = 0.0000$
$A_4 = -2.7823 \times 10^{-5}$
$A_6 = -4.7812 \times 10^{-8}$
$A_8 = 3.7430 \times 10^{-10}$
$A_{10} = -3.5612 \times 10^{-12}$ 20th surface $K = 0.0000$
$A_4 = 7.6500 \times 10^{-6}$
$A_6 = -1.6751 \times 10^{-8}$
$A_8 = 5.3713 \times 10^{-11}$
$A_{10} = -6.4434 \times 10^{-15}$ 21th surface $K = 0.0000$
$A_4 = 1.9595 \times 10^{-5}$
$A_6 = -2.0028 \times 10^{-8}$
$A_8 = 4.6375 \times 10^{-11}$
$A_{10} = 0.0000$ Zooming Data

| | WE | ST | TE |
|---|---|---|---|
| f (mm) | 14.360 | 45.500 | 140.500 |
| $F_{NO}$ | 3.970 | 3.989 | 4.474 |
| $2\omega$ (°) | 74.0 | 24.9 | 8.2 |
| FB (mm) | 33.268 | 45.349 | 43.632 |
| D1 | 1.200 | 21.354 | 33.390 |
| D2 | 23.400 | 8.452 | 1.122 |
| D3 | 2.599 | 11.782 | 38.777 |
| D4 | 21.882 | 14.642 | 1.900 |

EXAMPLE 7

| | | | |
|---|---|---|---|
| $r_1 = 89.102$ | $d_1 = 1.500$ | $n_{d1} = 1.84666$ | $\nu_{d1} = 23.78$ |
| $r_2 = 47.111$ | $d_2 = 8.600$ | $n_{d2} = 1.60311$ | $\nu_{d2} = 60.64$ |
| $r_3 = -447.391$ | $d_3 = 0.968$ | | |
| $r_4 = 38.258$ | $d_4 = 5.000$ | $n_{d3} = 1.49700$ | $\nu_{d3} = 81.54$ |
| $r_5 = 149.662$ | $d_5 = D1$ | | |
| $r_6 = -310.882$ (Aspheric) | $d_6 = 0.850$ | $n_{d4} = 1.77250$ | $\nu_{d4} = 49.60$ |
| $r_7 = 16.872$ | $d_7 = 6.042$ | | |
| $r_8 = -26.266$ (Aspheric) | $d_8 = 0.850$ | $n_{d5} = 1.80100$ | $\nu_{d5} = 34.97$ |
| $r_9 = 28.453$ | $d_9 = 5.678$ | $n_{d6} = 1.84666$ | $\nu_{d6} = 23.78$ |
| $r_{10} = -13.008$ | $d_{10} = 0.850$ | $n_{d7} = 1.80100$ | $\nu_{d7} = 34.97$ |
| $r_{11} = 134.521$ | $d_{11} = D2$ | | |
| $r_{12} = \infty$ (Stop) | $d_{12} = 0.850$ | | |
| $r_{13} = 20.478$ (Aspheric) | $d_{13} = 3.750$ | $n_{d8} = 1.49700$ | $\nu_{d8} = 81.54$ |
| $r_{14} = -28.953$ | $d_{14} = D3$ | | |
| $r_{15} = -50.500$ | $d_{15} = 0.850$ | $n_{d9} = 1.75500$ | $\nu_{d9} = 52.32$ |
| $r_{16} = 150.427$ | $d_{16} = D4$ | | |
| $r_{17} = 32.214$ | $d_{17} = 6.185$ | $n_{d10} = 1.48749$ | $\nu_{d10} = 70.23$ |
| $r_{18} = -27.079$ | $d_{18} = 0.700$ | $n_{d11} = 1.76182$ | $\nu_{d11} = 26.52$ |
| $r_{19} = -174.172$ | $d_{19} = 1.495$ | | |
| $r_{20} = 46.901$ (Aspheric) | $d_{20} = 3.139$ | $n_{d12} = 1.60300$ | $\nu_{d12} = 65.44$ |
| $r_{21} = -100.331$ (Aspheric) | | | |

Aspherical Coefficients

6th surface $K = 0.0000$
$A_4 = 2.7938 \times 10^{-5}$
$A_6 = -3.2330 \times 10^{-8}$
$A_8 = 1.9137 \times 10^{-10}$
$A_{10} = 0.0000$ 8th surface $K = 0.0000$
$A_4 = -3.5625 \times 10^{-5}$
$A_6 = -1.4933 \times 10^{-7}$
$A_8 = -7.6603 \times 10^{-10}$
$A_{10} = 1.1474 \times 10^{-11}$ 13th surface $K = 0.0000$
$A_4 = -2.7661 \times 10^{-5}$
$A_6 = -4.5255 \times 10^{-8}$
$A_8 = 3.6206 \times 10^{-10}$
$A_{10} = -3.3238 \times 10^{-12}$ 20th surface $K = 0.0000$
$A_4 = 5.8681 \times 10^{-6}$
$A_6 = -1.8134 \times 10^{-8}$
$A_8 = 3.3269 \times 10^{-11}$
$A_{10} = 1.7867 \times 10^{-14}$ 21th surface $K = 0.0000$
$A_4 = 1.9918 \times 10^{-5}$
$A_6 = -2.1955 \times 10^{-8}$
$A_8 = 2.9455 \times 10^{-11}$
$A_{10} = 0.0000$ Zooming Data

| | WE | ST | TE |
|---|---|---|---|
| f (mm) | 14.360 | 45.500 | 140.500 |
| $F_{NO}$ | 3.807 | 4.059 | 4.499 |
| 2ω (°) | 74.1 | 24.8 | 8.1 |
| FB (mm) | 32.153 | 44.633 | 42.874 |
| D1 | 1.200 | 21.539 | 33.781 |
| D2 | 23.400 | 8.505 | 1.122 |
| D3 | 2.547 | 11.478 | 38.777 |
| D4 | 21.178 | 14.365 | 1.900 |

EXAMPLE 8

| | | | |
|---|---|---|---|
| $r_1 = 93.344$ | $d_1 = 1.500$ | $n_{d1} = 1.84666$ | $\nu_{d1} = 23.78$ |
| $r_2 = 46.744$ | $d_2 = 7.922$ | $n_{d2} = 1.60311$ | $\nu_{d2} = 60.64$ |
| $r_3 = -524.234$ | $d_3 = 0.100$ | | |
| $r_4 = 39.015$ | $d_4 = 6.758$ | $n_{d3} = 1.49700$ | $\nu_{d3} = 81.54$ |
| $r_5 = 149.122$ | $d_5 = D1$ | | |
| $r_6 = 255.748$ (Aspheric) | $d_6 = 0.850$ | $n_{d4} = 1.77250$ | $\nu_{d4} = 49.60$ |
| $r_7 = 15.824$ | $d_7 = 5.378$ | | |
| $r_8 = -31.116$ (Aspheric) | $d_8 = 0.850$ | $n_{d5} = 1.80100$ | $\nu_{d5} = 34.97$ |
| $r_9 = 30.906$ | $d_9 = 0.100$ | | |
| $r_{10} = 29.966$ | $d_{10} = 4.700$ | $n_{d6} = 1.84666$ | $\nu_{d6} = 23.78$ |
| $r_{11} = -20.823$ | $d_{11} = 0.299$ | | |
| $r_{12} = -18.374$ | $d_{12} = 0.800$ | $n_{d7} = 1.74100$ | $\nu_{d7} = 52.64$ |
| $r_{13} = 92.055$ | $d_{13} = D2$ | | |
| $r_{14} = \infty$ (Stop) | $d_{14} = 0.850$ | | |
| $r_{15} = 20.681$ (Aspheric) | $d_{15} = 3.712$ | $n_{d8} = 1.48749$ | $\nu_{d8} = 70.23$ |
| $r_{16} = -25.987$ | $d_{16} = D3$ | | |
| $r_{17} = -34.514$ | $d_{17} = 0.800$ | $n_{d9} = 1.84666$ | $\nu_{d9} = 23.78$ |
| $r_{18} = -52.760$ | $d_{18} = 0.800$ | $n_{d10} = 1.69680$ | $\nu_{d10} = 55.53$ |
| $r_{19} = 243.654$ | $d_{19} = D4$ | | |
| $r_{20} = 29.515$ | $d_{20} = 6.403$ | $n_{d11} = 1.49700$ | $\nu_{d11} = 81.54$ |
| $r_{21} = -36.176$ | $d_{21} = 0.700$ | $n_{d12} = 1.80518$ | $\nu_{d12} = 25.42$ |
| $r_{22} = -224.727$ | $d_{22} = 0.100$ | | |
| $r_{23} = 64.418$ (Aspheric) | $d_{23} = 3.306$ | $n_{d13} = 1.60311$ | $\nu_{d13} = 60.64$ |
| $r_{24} = -58.349$ (Aspheric) | | | |

Aspherical Coefficients

6th surface $K = 0.0000$
$A_4 = 1.4207 \times 10^{-5}$
$A_6 = 4.9259 \times 10^{-9}$
$A_8 = 1.6629 \times 10^{-10}$
$A_{10} = 0.0000$ 8th surface $K = 0.0000$
$A_4 = -1.6351 \times 10^{-6}$
$A_6 = -6.4256 \times 10^{-8}$
$A_8 = -1.4843 \times 10^{-9}$
$A_{10} = 1.3925 \times 10^{-11}$ 15th surface $K = 0.0000$
$A_4 = -2.9609 \times 10^{-5}$
$A_6 = -3.5786 \times 10^{-8}$
$A_8 = 2.9034 \times 10^{-10}$
$A_{10} = -2.7109 \times 10^{-12}$ 23th surface $K = 0.0000$
$A_4 = -5.7466 \times 10^{-6}$
$A_6 = -7.3847 \times 10^{-9}$
$A_8 = -1.4914 \times 10^{-10}$
$A_{10} = -7.3752 \times 10^{-14}$ 24th surface $K = 0.0000$
$A_4 = 1.0931 \times 10^{-5}$
$A_6 = -4.7066 \times 10^{-9}$
$A_8 = -1.8045 \times 10^{-10}$
$A_{10} = 0.0000$ Zooming Data

| | WE | ST | TE |
|---|---|---|---|
| f (mm) | 14.779 | 45.772 | 147.778 |
| $F_{NO}$ | 3.626 | 3.917 | 4.546 |
| 2ω (°) | 72.5 | 24.9 | 7.8 |
| FB (mm) | 31.999 | 45.239 | 43.572 |
| D1 | 1.200 | 21.675 | 35.000 |
| D2 | 23.400 | 8.285 | 1.122 |
| D3 | 5.051 | 12.705 | 38.777 |
| D4 | 18.868 | 12.942 | 1.900 |

EXAMPLE 9

| | | | |
|---|---|---|---|
| $r_1 = 94.424$ | $d_1 = 1.500$ | $n_{d1} = 1.84666$ | $\nu_{d1} = 23.78$ |
| $r_2 = 47.356$ | $d_2 = 7.922$ | $n_{d2} = 1.60311$ | $\nu d_{d2} = 60.64$ |
| $r_3 = -742.088$ | $d_3 = 0.100$ | | |
| $r_4 = 40.057$ | $d_4 = 6.758$ | $n_{d3} = 1.49700$ | $\nu_{d3} = 81.54$ |
| $r_5 = 162.073$ | $d_5 = D1$ | | |
| $r_6 = 159.491$ (Aspheric) | $d_6 = 0.850$ | $n_{d4} = 1.77250$ | $\nu_{d4} = 49.60$ |
| $r_7 = 15.691$ | $d_7 = 5.378$ | | |
| $r_8 = -32.417$ (Aspheric) | $d_8 = 0.850$ | $n_{d5} = 1.80100$ | $\nu_{d5} = 34.97$ |
| $r_9 = 24.145$ | $d_9 = 0.100$ | | |
| $r_{10} = 24.714$ | $d_{10} = 4.700$ | $n_{d6} = 1.84666$ | $\nu_{d6} = 23.78$ |
| $r_{11} = -22.131$ | $d_{11} = 0.386$ | | |
| $r_{12} = -19.147$ | $d_{12} = 0.800$ | $n_{d7} = 1.74100$ | $\nu_{d7} = 52.64$ |
| $r_{13} = 103.786$ | $d_{13} = D2$ | | |
| $r_{14} = \infty$ (Stop) | $d_{14} = 0.850$ | | |
| $r_{15} = 20.649$ (Aspheric) | $d_{15} = 3.985$ | $n_{d8} = 1.48749$ | $\nu_{d8} = 70.23$ |
| $r_{16} = -27.135$ | $d_{16} = D3$ | | |
| $r_{17} = -40.322$ (Aspheric) | $d_{17} = 0.800$ | $n_{d9} = 1.84666$ | $\nu_{d9} = 23.78$ |
| $r_{18} = -47.342$ | $d_{18} = 0.800$ | $n_{d10} = 1.69680$ | $\nu_{d10} = 55.53$ |
| $r19 = 104.936$ | $d_{19} = D4$ | | |
| $r20 = 32.117$ | $d_{20} = 6.314$ | $n_{d11} = 1.49700$ | $\nu_{d11} = 81.54$ |
| $r21 = -33.356$ | $d_{21} = 0.700$ | $n_{d12} = 1.80518$ | $\nu_{d12} = 25.42$ |
| $r22 = -188.199$ | $d_{22} = 0.100$ | | |
| $r23 = 70.676$ (Aspheric) | $d_{23} = 3.245$ | $n_{d13} = 1.60311$ | $\nu_{d13} = 60.64$ |
| $r24 = -51.964$ (Aspheric) | | | |

Aspherical Coefficients

6th surface $K = 0.0000$
$A_4 = 1.2395 \times 10^{-5}$
$A_6 = 6.5047 \times 10^{-9}$
$A_8 = 1.6230 \times 10^{-10}$
$A_{10} = 0.0000$ 8th surface $K = 0.0000$
$A_4 = -1.2587 \times 10^{-5}$
$A_6 = -6.5323 \times 10^{-8}$
$A_8 = -1.2827 \times 10^{-9}$
$A_{10} = 1.1688 \times 10^{-11}$ 15th surface $K = 0.0000$
$A_4 = -2.8214 \times 10^{-5}$
$A_6 = -3.8761 \times 10^{-8}$
$A_8 = 3.6238 \times 10^{-10}$
$A_{10} = -2.8253 \times 10^{-12}$ 17th surface $K = 0.0000$
$A_4 = 0.0000$
$A_6 = 3.7342 \times 10^{-8}$
$A_8 = -7.4920 \times 10^{-10}$
$A_{10} = 3.6220 \times 10^{-12}$ 23th surface $K = 0.0000$
$A_4 = -5.8598 \times 10^{-6}$
$A_6 = -1.1898 \times 10^{-8}$
$A_8 = -1.0512 \times 10^{-10}$
$A_{10} = -8.2744 \times 10^{-14}$ 24th surface $K = 0.0000$
$A_4 = 8.6207 \times 10^{-6}$
$A_6 = -8.5201 \times 10^{-9}$
$A_8 = -1.4232 \times 10^{-10}$
$A_{10} = 0.0000$ Zooming Data

| | WE | ST | TE |
|---|---|---|---|
| f (mm) | 14.778 | 46.770 | 150.600 |
| $F_{NO}$ | 3.640 | 4.014 | 4.937 |
| $2\omega$ (°) | 72.7 | 24.4 | 7.6 |
| FB (mm) | 35.808 | 50.476 | 56.542 |
| D1 | 1.200 | 21.921 | 35.000 |
| D2 | 23.400 | 7.912 | 1.122 |
| D3 | 2.451 | 10.698 | 36.234 |
| D4 | 19.769 | 13.712 | 1.900 |

EXAMPLE 10

| | | | |
|---|---|---|---|
| $r_1 = 96.148$ | $d_1 = 1.500$ | $n_{d1} = 1.84666$ | $\nu_{d1} = 23.78$ |
| $r_2 = 58.919$ | $d_2 = 8.600$ | $n_{d2} = 1.60300$ | $\nu_{d2} = 65.44$ |
| $r_3 = -485.689$ | $d_3 = 0.100$ | | |
| $r_4 = 51.466$ | $d_4 = 5.000$ | $n_{d3} = 1.49700$ | $\nu_{d3} = 81.54$ |
| $r_5 = 154.194$ | $d_5 =$ (Variable) | | |
| $r_6 = 181.666$ (Aspheric) | $d_6 = 0.850$ | $n_{d4} = 1.80100$ | $\nu_{d4} = 34.97$ |
| $r_7 = 17.710$ | $d_7 = 5.989$ | | |
| $r_8 = -35.508$ (Aspheric) | $d_8 = 0.850$ | $n_{d5} = 1.67003$ | $\nu_{d5} = 47.23$ |
| $r_9 = 19.375$ | $d_9 = 0.100$ | | |
| $r_{10} = 19.051$ | $d_{10} = 4.700$ | $n_{d6} = 1.84666$ | $\nu_{d6} = 23.78$ |
| $r_{11} = -46.161$ | $d_{11} = 1.830$ | | |
| $r_{12} = -17.851$ | $d_{12} = 0.750$ | $n_{d7} = 1.74100$ | $\nu_{d7} = 52.64$ |
| $r_{13} = -234.238$ | $d_{13} =$ (Variable) | | |
| $r_{14} = \infty$ (Stop) | $d_{14} = 1.021$ | | |
| $r_{15} = 27.177$ (Aspheric) | $d_{15} = 3.750$ | $n_{d8} = 1.48749$ | $\nu_{d8} = 70.23$ |
| $r_{16} = -27.602$ | $d_{16} =$ (Variable) | | |
| $r_{17} = -50.167$ | $d_{17} = 0.650$ | $n_{d9} = 1.77250$ | $\nu_{d9} = 49.60$ |
| $r_{18} = 131.563$ | $d_{18} =$ (Variable) | | |
| $r_{19} = 94.372$ | $d_{19} = 4.115$ | $n_{d10} = 1.49700$ | $\nu_{d10} = 81.54$ |
| $r_{20} = -15.230$ | $d_{20} = 0.600$ | $n_{d11} = 1.80518$ | $\nu_{d11} = 25.42$ |
| $r_{21} = -23.459$ | $d_{21} = 10.508$ | | |
| $r_{22} = 43.472$ (Aspheric) | $d_{22} = 5.483$ | $n_{d12} = 1.60311$ | $\nu_{d12} = 60.64$ |
| $r_{23} = -511.216$ (Aspheric) | | | |

Aspherical Coefficients

6th surface $K = 0.0000$
$A_4 = 1.1577 \times 10^{-5}$
$A_6 = 2.5463 \times 10^{-8}$
$A_8 = 8.1116 \times 10^{-11}$
$A_{10} = 0.0000$ 8th surface $K = 0.0000$
$A_4 = -4.4549 \times 10^{-6}$
$A_6 = -9.6370 \times 10^{-8}$
$A_8 = -1.2314 \times 10^{-9}$
$A_{10} = 1.2357 \times 10^{-11}$ 15th surface $K = 0.0000$
$A_4 = -2.7369 \times 10^{-5}$
$A_6 = 1.2966 \times 10^{-8}$
$A_8 = 4.7574 \times 10^{-10}$
$A_{10} = -4.4510 \times 10^{-12}$ 22th surface $K = 0.0000$
$A_4 = 1.0579 \times 10^{-5}$
$A_6 = 1.8428 \times 10^{-8}$
$A_8 = 3.1382 \times 10^{-10}$
$A_{10} = -1.4942 \times 10^{-13}$ 23th surface $K = 0.0000$
$A_4 = 1.6674 \times 10^{-5}$
$A_6 = 1.5129 \times 10^{-8}$
$A_8 = 4.1935 \times 10^{-10}$
$A_{10} = 0.0000$ -continued Zooming Data (∞)

|  | WE | ST | TE |
|---|---|---|---|
| f (mm) | 14.550 | 46.770 | 140.010 |
| $F_{NO}$ | 3.600 | 4.151 | 4.412 |
| 2ω (°) | 73.7 | 24.1 | 8.0 |
| FB (mm) | 28.650 | 50.381 | 50.955 |
| $d_5$ | 0.778 | 22.603 | 45.158 |
| $d_{13}$ | 23.682 | 6.989 | 0.100 |
| $d_{16}$ | 7.181 | 13.277 | 21.412 |
| $d_{18}$ | 12.118 | 3.325 | 0.100 |

Focusing Data (1.5 m)

|  | WE | ST | TE |
|---|---|---|---|
| $d_{14}$ | 1.391 | 1.577 | 4.477 |
| $d_{16}$ | 6.811 | 12.721 | 17.956 |

EXAMPLE 11

| $r_1 = 91.054$ | $d_1 = 1.500$ | $n_{d1} = 1.84666$ | $v_{d1} = 23.78$ |
|---|---|---|---|
| $r_2 = 54.532$ | $d_2 = 8.600$ | $n_{d2} = 1.60311$ | $v_{d2} = 60.64$ |
| $r_3 = -661.853$ | $d_3 = 0.100$ | | |
| $r_4 = 46.573$ | $d_4 = 5.000$ | $n_{d3} = 1.49700$ | $v_{d3} = 81.54$ |
| $r_5 = 142.871$ | $d_5 = $ (Variable) | | |
| $r_6 = 95.771$ (Aspheric) | $d_6 = 0.850$ | $n_{d4} = 1.80100$ | $v_{d4} = 34.97$ |
| $r_7 = 15.110$ | $d_7 = 6.363$ | | |
| $r_8 = -35.351$ (Aspheric) | $d_8 = 0.850$ | $n_{d5} = 1.74400$ | $v_{d5} = 44.78$ |
| $r_9 = 18.436$ | $d_9 = 0.100$ | | |
| $r_{10} = 18.410$ | $d_{10} = 4.700$ | $n_{d6} = 1.84666$ | $v_{d6} = 23.78$ |
| $r_{11} = -41.901$ | $d_{11} = 1.510$ | | |
| $r_{12} = -19.590$ | $d_{12} = 0.750$ | $n_{d7} = 1.74100$ | $v_{d7} = 52.64$ |
| $r_{13} = -80.542$ | $d_{13} = $ (Variable) | | |
| $r_{14} = \infty$ (Stop) | $d_{14} = 0.282$ | | |
| $r_{15} = 24.082$ (Aspheric) | $d_{15} = 3.750$ | $n_{d8} = 1.48749$ | $v_{d8} = 70.23$ |
| $r_{16} = -35.766$ | $d_{16} = $ (Variable) | | |
| $r_{17} = -51.102$ | $d_{17} = 0.750$ | $n_{d9} = 1.77250$ | $v_{d9} = 49.60$ |
| $r_{18} = 81.248$ | $d_{18} = $ (Variable) | | |
| $r_{19} = 68.833$ | $d_{19} = 4.215$ | $n_{d10} = 1.49700$ | $v_{d10} = 81.54$ |
| $r_{20} = -14.308$ | $d_{20} = 0.600$ | $n_{d11} = 1.80518$ | $v_{d11} = 25.42$ |
| $r_{21} = -20.792$ | $d_{21} = 14.798$ | | |
| $r_{22} = 19.914$ (Aspheric) | $d_{22} = 1.972$ | $n_{d12} = 1.60311$ | $vd_{12} = 60.64$ |
| $r_{23} = 30.732$ (Aspheric) | | | |

Aspherical Coefficients

6th surface $K = 0.0000$
$A_4 = 3.8600 \times 10^{-6}$
$A_6 = 1.8443 \times 10^{-8}$
$A_8 = 3.8163 \times 10^{-11}$
$A_{10} = 0.0000$ 8th surface $K = 0.0000$
$A_4 = 4.7757 \times 10^{-6}$
$A_6 = -4.2943 \times 10^{-8}$
$A_8 = -9.0332 \times 10^{-10}$
$A_{10} = 5.7484 \times 10^{-12}$ 15th surface $K = 0.0000$
$A_4 = -2.4127 \times 10^{-5}$
$A_6 = -5.6179 \times 10^{-8}$
$A_8 = 1.9592 \times 10^{-9}$
$A_{10} = -1.7954 \times 10^{-11}$ 22th surface $K = 0.0000$
$A_4 = -4.2522 \times 10^{-7}$
$A_6 = -7.5812 \times 10^{-9}$
$A_8 = 4.7213 \times 10^{-11}$
$A_{10} = 1.3999 \times 10^{-13}$ 23th surface $K = 0.0000$
$A_4 = 1.2987 \times 10^{-5}$
$A_6 = -5.1984 \times 10^{-10}$
$A_8 = 1.2972 \times 10^{-10}$
$A_{10} = 0.0000$ Zooming Data (∞)

|  | WE | ST | TE |
|---|---|---|---|
| f (mm) | 14.550 | 46.770 | 140.010 |
| $F_{NO}$ | 3.672 | 4.171 | 4.133 |
| 2ω (°) | 73.7 | 24.2 | 8.2 |
| FB (mm) | 27.005 | 41.973 | 52.142 |
| $d_5$ | 0.778 | 25.830 | 41.824 |
| $d_{13}$ | 28.150 | 10.799 | 0.100 |
| $d_{16}$ | 7.647 | 12.713 | 20.000 |
| $d_{18}$ | 8.506 | 4.515 | 1.068 |

Focusing Data (1.5m)

|  | WE | ST | TE |
|---|---|---|---|
| $d_{13}$ | 28.399 | 11.627 | 3.701 |

EXAMPLE 12

| $r_1 = 95.816$ | $d_1 = 1.500$ | $n_{d1} = 1.84666$ | $v_{d1} = 23.78$ |
|---|---|---|---|
| $r_2 = 57.080$ | $d_2 = 8.600$ | $n_{d2} = 1.60311$ | $v_{d2} = 60.64$ |
| $r_3 = -595.877$ | $d_3 = 0.100$ | | |
| $r_4 = 51.891$ | $d_4 = 5.000$ | $n_{d3} = 1.49700$ | $v_{d3} = 81.54$ |
| $r_5 = 159.655$ | $d_5 = $ (Variable) | | |
| $r_6 = 60.918$ (Aspheric) | $d_6 = 0.850$ | $n_{d4} = 1.80100$ | $vd_4 = 34.97$ |
| $r_7 = 13.633$ | $d_7 = 6.759$ | | |
| $r_8 = -30.855$ (Aspheric) | $d_8 = 0.850$ | $n_{d5} = 1.74400$ | $v_{d5} = 44.78$ |
| $r_9 = 22.170$ | $d_9 = 0.100$ | | |
| $r_{10} = 21.443$ | $d_{10} = 4.700$ | $n_{d6} = 1.84666$ | $v_{d6} = 23.78$ |
| $r_{11} = -37.460$ | $d_{11} = 1.540$ | | |
| $r_{12} = -18.028$ | $d_{12} = 0.750$ | $n_{d7} = 1.74100$ | $v_{d7} = 52.64$ |
| $r_{13} = -51.094$ | $d_{13} = $ (Variable) | | |
| $r_{14} = \infty$ (Stop) | $d_{14} = 1.132$ | | |
| $r_{15} = 21.530$ (Aspheric) | $d_{15} = 3.750$ | $n_{d5} = 1.48749$ | $v_{d5} = 70.23$ |
| $r_{16} = -30.476$ | $d_{16} = $ (Variable) | | |
| $r_{17} = -33.630$ | $d_{17} = 0.750$ | $n_{d9} = 1.77250$ | $v_{d9} = 49.60$ |
| $r_{18} = 37.540$ | $d_{18} = $ (Variable) | | |
| $r_{19} = 34.660$ | $d_{19} = 4.369$ | $n_{d10} = 1.49700$ | $v_{d10} = 81.54$ |
| $r_{20} = -13.974$ | $d_{20} = 0.600$ | $n_{d11} = 1.80518$ | $v_{d11} = 25.42$ |
| r21 = -20.668 | $d_{21} = $ (Variable) | | |
| r22 = 24.634 (Aspheric) | $d_{22} = 2.383$ | $n_{d12} = 1.60311$ | $v_{d12} = 60.64$ |
| r23 = 66.482 (Aspheric) | | | |

Aspherical Coefficients

6th surface $K = 0.0000$
$A_4 = 8.1433 \times 10^{-7}$
$A_6 = 1.0353 \times 10^{-8}$
$A_8 = 5.3072 \times 10^{-11}$
$A_{10} = 0.0000$ 8th surface $K = 0.0000$
$A_4 = 9.3299 \times 10^{-6}$
$A_6 = -3.4823 \times 10^{-8}$
$A_8 = -7.3408 \times 10^{-10}$
$A_{10} = 4.7042 \times 10^{-12}$ -continued 15th surface K = 0.0000
$A_4 = -2.8541 \times 10^{-5}$
$A_6 = -1.0861 \times 10^{-8}$
$A_8 = 5.2954 \times 10^{-10}$
$A_{10} = -5.5308 \times 10^{-12}$ 22th surface K = 0.0000
$A_4 = 8.4723 \times 10^{-6}$
$A_6 = 1.4247 \times 10^{-8}$
$A_8 = -7.7053 \times 10^{-11}$
$A_{10} = -3.9331 \times 10^{-14}$ 23th surface K = 0.0000
$A_4 = 2.3171 \times 10^{-5}$
$A_6 = 1.9749 \times 10^{-8}$
$A_8 = -9.1947 \times 10^{-11}$
$A_{10} = 0.0000$ Zooming Data (∞)

|  | WE | ST | TE |
|---|---|---|---|
| f (mm) | 14.552 | 46.776 | 140.007 |
| $F_{NO}$ | 3.774 | 4.390 | 4.610 |
| 2ω (°) | 73.7 | 24.1 | 8.1 |
| FB (mm) | 26.992 | 47.883 | 50.064 |
| $d_5$ | 0.778 | 24.541 | 46.406 |
| $d_{13}$ | 29.032 | 8.977 | 0.100 |
| $d_{16}$ | 10.019 | 13.654 | 20.000 |
| $d_{18}$ | 4.093 | 2.113 | 1.089 |
| $d_{21}$ | 14.116 | 13.418 | 11.011 |

Focusing Data (2.0 m)

|  | WE | ST | TE |
|---|---|---|---|
| $d_{18}$ | 6.347 | 2.677 | 4.707 |
| $d_{21}$ | 11.862 | 12.855 | 7.393 |

EXAMPLE 13

| | | | |
|---|---|---|---|
| $r_1 = 92.253$ | $d_1 = 1.500$ | $n_{d1} = 1.84666$ | $v_{d1} = 23.78$ |
| $r_2 = 54.366$ | $d_2 = 8.600$ | $n_{d2} = 1.60311$ | $v_{d2} = 60.64$ |
| $r_3 = -726.787$ | $d_3 = 0.100$ | | |
| $r_4 = 48.804$ | $d_4 = 5.000$ | $n_{d3} = 1.49700$ | $v_{d3} = 81.54$ |
| $r_5 = 157.176$ | $d_5 = $ (Variable) | | |
| $r_6 = 92.290$ (Aspheric) | $d_6 = 0.850$ | $n_{d4} = 1.80100$ | $v_{d4} = 34.97$ |
| $r_7 = 15.216$ | $d_7 = 6.827$ | | |
| $r_8 = -29.675$ (Aspheric) | $d_8 = 0.850$ | $n_{d5} = 1.74400$ | $v_{d5} = 44.78$ |
| $r_9 = 20.119$ | $d_9 = 0.100$ | | |
| $r_{10} = 20.429$ | $d_{10} = 4.700$ | $n_{d6} = 1.84666$ | $v_{d6} = 23.78$ |
| $r_{11} = -31.752$ | $d_{11} = 1.748$ | | |
| $r_{12} = -17.416$ | $d_{12} = 0.750$ | $n_{d7} = 1.74100$ | $v_{d7} = 52.64$ |
| $r_{13} = -63.633$ | $d_{13} = $ (Variable) | | |
| $r_{14} = \infty$ (Stop) | $d_{14} = 0.862$ | | |
| $r_{15} = 23.893$ (Aspheric) | $d_{15} = 3.750$ | $n_{d8} = 1.49700$ | $v_{d8} = 81.54$ |
| $r_{16} = -32.227$ | $d_{16} = $ (Variable) | | |
| $r_{17} = -20.715$ | $d_{17} = 0.700$ | $n_{d9} = 1.77250$ | $v_{d9} = 49.60$ |
| $r_{18} = 72.399$ | $d_{18} = $ (Variable) | | |
| $r_{19} = 34.516$ | $d_{19} = 4.000$ | $n_{d10} = 1.49700$ | $v_{d10} = 81.54$ |
| $r_{20} = -15.986$ | $d_{20} = 0.600$ | $n_{d11} = 1.80518$ | $v_{d11} = 25.42$ |
| $r_{21} = -21.973$ | $d_{21} = $ (Variable) | | |
| $r_{22} = 30.431$ (Aspheric) | $d_{22} = 3.605$ | $n_{d12} = 1.49700$ | $v_{d12} = 81.54$ |
| $r_{23} = -93.324$ (Aspheric) | | | |

Aspherical Coefficients

6th surface

K = 0.0000
$A_4 = 3.5498 \times 10^{-6}$
$A_6 = 2.1901 \times 10^{-8}$
$A_8 = 3.7413 \times 10^{-11}$
$A_{10} = 0.0000$ 8th surface K = 0.0000
$A_4 = 5.7125 \times 10^{-6}$
$A_6 = -1.8826 \times 10^{-8}$
$A_8 = -1.2043 \times 10^{-9}$
$A_{10} = 8.1735 \times 10^{-12}$ 15th surface K = 0.0000
$A_4 = -1.5544 \times 10^{-5}$
$A_6 = -1.2826 \times 10^{-8}$
$A_8 = 4.4582 \times 10^{-10}$
$A_{10} = -4.6850 \times 10^{-12}$ 22th surface K = 0.0000
$A_4 = 3.1293 \times 10^{-6}$
$A_6 = 1.3890 \times 10^{-8}$
$A_8 = 1.2058 \times 10^{-10}$
$A_{10} = 1.5944 \times 10^{-13}$ 23th surface K = 0.0000
$A_4 = 2.6066 \times 10^{-5}$
$A_6 = 2.1615 \times 10^{-8}$
$A_8 = 1.9517 \times 10^{-10}$
$A_{10} = 0.0000$

|  | WE | ST | TE |
|---|---|---|---|
| Zooming Data (∞) | | | |
| f (mm) | 14.550 | 46.780 | 140.010 |
| $F_{NO}$ | 3.777 | 3.995 | 4.486 |
| 2ω (°) | 73.7 | 24.2 | 8.2 |
| FB (mm) | 32.496 | 56.263 | 56.430 |
| $d_5$ | 0.778 | 22.488 | 43.818 |
| $d_{13}$ | 27.986 | 5.791 | 0.100 |
| $d_{16}$ | 10.827 | 15.345 | 24.345 |
| $d_{18}$ | 2.034 | 2.114 | 0.330 |
| $d_{21}$ | 10.101 | 7.132 | 4.676 |
| Focusing Data (2.0 m) | | | |
| $d_{16}$ | 10.480 | 15.058 | 22.299 |
| $d_{18}$ | 2.381 | 2.400 | 2.376 |

EXAMPLE 14

| | | | |
|---|---|---|---|
| $r_1 = 92.732$ | $d_1 = 1.000$ | $n_{d1} = 1.84666$ | $v_{d1} = 23.78$ |
| $r_2 = 47.739$ | $d_2 = 8.300$ | $n_{d2} = 1.60311$ | $v_{d2} = 60.64$ |
| $r_3 = -488.337$ | $d_3 = 0.100$ | | |
| $r_4 = 42.637$ | $d_4 = 4.700$ | $n_{d3} = 1.49700$ | $v_{d3} = 81.54$ |
| $r_5 = 227.099$ | $d_5 = $ D1 | | |
| $r_6 = 96.419$ (Aspheric) | $d_6 = 0.850$ | $n_{d4} = 1.80440$ | $v_{d4} = 39.59$ |
| $r_7 = 14.529$ | $d_7 = 5.956$ | | |
| $r_8 = -26.923$ (Aspheric) | $d_8 = 0.850$ | $n_{d5} = 1.56384$ | $v_{d5} = 60.67$ |
| $r_9 = 39.191$ | $d_9 = 0.100$ | | |
| $r_{10} = 24.863$ | $d_{10} = 4.700$ | $n_{d6} = 1.84666$ | $v_{d6} = 23.78$ |
| $r_{11} = -37.221$ | $d_{11} = 1.721$ | | |
| $r_{12} = -20.880$ | $d_{12} = 0.750$ | $n_{d7} = 1.77250$ | $v_{d7} = 49.60$ |
| $r_{13} = 49.565$ | $d_{13} = $ D2 | | |
| $r_{14} = \infty$ (Stop) | $d_{14} = 0.850$ | | |
| $r_{15} = 21.783$ (Aspheric) | $d_{15} = 3.750$ | $n_{d8} = 1.48749$ | $v_{d8} = 70.23$ |
| $r_{16} = -23.450$ | $d_{16} = $ D3 | | |
| $r_{17} = -38.194$ | $d_{17} = 0.800$ | $n_{d9} = 1.77250$ | $v_{d9} = 49.60$ |
| $r_{18} = 221.672$ | $d_{18} = $ D4 | | |
| $r_{19} = 41.619$ | $d_{19} = 4.980$ | $n_{d10} = 1.49700$ | $v_{d10} = 81.54$ |
| $r_{20} = -20.464$ | $d_{20} = 0.700$ | $n_{d11} = 1.72047$ | $v_{d11} = 34.71$ |
| $r_{21} = 187.998$ | $d_{21} = 0.100$ | | |
| $r_{22} = 47.492$ (Aspheric) | $d_{22} = 4.200$ | $n_{d12} = 1.60311$ | $v_{d12} = 60.64$ |
| $r_{23} = -26.561$ (Aspheric) | | | |

Aspherical Coefficients

6th surface

K = 0.0000
$A_4 = 6.7898 \times 10^{-6}$
$A_6 = -9.2108 \times 10^{-9}$
$A_8 = 1.4640 \times 10^{-10}$
$A_{10} = 0.0000$ 8th surface K = 0.0000
$A_4 = -8.2805 \times 10^{-6}$
$A_6 = -5.3194 \times 10^{-8}$
$A_8 = -2.6611 \times 10^{-10}$
$A_{10} = 1.0752 \times 10^{-12}$ 15th surface K = 0.0000
$A_4 = -3.4825 \times 10^{-5}$
$A_6 = -1.6376 \times 10^{-8}$
$A_8 = 2.1716 \times 10^{-10}$
$A_{10} = -1.6667 \times 10^{-12}$ 22th surface K = 0.0000
$A_4 = -1.3153 \times 10^{-5}$
$A_6 = 2.2004 \times 10^{-9}$
$A_8 = -2.3448 \times 10^{-11}$
$A_{10} = -3.2741 \times 10^{-14}$ 23th surface K = 0.0000
$A_4 = 8.3246 \times 10^{-6}$
$A_6 = -3.4485 \times 10^{-9}$
$A_8 = -4.3878 \times 10^{-11}$
$A_{10} = 0.0000$ Zooming Data

|  | WE | ST | TE |
|---|---|---|---|
| f (mm) | 14.360 | 45.500 | 140.500 |
| $F_{NO}$ | 3.610 | 3.856 | 4.412 |
| 2ω (°) | 74.3 | 24.5 | 8.0 |
| FB (mm) | 36.325 | 51.559 | 54.452 |
| D1 | 0.900 | 20.817 | 35.000 |
| D2 | 19.062 | 6.427 | 1.122 |
| D3 | 1.926 | 10.865 | 35.040 |
| D4 | 15.928 | 9.416 | 0.200 |

EXAMPLE 15

| $r_1 = 91.455$ | $d_1 = 1.000$ | $n_{d1} = 1.84666$ | $\nu_{d1} = 23.78$ |
|---|---|---|---|
| $r_2 = 48.394$ | $d_2 = 8.300$ | $n_{d2} = 1.60311$ | $\nu_{d2} = 60.64$ |
| $r_3 = -475.695$ | $d_3 = 0.100$ | | |
| $r_4 = 39.058$ | $d_4 = 4.700$ | $n_{d3} = 1.49700$ | $\nu_{d3} = 81.54$ |
| $r_5 = 173.878$ | $d_5 = D1$ | | |
| $r_6 = 249.686$ (Aspheric) | $d_6 = 0.850$ | $n_{d4} = 1.80440$ | $\nu_{d4} = 39.59$ |
| $r_7 = 15.550$ | $d_7 = 5.378$ | | |
| $r_8 = -37.130$ (Aspheric) | $d_8 = 0.850$ | $n_{d5} = 1.77250$ | $\nu_{d5} = 49.60$ |
| $r_9 = 27.693$ | $d_9 = 0.100$ | | |
| $r_{10} = 25.326$ | $d_{10} = 4.700$ | $n_{d6} = 1.84666$ | $\nu_{d6} = 23.78$ |
| $r_{11} = -33.814$ | $d_{11} = 3.393$ | | |
| $r_{12} = -20.408$ | $d_{12} = 0.750$ | $n_{d7} = 1.69680$ | $\nu_{d7} = 55.53$ |
| $r_{13} = 47.449$ | $d_{13} = D2$ | | |
| $r_{14} = \infty$ (Stop) | $d_{14} = 0.850$ | | |
| $r_{15} = 18.878$ (Aspheric) | $d_{15} = 3.750$ | $n_{d8} = 1.49700$ | $\nu_{d8} = 81.54$ |
| $r_{16} = -22.392$ (Aspheric) | $d_{16} = D3$ | | |
| $r_{17} = -50.167$ | $d_{17} = 0.750$ | $n_{d9} = 1.65160$ | $\nu_{d9} = 58.55$ |
| $r_{18} = 81.160$ | $d_{18} = D4$ | | |
| $r_{19} = 26.650$ | $d_{19} = 4.980$ | $n_{d10} = 1.49700$ | $\nu_{d10} = 81.54$ |
| $r_{20} = -36.101$ | $d_{20} = 0.700$ | $n_{d11} = 1.72151$ | $\nu_{d11} = 29.23$ |
| $r_{21} = 167.248$ | $d_{21} = 0.100$ | | |
| $r_{22} = 38.733$ (Aspheric) | $d_{22} = 3.299$ | $n_{d12} = 1.49700$ | $\nu_{d12} = 81.54$ |
| $r_{23} = -43.922$ (Aspheric) | | | |

Aspherical Coefficients

6th surface

K = 0.0000
$A_4 = 1.3560 \times 10^{-5}$
$A_6 = -2.7838 \times 10^{-8}$
$A_8 = 2.7765 \times 10^{-10}$
$A_{10} = 0.0000$ 8th surface K = 0.0000
$A_4 = -1.8704 \times 10^{-5}$
$A_6 = -4.2196 \times 10^{-8}$
$A_8 = -1.5662 \times 10^{-9}$
$A_{10} = 5.1874 \times 10^{-12}$ 15th surface K = 0.0000
$A_4 = -5.0036 \times 10^{-5}$
$A_6 = -7.7701 \times 10^{-8}$
$A_8 = 3.3163 \times 10^{-10}$
$A_{10} = -8.6465 \times 10^{-13}$ 16th surface K = 0.0000
$A_4 = -3.6933 \times 10^{-6}$
$A_6 = -1.6996 \times 10^{-8}$
$A_8 = -4.5515 \times 10^{-10}$
$A_{10} = 2.6501 \times 10^{-12}$ 22th surface K = 0.0000
$A_4 = -1.4727 \times 10^{-5}$
$A_6 = 1.8739 \times 10^{-8}$
$A_8 = -8.4912 \times 10^{-10}$
$A_{10} = -3.0859 \times 10^{-13}$ 23th surface K = 0.0000
$A_4 = 1.5156 \times 10^{-5}$
$A_6 = 2.1860 \times 10^{-8}$
$A_8 = -9.3080 \times 10^{-10}$
$A_{10} = 0.0000$ Zooming Data

|  | WE | ST | TE |
|---|---|---|---|
| f (mm) | 14.360 | 40.287 | 140.500 |
| $F_{NO}$ | 3.500 | 3.715 | 4.150 |
| 2ω (°) | 74.8 | 27.5 | 8.0 |
| FB (mm) | 32.549 | 41.368 | 39.987 |
| D1 | 0.900 | 21.625 | 35.000 |
| D2 | 14.169 | 6.440 | 1.122 |
| D3 | 1.140 | 9.500 | 43.063 |
| D4 | 18.000 | 12.253 | 0.150 |

EXAMPLE 16

| $r_1 = 85.330$ | $d_1 = 1.000$ | $n_{d1} = 1.84666$ | $\nu_{d1} = 23.78$ |
|---|---|---|---|
| $r_2 = 46.980$ | $d_2 = 8.300$ | $n_{d2} = 1.60311$ | $\nu_{d2} = 60.64$ |
| $r_3 = -1063.508$ | $d_3 = 0.100$ | | |
| $r_4 = 41.824$ | $d_4 = 4.700$ | $n_{d3} = 1.49700$ | $\nu_{d3} = 81.54$ |
| $r_5 = 249.075$ | $d_5 = D1$ | | |
| $r_6 = 135.180$ (Aspheric) | $d_6 = 0.850$ | $n_{d4} = 1.80440$ | $\nu_{d4} = 39.59$ |
| $r_7 = 14.859$ | $d_7 = 5.446$ | | |
| $r_8 = -33.108$ (Aspheric) | $d_8 = 0.850$ | $n_{d5} = 1.77250$ | $\nu_{d5} = 49.60$ |
| $r_9 = 27.342$ | $d_9 = 0.100$ | | |
| $r_{10} = 25.241$ | $d_{10} = 4.700$ | $n_{d6} = 1.84666$ | $\nu_{d6} = 23.78$ |
| $r_{11} = -32.138$ | $d_{11} = 4.430$ | | |

-continued

| | | | |
|---|---|---|---|
| $r_{12} = -20.508$ | $d_{12} = 0.750$ | $n_{d7} = 1.69680$ | $\nu_{d7} = 55.53$ |
| $r_{13} = 51.683$ | $d_{13} = D2$ | | |
| $r_{14} = \infty$ (Stop) | $d_{14} = 0.850$ | | |
| $r_{15} = 19.422$ (Aspheric) | $d_{15} = 3.750$ | $n_{d8} = 1.49700$ | $\nu_{d8} = 81.54$ |
| $r_{16} = -22.918$ (Aspheric) | $d_{16} = D3$ | | |
| $r_{17} = -50.167$ | $d_{17} = 0.750$ | $n_{d9} = 1.65160$ | $\nu_{d9} = 58.55$ |
| $r_{18} = 65.609$ | $d_{18} = D4$ | | |
| $r_{19} = 38.189$ | $d_{19} = 4.980$ | $n_{d10} = 1.49700$ | $\nu_{d10} = 81.54$ |
| $r_{20} = -20.431$ | $d_{20} = 0.700$ | $n_{d11} = 1.72151$ | $\nu_{d11} = 29.23$ |
| $r_{21} = -49.533$ | $d_{21} = 0.100$ | | |
| $r_{22} = 37.598$ (Aspheric) | $d_{22} = 8.681$ | $n_{d12} = 1.49700$ | $\nu_{d12} = 81.54$ |
| $r_{23} = -148.010$ (Aspheric) | | | |

Aspherical Coefficients

6th surface $K = 0.0000$
$A_4 = 3.9431 \times 10^{-6}$
$A_6 = -1.6805 \times 10^{-8}$
$A_8 = 2.9386 \times 10^{-10}$
$A_{10} = 0.0000$ 8th surface $K = 0.0000$
$A_4 = -8.8064 \times 10^{-6}$
$A_6 = -3.8046 \times 10^{-8}$
$A_8 = -1.6882 \times 10^{-9}$
$A_{10} = 4.4823 \times 10^{-12}$ 15th surface $K = 0.0000$
$A_4 = -5.0081 \times 10^{-5}$
$A_6 = -6.4167 \times 10^{-8}$
$A_8 = 1.8107 \times 10^{-10}$
$A_{10} = 3.7880 \times 10^{-12}$ 16th surface $K = 0.0000$
$A_4 = -7.1882 \times 10^{-6}$
$A_6 = -2.3229 \times 10^{-8}$
$A_8 = -6.0073 \times 10^{-10}$
$A_{10} = 3.7880 \times 10^{-12}$ 22th surface $K = 0.0000$
$A_4 = -2.0848 \times 10^{-6}$
$A_6 = -6.4374 \times 10^{-9}$
$A_8 = 3.8678 \times 10^{-11}$
$A_{10} = 1.6757 \times 10^{-13}$ 23th surface $K = 0.0000$
$A_4 = 1.4490 \times 10^{-5}$
$A_6 = -1.0858 \times 10^{-8}$
$A_8 = 9.0082 \times 10^{-11}$
$A_{10} = 0.0000$ Zooming Data

| | WE | ST | TE |
|---|---|---|---|
| f (mm) | 14.360 | 39.998 | 140.500 |
| $F_{NO}$ | 3.517 | 3.640 | 4.363 |
| 2ω (°) | 74.9 | 27.8 | 8.0 |
| FB (mm) | 32.026 | 43.978 | 47.577 |
| D1 | 0.900 | 20.182 | 35.000 |
| D2 | 13.829 | 5.713 | 1.122 |
| D3 | 1.140 | 9.817 | 38.094 |
| D4 | 17.013 | 11.229 | 0.150 |

EXAMPLE 17

| | | | |
|---|---|---|---|
| $r_1 = 70.826$ | $d_1 = 1.000$ | $n_{d1} = 1.84666$ | $\nu_{d1} = 23.78$ |

-continued

| | | | |
|---|---|---|---|
| $r_2 = 43.617$ | $d_2 = 8.300$ | $n_{d2} = 1.49700$ | $\nu_{d2} = 81.54$ |
| $r_3 = -510.138$ | $d_3 = 0.100$ | | |
| $r_4 = 40.870$ | $d_4 = 4.700$ | $n_{d3} = 1.49700$ | $\nu_{d3} = 81.54$ |
| $r_5 = 254.034$ | $d_5 = D1$ | | |
| $r_6 = 54.673$ (Aspheric) | $d_6 = 0.850$ | $n_{d4} = 1.72916$ | $\nu_{d4} = 54.68$ |
| $r_7 = 13.132$ | $d_7 = 5.378$ | | |
| $r_8 = -25.077$ (Aspheric) | $d_8 = 0.850$ | $n_{d5} = 1.77250$ | $\nu_{d5} = 49.60$ |
| $r_9 = 24.387$ | $d_9 = 0.100$ | | |
| $r_{10} = 25.057$ | $d_{10} = 4.700$ | $n_{d6} = 1.84666$ | $\nu_{d6} = 23.78$ |
| $r_{11} = -28.485$ | $d_{11} = 3.498$ | | |
| $r_{12} = -17.701$ | $d_{12} = 0.750$ | $n_{d7} = 1.77250$ | $\nu_{d7} = 49.60$ |
| $r_{13} = 464.466$ | $d_{13} = D2$ | | |
| $r_{14} = \infty$ (Stop) | $d_{14} = 0.850$ | | |
| $r_{15} = 23.510$ (Aspheric) | $d_{15} = 3.750$ | $n_{d8} = 1.49700$ | $\nu_{d8} = 81.54$ |
| $r_{16} = -19.292$ (Aspheric) | $d_{16} = D3$ | | |
| $r_{17} = -26.953$ | $d_{17} = 0.800$ | $n_{d9} = 1.77250$ | $\nu_{d9} = 49.60$ |
| $r_{18} = 337.402$ | $d_{18} = D4$ | | |
| $r_{19} = 33.463$ | $d_{19} = 4.980$ | $n_{d10} = 1.48749$ | $\nu_{d10} = 70.23$ |
| $r_{20} = -22.760$ | $d_{20} = 0.700$ | $n_{d11} = 1.66680$ | $\nu_{d11} = 33.05$ |
| $r_{21} = -174.710$ | $d_{21} = 0.100$ | | |
| $r_{22} = 66.809$ (Aspheric) | $d_{22} = 4.048$ | $n_{d12} = 1.49700$ | $\nu_{d12} = 81.54$ |
| $r_{23} = -23.806$ (Aspheric) | | | |

Aspherical Coefficients

6th surface $K = 0.0000$
$A_4 = -3.2997 \times 10^{-6}$
$A_6 = 6.1402 \times 10^{-9}$
$A_8 = 3.5468 \times 10^{-10}$
$A_{10} = 0.0000$ 8th surface $K = 0.0000$
$A_4 = 3.7305 \times 10^{-6}$
$A_6 = 3.2973 \times 10^{-9}$
$A_8 = -3.1950 \times 10^{-9}$
$A_{10} = 1.8754 \times 10^{-11}$ 15th surface $K = 0.0000$
$A_4 = -3.9222 \times 10^{-5}$
$A_6 = 1.5884 \times 10^{-8}$
$A_8 = 1.0595 \times 10^{-10}$
$A_{10} = -8.3897 \times 10^{-13}$ 16th surface $K = 0.0000$
$A_4 = -7.1882 \times 10^{-6}$
$A_6 = -2.3229 \times 10^{-8}$
$A_8 = -6.0073 \times 10^{-10}$
$A_{10} = 3.7880 \times 10^{-12}$ 22th surface $K = 0.0000$
$A_4 = -2.2483 \times 10^{-5}$
$A_6 = -3.5594 \times 10^{-9}$
$A_8 = -9.0793 \times 10^{-11}$
$A_{10} = -4.0807 \times 10^{-15}$ 23th surface $K = 0.0000$
$A_4 = 8.5333 \times 10^{-6}$
$A_6 = -5.0694 \times 10^{-9}$
$A_8 = -1.0354 \times 10^{-10}$
$A_{10} = 0.0000$ Zooming Data

| | WE | ST | TE |
|---|---|---|---|
| f (mm) | 14.360 | 44.216 | 140.500 |
| $F_{NO}$ | 3.244 | 3.675 | 4.435 |
| 2ω (°) | 74.3 | 25.2 | 8.0 |
| FB (mm) | 38.840 | 52.619 | 52.237 |
| D1 | 0.900 | 20.777 | 35.000 |

-continued

|    |         |         |        |
|----|---------|---------|--------|
| D2 | 12.237  | 4.382   | 1.122  |
| D3 | 1.140   | 11.256  | 36.032 |
| D4 | 13.750  | 7.615   | 0.150  |

FIGS. 18–26 are aberration diagrams for Examples 1–9 upon focused at infinity, FIGS. 27, 29, 31 and 33 are aberration diagrams for Examples 10–13 upon focused at infinity, and FIGS. 28, 30, 32 and 34 are aberration diagrams for Examples 10–13 upon focused on a finite point In these aberration diagrams, (a), (b) and (c) represent the wide-angle end, intermediate settings and telephoto end, respectively, and SA, AS, DT and CC stand for spherical aberrations, astigmatism, distortion and chromatic aberration of magnification, respectively, with "IH" representing an image height.

Enumerated below are the values of conditions (1) to (9) in the respective examples.

|            | (1)    | (2)    | (3)    | (4)    | (5)    |
|------------|--------|--------|--------|--------|--------|
| Example 1  | 4.713  | 0.8112 | 0.6711 | 3.0433 | 2.3866 |
| Example 2  | 4.7963 | 0.8290 | 0.8217 | 1.4078 | 0.9391 |
| Example 3  | 4.5528 | 0.8007 | 0.6936 | 1.3452 | 2.5083 |
| Example 4  | 4.5528 | 0.8007 | 0.6936 | 1.3452 | 0.9673 |
| Example 5  | 4.5464 | 0.8000 | 0.6936 | 1.3451 | 0.9673 |
| Example 6  | 4.5494 | 0.7891 | 0.6850 | 1.3113 | 0.9794 |
| Example 7  | 4.5494 | 0.7891 | 0.685  | 1.3113 | 0.9794 |
| Example 8  | 4.6889 | 0.7834 | 0.6658 | 1.1169 | 0.9154 |
| Example 9  | 4.8424 | 0.7988 | 0.7073 | 1.1646 | 0.9817 |
| Example 10 | 5.5936 | 0.8477 | 0.8288 | 1.3538 | 0.9289 |
| Example 11 | 5.3362 | 0.8928 | 0.9010 | 1.2109 | 0.9357 |
| Example 12 | 5.7316 | 0.9159 | 0.7348 | 0.6337 | 0.7045 |
| Example 13 | 5.5056 | 0.8894 | 0.8395 | 0.6180 | 0.6660 |
| Example 14 | 4.7735 | 0.7553 | 0.8162 | 1.4436 | 1.0996 |
| Example 15 | 4.5699 | 0.6463 | 0.6327 | 1.4135 | 0.9675 |
| Example 16 | 4.6404 | 0.6414 | 0.6853 | 1.3684 | 0.9988 |
| Example 17 | 4.6593 | 0.6673 | 0.6590 | 0.9687 | 0.8219 |

|            | (6)     | (7)    | (8)    | (9)    |
|------------|---------|--------|--------|--------|
| Example 1  | 18.2945 | 2.9436 | 2.2015 | 3.5584 |
| Example 2  | 17.4949 | 3.1484 | 2.3460 | 3.6099 |
| Example 3  | 21.4960 | 2.5389 | 1.9028 | 3.7708 |
| Example 4  | 20.6438 | 2.5784 | 1.8914 | 3.7708 |
| Example 5  | 11.6154 | 2.8850 | 1.7807 | 3.7708 |
| Example 6  | 21.4107 | 2.5398 | 1.8496 | 3.7798 |
| Example 7  | 17.4466 | 2.6445 | 1.8745 | 3.7798 |
| Example 8  | 27.2847 | 2.6967 | 1.9171 | 3.6999 |
| Example 9  | 19.3228 | 4.7581 | 2.4800 | 3.3351 |
| Example 10 | 13.4069 | 1.7400 | 1.6851 | 4.4130 |
| Example 11 | 12.1372 | 2.9586 | 2.0654 | 4.2023 |
| Example 12 | 12.5236 | 2.9989 | 1.5855 | 4.3006 |
| Example 13 | 11.6802 | 3.1256 | 2.0841 | 4.2529 |
| Example 14 | 14.8712 | 3.5984 | 2.4800 | 3.6144 |
| Example 15 | 14.8712 | 1.2623 | 2.9388 | 4.0074 |
| Example 16 | 13.6554 | 3.9717 | 2.4819 | 3.8190 |
| Example 17 | 15.3941 | 4.0162 | 2.4156 | 3.8034 |

Figure 35:
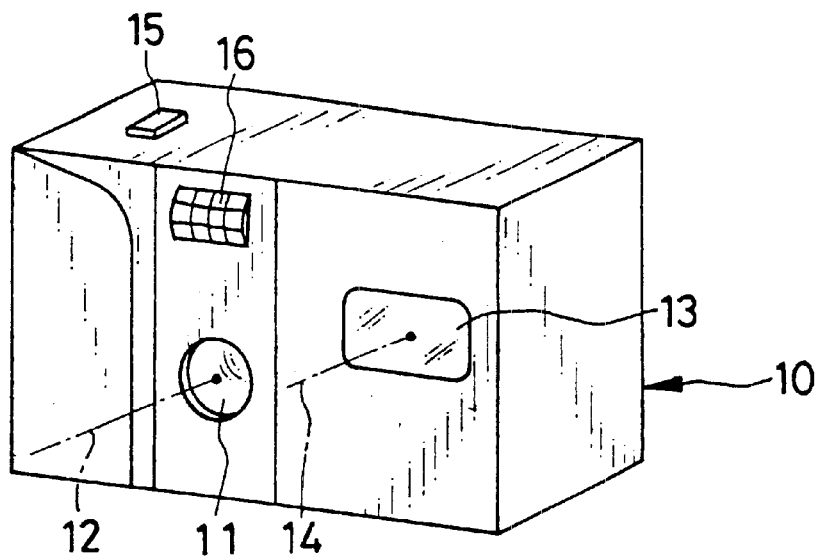
FIG. 35 is a front perspective view of the appearance of a digital camera.
Figure 36:
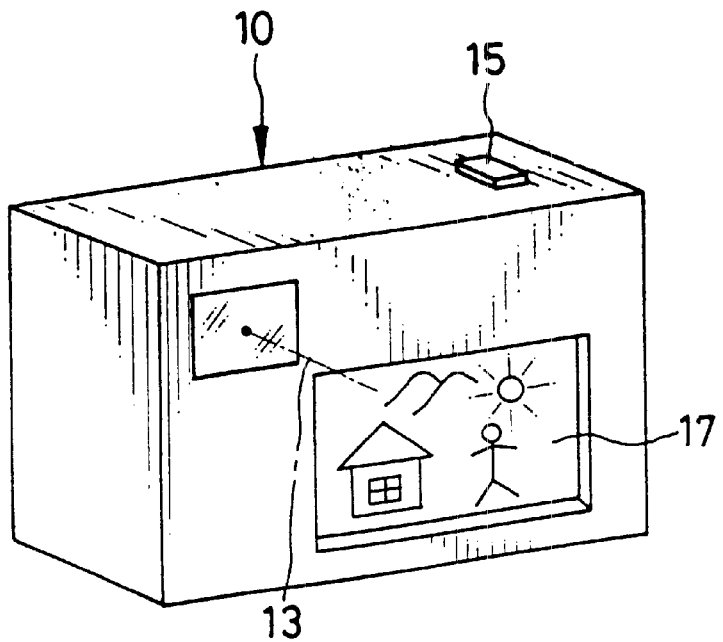
FIG. 36 is a rear perspective view of the FIG. 35 digital camera.
Figure 37:
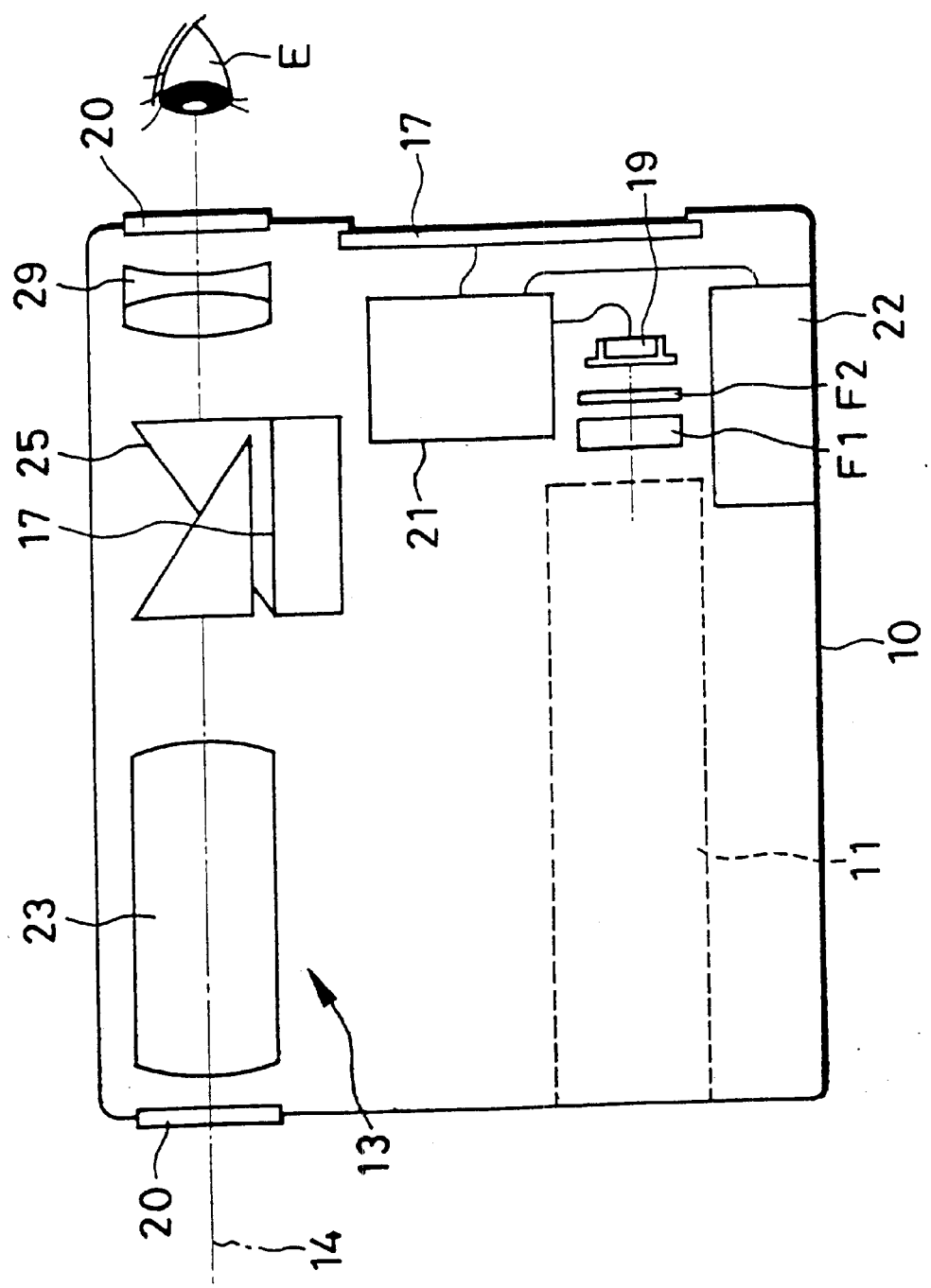
FIG. 37 is a sectional view of the construction of a digital camera.

The zoom lens system according to the present invention may be used in the form of a phototaking optical system for image pickup equipment. FIGS. 35 to 37 are illustrative of the concept of a digital camera that is one embodiment of the image pickup system according to the present invention. FIG. 35 is a front perspective view showing the appearance of a digital camera 10, FIG. 36 is a rear perspective view of the digital camera 10, and FIG. 37 is a sectional view illustrative of the construction of the digital camera 10. The illustrated digital camera 10 comprises a phototaking optical system 11 having a phototaking optical path 12, a finder optical system 13 having a finder optical path 14, a shutter button 15, a flash 16 and a liquid crystal monitor 17. As the shutter button 15 located on the upper portion of camera 10 is pressed down, an object is phototaken through the phototaking optical system 11, for instance, the zoom lens system embodied by Example 1 (FIG. 1) of the present invention. An object image is formed on the image pickup plane of an electronic image pickup device (CCD) 19 via a phototaking optical system 11, and filters F1, F2, etc. such as a low-pass filter and an infrared cut filter. The object image sensed by CCD 19 is displayed as an electronic image on the liquid crystal monitor 17 mounted on the back side of camera 10 via processing means 21. The processing means 21 may be connected with recording means 22 for recording the phototaken electronic image. It is here noted that the recording means 22 may be provided separately from the processing means 21 or, alternatively, the electronic image may be electronically written onto a floppy disk, a memory card, a MO or the like. The camera 10 may be designed as a silver salt camera having a silver salt film in place of CCD 19.

Moreover, a finder objective optical system 23 is positioned on the finder optical path 14. An object image formed by the finder objective optical system 23 is then formed on a field frame 24 of a Porro prism 25 that is an image erecting member. In the rear of Porro prism 25, there is provided an eyepiece optical system 29 for guiding the erected image to the eyeball E of an observer. Three cover members 20 are provided; one on the emergent side of the eyepiece optical system 29 and two on the incident sides of the phototaking optical system 11 and finder objective optical system 23.

In the thus constructed digital camera 10, the phototaking optical system 11 is a compact zoom lens system having a wide field angle and a high zoom ratio with well-corrected aberrations. It is thus possible to achieve high performance as well as significant cost reductions.

According to the present invention as detailed above, it is possible to provide not only a simple high-magnification zoom lens system but also a wide-angle yet high-magnification zoom lens system encompassing a field angle of about 70° or greater. For this reason, it is possible to achieve a proper zooming mode and power profile, proper lens arrangements and effective use of aspherical surfaces.

According to the present invention, there can also be provided a zoom lens system comprising, in order from its object side, a first lens group having positive refracting power, a second lens group having negative refracting power, a third lens group having positive refracting power, a fourth lens group having negative refracting power and a fifth lens group having positive refracting power, wherein focusing is carried out using the third, the fourth, and the fifth lens group, respectively. The present focusing method wherein only a single or cemented lens is moved with the power profile according to the present invention is so effective for reducing fluctuations of aberrations as well as for other purposes that it will find use as a variety of future wide-angle yet high-magnification zoom lens systems for videos or still video purposes.

Moreover, there can be provided a method of compensating for an image movement due to the movement of an optimum lens group in such a zoom lens system.

What we claim is:

1. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, a spacing between said first lens group and said second lens group and a spacing between said third lens group and said fourth lens group becomes wider and a spacing between said second lens group and said third lens group and a spacing between said fourth lens group and said fifth lens group becomes narrower, and the following conditions are satisfied:

$$4.5464 \leq f_1/f_w < 8.0 \tag{1}$$

$$0.4 < |f_2/f_w| < 1.0 \tag{2}$$

$$0.3 < f_3/f_{T345} < 1.2 \tag{3}$$

$$0.6 < |f_4|/f_{T345} < 5.0 \tag{4}$$

$$0.5 < f_5/f_{T345} < 4.0 \tag{5}$$

where $f_w$ is a focal length of said zoom lens system at said wide-angle end, $f_1$ is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end.

2. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, a spacing between said first lens group and said second lens group and a spacing between said third lens group and said fourth lens group becomes wider and a spacing between said second lens group and said third lens group and a spacing between said fourth lens group and said fifth lens group becomes narrower, and the following conditions are satisfied:

$$4.5464 \leq f_1/f_w < 8.0 \tag{1}$$

$$0.4 < |f_2/f_w| < 1.0 \tag{2}$$

$$0.3 < f_3/f_{T345} < 1.2 \tag{3}$$

$$0.6 < |f_4|/f_{T345} < 5.0 \tag{4}$$

$$0.5 < f_5/f_{T345} < 4.0 \tag{5}$$

where $f_w$ is a focal length of said zoom lens system at said wide-angle end, $f_1$ is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end, wherein the focal length of said zoom lens system at said wide-angle end is shorter than an effective diagonal length of an image plane of an optical system or an image pickup device.

3. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, a spacing between said first lens group and said second lens group and a spacing between said third lens group and said fourth lens group becomes wider and a spacing between said second lens group and said third lens group and a spacing between said fourth lens group and said fifth lens group becomes narrower, and the following conditions are satisfied:

$$4.5464 \leq f_1/f_w < 8.0 \tag{1}$$

$$0.4 < |f_2/f_w| < 1.0 \tag{2}$$

$$0.3 < f_3/f_{T345} < 1.2 \tag{3}$$

$$0.6 < |f_4|/f_{T345} < 5.0 \tag{4}$$

$$0.5 < f_5/f_{T345} < 4.0 \tag{5}$$

where $f_w$ is a focal length of said zoom lens system at said wide-angle end, $f_1$ is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end, wherein a principal ray emerging from an optical system is determined on the basis of the following condition:

$$10 < |Expdw \times Y|/Lw \tag{6}$$

where Expdw is an optical axis distance from an image-formation plane position to an exit pupil, Y is an actual maximum image height on said image-formation plane, and Lw is an optical axis distance at said wide-angle end from an apex of a surface located nearest to said object side in said first lens group to said image-formation plane.

4. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, a spacing between said first lens group and said second lens group and a spacing between said third lens group and said fourth lens group becomes wider and a spacing between said second lens group and said third lens group and a spacing between said fourth lens group and said fifth lens group becomes narrower, and the following conditions are satisfied:

$$4.5464 \leq f_1/f_w < 8.0 \tag{1}$$

$$0.4 < |f_2/f_w| 1.0 \tag{2}$$

$$0.3 < f_3/f_{T345} < 1.2 \tag{3}$$

$$0.6 < |f_4|/f_{T345} < 5.0 \tag{4}$$

$$0.5 < f_5/f_{T345} < 4.0 \tag{5}$$

where $f_w$ is a focal length of said zoom lens system at said wide-angle end, $f_1$ is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end, wherein the following conditions upon zooming from said wide-angle end to said telephoto end:

$$1.6 < \Delta_{1T}/f_w < 5.0 \qquad (7)$$

$$1.0 < \Delta_{3T}/f_w < 4.0 \qquad (8)$$

where $\Delta_{1T}$ is an amount of zooming movement of said first lens group to said telephoto end, as measured on the basis of said wide angle end, and $\Delta_{3T}$ is an amount of zooming movement of said third lens group to said telephoto end, as measured on the basis of said wide-angle end.

5. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, a spacing between said first lens group and said second lens group and a spacing between said third lens group and said fourth lens group becomes wider and a spacing between said second lens group and said third lens group and a spacing between said fourth lens group and said fifth lens group becomes narrower, and the following conditions are satisfied:

$$4.5464 < f_1/f_W < 8.0 \qquad (1)$$

$$0.4 < |f_2/f_w| < 1.0 \qquad (2)$$

$$0.3 < f_3/f_{T345} < 1.2 \qquad (3)$$

$$0.6 < |f_4|/f_{T345} < 5.0 \qquad (4)$$

$$0.5 < f_5/f_{T345} < 4.0 \qquad (5)$$

where $f_w$ is a focal length of said zoom lens system at said wide-angle end, $f_1$ is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end, wherein said second lens group has a paraxial transverse magnification satisfying the following condition:

$$2.5 < \beta_{2T}/\beta_{2W} < 7 \qquad (9)$$

where $\beta_{2W}$ is an image-formation magnification of said second lens group at said wide-angle end, and $\beta_{2T}$ is an image-formation magnification of said second lens group at said telephoto end.

6. The zoom lens system according to claim 1, characterized in that said first lens group comprises at least one negative lens and a positive lens.

7. The zoom lens system according to claim 1, characterized in that said second lens group comprises at least two negative lens and one positive lens.

8. The zoom lens system according to claim 1, characterized in that said third lens group comprises at least one positive lens.

9. The zoom lens system according to claim 1, characterized in that said fourth lens group comprises at least one negative lens.

10. The zoom lens system according to claim 1, characterized in that said fifth lens group comprises at least one negative positive lens and one negative lens.

11. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, a spacing between said first lens group and said second lens group and a spacing between said third lens group and said fourth lens group becomes wider and a spacing between said second lens group and said third lens group and a spacing between said fourth lens group and said fifth lens group becomes narrower, and said zoom lens system is focused on a finite object by moving said third lens group or a lens or lenses therein the first lens group moves along the optical axis during zooming from the wide-angle to the telephoto end, and the system is focused on a finite object by movement of only the third lens group or only a lens or lenses in the third lens group.

12. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, a spacing between said first lens group and said second lens group and a spacing between said third lens group and said fourth lens group becomes wider and a spacing between said second lens group and said third lens group and a spacing between said fourth lens group and said fifth lens group becomes narrower, and said zoom lens system is focused on a finite object by moving said fourth lens group or a lens or lenses therein, the system is focused on a finite object by movement of only the fourth lens group or only a lens or lenses in the fourth lens group.

13. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, a spacing between said first lens group and said second lens group and a spacing between said third lens group and said fourth lens group becomes wider and spacing between said second lens group and said third lens group and a spacing between said fourth lens group and said fifth lens group becomes narrower, and said zoom lens system is focused on a finite object by moving said fifth lens group or a lens or lenses therein, the first lens group moves along the optical axis during zooming from the wide-angle to the telephoto end, and the system is focused on a finite object by movement of only the fifth lens group or only a lens or lenses in the fifth lens group.

14. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, each of said first lens group to said fifth lens group moves while said first lens group and said third lens group move toward said object side during said zooming in such a way that spacing between said first lens group and said second lens group and between said third lens group and said fourth lens group becomes wider, a fluctuation of an image plane position with said zooming is compensated for by nonlinear movement of at least one of said third lens group, said fourth lens group and said fifth lens group, and the following conditions are satisfied:

$$4.5464 \leq f_1/f_W < 8.0 \quad (1)$$

$$0.4 < |f_2/f_W| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

where $f_W$ is a focal length of said zoom lens system at said wide-angle end, f1 is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end.

15. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, each of said first lens group to said fifth lens group moves while said first lens group and said third lens group move toward said object side during said zooming in such a way that spacing between said first lens group and said second lens group and between said third lens group and said fourth lens group becomes wider, a fluctuation of an image plane position with said zooming is compensated for by nonlinear movement of at least one of said third lens group, said fourth lens group and said fifth lens group, and the following conditions are satisfied:

$$2.0 < f_1/f_W < 8.0 \quad (1)$$

$$0.4 < |f_2/f_W| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

where $f_W$ is a focal length of said zoom lens system at said wide-angle end, f1 is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end wherein an image movement occurring by movement of said zoom lens system is corrected by moving said third lens group substantially vertically with respect to an optical axis of said zoom lens system.

16. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, each of said first lens group to said fifth lens group moves while said first lens group and said third lens group move toward said object side during said zooming in such a way that spacing between said first lens group and said second lens group and between said third lens group and said fourth lens group becomes wider, a fluctuation of an image plane position with said zooming is compensated for by nonlinear movement of at least one of said third lens group, said fourth lens group and said fifth lens group, and the following conditions are satisfied:

$$2.0 < f_1/f_W < 8.0 \quad (1)$$

$$0.4 < |f_2/f_w| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

where $f_W$ is a focal length of said zoom lens system at said wide-angle end, f1 is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end, wherein an image movement occurring by movement of said zoom lens system is corrected by moving said fourth lens group substantially vertically with respect to an optical axis of said zoom lens system.

17. A zoom lens system comprising, in order from an object of the zoom lens system, a first lens group having positive refracting power, a second lens group having negative refracting power, a third lens group having positive refracting power, a fourth lens group having negative refracting power and a fifth lens group having positive refracting power, wherein:

for zooming from a wide-angle end to a telephoto end of said zoom lens system, each of said first lens group to said fifth lens group moves while said first lens group and said third lens group move toward said object side during said zooming in such a way that spacing between said first lens group and said second lens group and between said third lens group and said fourth lens group becomes wider, a fluctuation of an image plane position with said zooming is compensated for by nonlinear movement of at least one of said third lens group, said fourth lens group and said fifth lens group, and the following conditions are satisfied:

$$2.0 < f_1/f_W < 8.0 \quad (1)$$

$$0.4 < |f_2/f_W| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

where $f_W$ is a focal length of said zoom lens system at said wide-angle end, f1 is a focal length of said first lens group, $f_2$ is a focal length of said second lens group, $f_3$ is a focal length of said third lens group, $f_4$ is a focal length of said fourth lens group, $f_5$ is a focal length of said fifth lens group, and $f_{T345}$ is a focal length of said third lens group to said fifth lens group at said telephoto end, wherein an image movement occurring by movement of said zoom lens system is corrected by moving said fifth lens group substantially vertically with respect to an optical axis said zoom lens system.

* * * * *